United States Patent
Liu et al.

(10) Patent No.: US 11,895,084 B2
(45) Date of Patent: Feb. 6, 2024

(54) IAB NODE DUAL CONNECTIVITY SETUP METHOD AND COMMUNICATION APPARATUS

(71) Applicant: HUAWEI TECHNOLOGIES CO., LTD., Guangdong (CN)

(72) Inventors: Jing Liu, Shanghai (CN); Yuanping Zhu, Shanghai (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/738,250

(22) Filed: May 6, 2022

(65) Prior Publication Data
US 2022/0263797 A1 Aug. 18, 2022

Related U.S. Application Data

(63) Continuation of application No. PCT/CN2019/116874, filed on Nov. 8, 2019.

(51) Int. Cl.
*H04W 36/18* (2009.01)
*H04W 36/00* (2009.01)
*H04L 61/5007* (2022.01)

(52) U.S. Cl.
CPC ............... *H04L 61/5007* (2022.05)

(58) Field of Classification Search
None
See application file for complete search history.

(56) References Cited

U.S. PATENT DOCUMENTS

| 10,470,136 | B1* | 11/2019 | Ghosh | H04W 56/001 |
|---|---|---|---|---|
| 2019/0182875 | A1* | 6/2019 | Talebi Fard | H04W 8/18 |
| 2019/0327660 | A1 | 10/2019 | Hong et al. | |
| 2020/0084688 | A1* | 3/2020 | Mildh | H04W 88/08 |
| 2020/0120725 | A1* | 4/2020 | Mildh | H04W 76/12 |

(Continued)

FOREIGN PATENT DOCUMENTS

| CN | 109688631 A | 4/2019 |
|---|---|---|
| CN | 110351807 A | 10/2019 |

OTHER PUBLICATIONS

3GPP TS 38.331 V15.7.0 (Sep. 2019), "3rd Generation Partnership Project; Technical Specification Group Radio Access Network; NR; Radio Resource Control (RRC) protocol specification (Release 15)," Sep. 2019, 527 pages.

(Continued)

*Primary Examiner* — Christopher B Robinson
(74) *Attorney, Agent, or Firm* — Fish & Richardson P.C.

(57) ABSTRACT

The present disclosure relates to integrated access and backhaul (IAB) node dual connectivity setup methods and communication apparatus. In one example method, a first IAB node sets up a first F1 interface with a primary donor node of the first IAB node. The first IAB node obtains an internet protocol (IP) address anchored at a secondary donor node connected to the first IAB node and/or configuration information of a serving cell, of the first IAB node, belonging to the secondary donor node. The first IAB node sends, to the secondary donor node, a request for setting up a second F1 interface with the secondary donor node, where the request includes the configuration information of the serving cell, of the first IAB node, belonging to the secondary donor node.

12 Claims, 19 Drawing Sheets

(56) References Cited

U.S. PATENT DOCUMENTS

| | | | |
|---|---|---|---|
| 2020/0374839 A1* | 11/2020 | Novlan | H04W 72/04 |
| 2020/0413457 A1* | 12/2020 | Hong | H04W 76/10 |
| 2021/0127430 A1* | 4/2021 | Teyeb | H04L 67/56 |
| 2022/0166703 A1* | 5/2022 | Xu | H04L 61/5014 |

OTHER PUBLICATIONS

3GPP TS 38.401 V15.6.0 (Jul. 2019), "3rd Generation Partnership Project; Technical Specification Group Radio Access Network; NG-RAN; Architecture description (Release 15)," Jul. 2019, 46 pages.

3GPP TS 38.473 V15.7.0, (Sep. 2019), "3rd Generation Partnership Project; Technical Specification Group Radio Access Network; NG-RAN;F1 application protocol (F1AP)(Release 15)," Sep. 2019, 200 pages.

Ericsson, "IP Address Assignment in IAB Networks," 3GPP TSG RAN WG3 Meeting #103bis, R3-191364, Xi'an, China, Apr. 8-12, 2019, 3 pages.

Huawei, "IP address management of IAB node," 3GPP TSG-RAN WG3 Meeting #103bis, R3-191841, Xi'an, China, Apr. 8-12, 2019, 2 pages.

PCT International Search Report and Written Opinion issued in International Application No. PCT/CN2019/116874 dated Aug. 12, 2020, 15 pages (with English translation).

ZTE,"Discussion on IAB link switch and topology adaptation," 3GPP TSG-RAN WG3#101, R3-184760, Gothenburg, Sweden, Aug. 20-24, 2018, 6 pages.

Ericsson et al., "IP Address Assignment in IAB," 3GPP TSG-RAN WG3 Meeting #105bis, R3-195633, Chongqing, China, Oct. 14-18, 2019, 5 pages.

Ericsson, "IP Address Assignment for IAB Nodes," 3GPP TSG-RAN WG2 Meeting #108, R2-1915476, Reno, USA, Nov. 18-22, 2019, 7 pages.

Ericsson,"Response to R3-193956, R3-193979, R3-193980, R3-193985, R3-194332 and R3-193563: IAB IP Address Assignment," 3GPP TSG-RAN WG3 Meeting #105, R3-194527, Ljubljana, Slovenia, Aug. 26-30, 2019, 4 pages.

Extended European Search Report issued in European Application No. 19951387.0 dated Oct. 13, 2022, 11 pages.

RAN3, "LS on IP Assignment in IAB Network," 3GPP TSG RAN WG2 #108, R2-1914331, Reno, USA, Nov. 18-22, 2019, 2 pages.

Samsung, "Further Discussion on IP Address Issues of IAB Network," 3GPP TSG-RAN WG3 Meeting #105bis, R3-194994, Chongqing, China, Oct. 14-18, 2019, 4 pages.

* cited by examiner

IAB NODE DUAL CONNECTIVITY SETUP METHOD AND COMMUNICATION APPARATUS

CROSS-REFERENCE TO RELATED APPLICATIONS

This application is a continuation of International Application No. PCT/CN2019/116874, filed on Nov. 8, 2019, the disclosure of which is hereby incorporated by reference in its entirety.

TECHNICAL FIELD

This application relates to the communication field, and more specifically, to an IAB node dual connectivity setup method and a communication apparatus.

BACKGROUND

In an integrated access and backhaul (IAB) network, an IAB node may provide a wireless access service and a wireless backhaul service for user equipment. Service data of the user equipment is sent by the IAB node to an IAB donor node through a wireless backhaul link. The IAB donor node may also be referred to as a donor IAB node, an IAB donor base station, or a donor base station. The IAB donor node is connected to a 5G core network element through an NG interface.

Currently, once the IAB node is deployed, the IAB node does not move, and mobility of the IAB node is not considered. With network development, a mobile network scenario is one of important scenarios of 5G. Because the IAB node can provide wireless backhaul, the IAB node is suitable for improving network coverage and capacities in the mobile scenario. Therefore, the IAB node may alternatively be deployed on a mobile device (for example, a car, a high-speed railway, or a subway), and moves as the mobile device moves.

In a process in which the IAB node moves, an IAB donor node connected to the IAB node changes. Currently, in a process in which the IAB node is handed over to the IAB donor node, not only the IAB node is handed over to a target IAB donor node, but also a child node of the IAB node needs to be handover to the target IAB donor node. Therefore, before handover, the IAB node needs to first send, to the child node of the IAB node, information configured by the target IAB donor node for the child node of the IAB node. In this case, a long handover latency is generated, and the long handover latency causes a problem of service interruption. Consequently, communication quality is severely affected, and communication efficiency is reduced.

SUMMARY

This application provides an IAB node dual connectivity setup method and a communication apparatus, to reduce a latency for setting up an F1 interface with a secondary donor node after an IAB node is handed over to the secondary donor node, avoid a problem of service interruption caused by a latency existing when the IAB node is hand over to a donor node, ensure communication quality, and improve communication efficiency.

According to a first aspect, an IAB node dual connectivity setup method is provided. The method may be performed by an IAB node, an IAB-DU of the IAB node, or a chip used in the IAB node or the IAB-DU. For example, the method is performed by the IAB node. The method includes: A first IAB node sets up a first F1 interface with a primary donor node of the first IAB node. The first IAB node obtains an internes protocol IP address anchored at a secondary donor node connected to the first IAB node and/or configuration information of a serving cell, of the first IAB node, belonging to the secondary donor node. The first IAB node sends, to the secondary donor node, a request for setting up a second F1 interface with the secondary donor node, where the request includes the configuration information of the serving cell, of the first IAB node, belonging to the secondary donor node. The IAB node may include a mobile terminal MT unit and a distributed unit DU, the primary donor node may include a primary donor CU and a primary donor DU, and the secondary donor node may include a secondary donor CU and a secondary donor DU.

According to the IAB node dual connectivity setup method provided in the first aspect, one IAB node sets up F1 interfaces with both a primary donor CU and a secondary donor CU. Before the IAB node is handed over from the primary donor CU to the secondary donor CU, because the IAB-DU has set up the F1 interface with the secondary donor CU in advance, after the IAB-DU is handed over to the secondary donor CU, F1 interface setup may not be triggered again. In this way, a latency for setting up the F1 interface between the IAB-DU and the secondary donor CU after the IAB node is handed over to the secondary donor CU is reduced, and a problem of service interruption caused by a latency existing when the IAB node is handed over to a donor node is avoided, thereby ensuring communication quality and improving communication efficiency.

In a possible implementation of the first aspect, the method further includes: The first IAB node sends first indication information to the secondary donor node, where the first indication information is used to indicate, to the secondary donor node, whether to start an operation of activating the serving cell, of the first IAB node, belonging to the secondary donor node. In this implementation, a latency when the IAB node is handed over to a donor CU can be reduced, and the problem of service interruption caused by the latency existing when the IAB node is handed over to a donor node is avoided, thereby ensuring communication quality.

Optionally, before the IAB node is handed over to the secondary donor CU, the first indication information is used to indicate the secondary donor node not to start the operation of activating the serving cell of the first IAB node.

Optionally, after the IAB node is handed over to the secondary donor CU, the first indication information is used to indicate the secondary donor node to start the operation of activating the serving cell of the first IAB node.

In a possible implementation of the first aspect, the method further includes: The first IAB node sends second indication information to the secondary donor node, where the second indication information includes an identifier of the serving cell that the first IAB node requests the secondary donor node to activate. In this implementation, the IAB-DU sends the second indication information to the secondary donor CU, and when the secondary donor CU starts an operation of activating serving cells, serving cells that need to be activated may be determined. In this way, normal communication in the serving cells that need to be activated and communication between the serving cells that need to be activated and the secondary donor node are ensured, thereby ensuring communication quality and avoiding service interruption caused by donor node handover.

In a possible implementation of the first aspect, the method further includes: The first IAB node sends first information to the secondary donor node, where the first information is used to request to allocate an IP address to the first IAB node. The first IAB node receives second information from the secondary donor node, where the second information includes at least one of an IP address allocated to the first IAB node, an IP address prefix allocated to the first IAB node, or first n bits of the IP address allocated to the first IAB node, where n is an integer greater than 0. In this implementation, after a donor DU to which the IAB node is attached changes, the IAB node may request a donor CU to which the IAB node is attached to allocate more IP addresses to the IAB node, to satisfy a requirement of communication between the IAB node and new donor nodes (for example, the donor CU and the donor DU). This can ensure normal communication between the IAB node and a target donor node, and ensure communication efficiency.

In a possible implementation of the first aspect, the first information includes at least one of a quantity of IP addresses requested to be allocated to the first IAB node, a length of the one or more IP address prefixes requested to be allocated to the first IAB node, or a value of n of first n bits of the IP address requested to be allocated to the first IAB node. In this implementation, the quantity of IP addresses requested to be allocated to the first IAB node is explicitly or implicitly indicated, so that flexibility of allocating the IP addresses to the first IAB node can be improved, and efficiency of allocating the IP addresses to the first IAB node can be improved.

In a possible implementation of the first aspect, a centralized unit CU of the secondary donor node includes a centralized unit-control plane CU-CP entity and a centralized unit-user plane CU-UP entity. The first information further includes at least one of a quantity of IP addresses requested to be allocated to an F1-C interface, a length of the one or more IP address prefixes requested to be allocated to the F1-C interface, a value of x of first x bits of the IP address requested to be allocated to the F1-C interface, a quantity of IP addresses requested to be allocated to an F1-U interface, a length of the one or more IP address prefixes requested to be allocated to the F1-U interface, or a value of y of first y bits of the IP address requested to be allocated to the F1-U interface, where the F1-C interface is a communication interface between the first IAB node and the CU-CP entity of the secondary donor node, the F1-U interface is a communication interface between the first IAB node and the CU-UP entity of the secondary donor node, and both x and y are integers greater than 0. In this implementation, a quantity of IP addresses that are requested to be allocated to the first IAB node and that are used for F1-C interface communication and F1-U interface communication is explicitly or implicitly indicated, so that flexibility of allocating the IP addresses to the first IAB node can be improved, and efficiency of allocating the IP addresses to the first IAB node can be improved. In addition, in an architecture in which a control plane and a user plane of the secondary donor CU are split, efficiency and quality of communication between the first IAB node and the CU-CP entity and between the first IAB node and the CU-UP entity are ensured.

In a possible implementation of the first aspect, the method further includes: The first IAB node receives third indication information from the secondary donor node, where the third indication information is used to indicate at least one of a first IP address used for the F1-U interface in the one or more IP addresses allocated to the first IAB node, a first IP address prefix used for the F1-U interface, first y bits of the first IP address used for the F1-U interface, a second IP address used for the F1-C interface in the one or more IP addresses allocated to the first IAB node, a second IP address prefix for the F1-C interface, or first x bits of the second IP address used for the F1-C interface. In this implementation, the first IAB node clearly knows the IP address used for F1-C interface communication and the IP address used for F1-U interface communication, so that in an architecture in which a control plane and a user plane of the secondary donor CU are split, efficiency and quality of communication between the first IAB node and the CU-CP entity and between the first IAB node and the CU-UP entity are ensured.

In a possible implementation of the first aspect, the secondary donor node includes a centralized unit CU and at least one distributed unit DU. The method further includes: The first IAB node receives fourth indication information from the secondary donor node, where the fourth indication information is used to indicate information that is about the DU of the secondary donor node and that corresponds to the IP address allocated to the first IAB node.

According to a second aspect, an IAB node dual connectivity setup method is provided. The method may be performed by a secondary donor node of a first IAB node, a centralized unit CU (secondary donor CU) of the secondary donor node of the first IAB node, or a chip used in the secondary donor node or the secondary donor CU. An IAB node may include a mobile terminal MT unit and a distributed unit DU, a primary donor node may include a primary donor CU and a primary donor DU, and the secondary donor node may include the secondary donor CU and a secondary donor DU. For example, the method is performed by the secondary donor node. The method includes: The secondary donor node receives, from a first IAB node, a request for setting up a second F1 interface with the secondary donor node, where the secondary donor node is a secondary donor node of the first IAB node. The secondary donor node sends, to the first IAB node, a response for setting up the second F1 interface, where the response includes information about the secondary donor node. When the secondary donor node sets up the second F1 interface with the first IAB node, the first IAB node maintains a first F1 interface with a primary donor node of the first IAB node.

According to the IAB node dual connectivity setup method provided in the second aspect, one IAB node (one IAB-DU) sets up F1 interfaces with both a primary donor CU and a secondary donor CU. Before the IAB node is handed over from the primary donor CU to the secondary donor CU, because the IAB-DU has set up the F1 interface with the secondary donor CU in advance, after the IAB-DU is handed over to the secondary donor CU, F1 interface setup may not be triggered again. In this way, a latency for setting up the F1 interface between the IAB-DU and the secondary donor CU after the IAB node is handed over to the secondary donor CU is reduced, and a problem of service interruption caused by a latency existing when the IAB node is handed over to a donor node is avoided, thereby ensuring communication quality and improving communication efficiency.

In a possible implementation of the second aspect, the method further includes: The secondary donor node receives first indication information from the first IAB node, where the first indication information is used to indicate, to the secondary donor node, whether to start an operation of activating a serving cell, of the first IAB node, belonging to the secondary donor node.

Optionally, before the IAB node is handed over to the secondary donor CU, the first indication information is used to indicate the secondary donor node not to start the operation of activating the serving cell of the first IAB node.

Optionally, after the IAB node is handed over to the secondary donor CU, the first indication information is used to indicate the secondary donor node to start the operation of activating the serving cell of the first IAB node.

In a possible implementation of the second aspect, the method further includes: The secondary donor node receives second indication information from the first IAB node, where the second indication information includes an identifier of the serving cell that the first IAB node requests the secondary donor node to activate. In this implementation, the IAB-DU sends the second indication information to the secondary donor CU, and when the secondary donor CU starts an operation of activating serving cells, serving cells that need to be activated may be determined. In this way, normal communication in the serving cells that need to be activated and communication between the serving cells that need to be activated and the secondary donor node are ensured, thereby ensuring communication quality and avoiding service interruption caused by donor node handover.

In a possible implementation of the second aspect, the method further includes: The secondary donor node receives first information from the first IAB node, where the first information is used to request to allocate an IP address to the first IAB node. The secondary donor node sends second information to the first IAB node, where the second information includes at least one of an IP address allocated to the first IAB node, an IP address prefix allocated to the first IAB node, or first n bits of the IP address allocated to the first IAB node, where n is an integer greater than 0.

In a possible implementation of the second aspect, the first information includes at least one of a quantity of IP addresses requested to be allocated to the first IAB node, a length of the one or more IP address prefixes requested to be allocated to the first IAB node, or a value of n of first n bits of the IP address requested to be allocated to the first IAB node. In this implementation, the quantity of IP addresses requested to be allocated to the first IAB node is explicitly or implicitly indicated, so that flexibility of allocating the IP addresses to the first IAB node can be improved, and efficiency of allocating the IP addresses to the first IAB node can be improved.

In a possible implementation of the second aspect, a centralized unit CU of the secondary donor node includes a centralized unit-control plane CU-CP entity and a centralized unit-user plane CU-UP entity. The first information further includes at least one of a quantity of IP addresses requested to be allocated to an F1-C interface, a length of the one or more IP address prefixes requested to be allocated to the F1-C interface, a value of x of first x bits of the IP address requested to be allocated to the F1-C interface, a quantity of IP addresses requested to be allocated to an F1-U interface, a length of the one or more IP address prefixes requested to be allocated to the F1-U interface, or a value of y of first y bits of the IP address requested to be allocated to the F1-U interface, where the F1-C interface is a communication interface between the first IAB node and the CU-CP entity of the secondary donor node, the F1-U interface is a communication interface between the first IAB node and the CU-UP entity of the secondary donor node, and both x and y are integers greater than 0. In this implementation, a quantity of IP addresses that are requested to be allocated to the first IAB node and that are used for F1-C interface communication and F1-U interface communication is explicitly or implicitly indicated, so that flexibility of allocating the IP addresses to the first IAB node can be improved, and efficiency of allocating the IP addresses to the first IAB node can be improved. In addition, in an architecture in which a control plane and a user plane of the secondary donor CU are split, efficiency and quality of communication between the first IAB node and the CU-CP entity and between the first IAB node and the CU-UP entity are ensured.

In a possible implementation of the second aspect, the method further includes: The secondary donor node sends third indication information to the first IAB node, where the third indication information is used to indicate at least one of a first IP address used for the F1-U interface in the one or more IP addresses allocated to the first IAB node, a first IP address prefix used for the F1-U interface, first y bits of the first IP address used for the F1-U interface, a second IP address used for the F1-C interface in the one or more IP addresses allocated to the first IAB node, a second IP address prefix used for the F1-C interface, or first x bits of the second IP address used for the F1-C interface.

In a possible implementation of the second aspect, the secondary donor node includes a centralized unit CU and at least one distributed unit DU. The method further includes: The secondary donor node sends fourth indication information to the first IAB node, where the fourth indication information is used to indicate information that is about the DU of the secondary donor node and that corresponds to the IP address allocated to the first IAB node.

In a possible implementation of the second aspect, the secondary donor node includes a centralized unit CU and a distributed unit DU. The method further includes: The CU of the secondary donor node sends the first information to the DU of the secondary donor node. The CU of the secondary donor node receives, from the DU of the secondary donor node, at least one of the IP address allocated to the first IAB node, the IP address prefix allocated to the first IAB node, or the first n bits of the IP address allocated to the first IAB node.

In a possible implementation of the second aspect, the method further includes: The secondary donor node receives a secondary station addition request message from the primary donor node, where the secondary station addition request message is used to request to add the secondary donor node as a secondary station of the first IAB node, and the secondary station addition request message includes at least one of indication information indicating that the first IAB node is a mobile IAB node, an identifier of a first IAB node group, member information of the first IAB node group, or topology information of the first IAB node group, where the first IAB node group is a group including the first IAB node and a child node of the first IAB node. In this implementation, a dual connectivity procedure is introduced before IAB node handover. In a process in which the IAB node adds a secondary station, a primary IAB donor sends information about an IAB node group to a secondary IAB donor, and sets up a user plane backhaul link between the IAB node and the secondary IAB donor in advance. When donor node handover is performed subsequently, only an identifier of the IAB node group needs to be notified to the secondary IAB donor in a handover request, to reduce a handover processing latency in a subsequent handover process.

In a possible implementation of the second aspect, the method includes: The secondary donor node sends a secondary station addition response message to the primary donor node, where the secondary station addition response message includes at least one of an IP address, of the first IAB node, anchored at the secondary donor node or an IP address of the secondary donor node.

In a possible implementation of the second aspect, the member information of the first IAB node group includes at least one of an identifier of the child node of the first IAB node, quality of service QoS information of a service of the child node of the first IAB node, or QoS information corresponding to a backhaul radio link control channel of the first IAB node under a topology of the primary donor node.

According to a third aspect, a method for adding a secondary station by an IAB node is provided. The method may be performed by a primary donor node of a first IAB node, a centralized unit CU (primary donor CU) of the primary donor node of the first IAB node, or a chip used in the primary donor node or the primary donor CU. The IAB node may include a mobile terminal MT unit and a distributed unit DU, the primary donor node may include the primary donor CU and a primary donor DU, and a secondary donor node may include a secondary donor CU and a secondary donor DU. For example, the method is performed by the primary donor node. The method includes: The primary donor node sends a secondary station addition request message to a first donor node, where the secondary station addition request message is used to request to add the first donor node as a secondary donor node of a first IAB node, and the primary donor node is a primary donor node of the first IAB node. The secondary station addition request message includes at least one of indication information indicating that the first IAB node is a mobile IAB node, an identifier of a first IAB node group, member information of the first IAB node group, or topology information of the first IAB node group, where the first IAB node group is a group including the first IAB node and a child node of the first IAB node. The primary donor node receives a secondary station addition response message from the first donor node. The primary donor node sends seventh indication information to the first IAB node, where the seventh indication information is used to indicate the first IAB node to add the first donor node as the secondary donor node.

According to the method for adding a secondary station by an IAB node provided in the third aspect, a dual connectivity procedure is introduced before IAB node handover. In a process in which the IAB node adds a secondary station, a primary IAB donor sends information about an IAB node group to a first IAB donor, and sets up a user plane backhaul link between the IAB node and the first IAB donor. When donor node handover is performed subsequently, only an identifier of the IAB node group needs to be notified to the first donor node in a handover request, to reduce a handover processing latency in a subsequent handover process.

In a possible implementation of the third aspect, the member information of the first IAB node group includes at least one of an identifier of the child node of the first IAB node, quality of service QoS information of a service of the child node of the first IAB node, or QoS information corresponding to a backhaul radio link control channel of the first IAB node under a topology of the primary donor node.

In a possible implementation of the third aspect, the secondary station addition response message of the first donor node includes at least one of an IP address, of the first IAB node, anchored at the first donor node or an IP address of the first donor node.

In a possible implementation of the third aspect, the method further includes: The primary donor node sends a handover request message to the first donor node, where the handover request message includes the identifier of the first IAB node group. The primary donor node receives a handover response message from the first donor node, where the handover response message is used to indicate the first IAB node to be handed over to the first donor node. In this implementation, a primary IAB donor has sent information about an IAB node group to a first IAB donor, and sets up a user plane backhaul link between the IAB node and the first IAB donor. Therefore, when donor node handover is performed, only an identifier of the IAB node group needs to be notified to the first donor node in a handover request, to reduce a handover processing latency in a subsequent handover process.

In a possible implementation of the third aspect, the method further includes: The primary donor node sends, to the first IAB node, an IP address, of the first IAB node, anchored at the first donor node and/or configuration information of a serving cell, of the first IAB node, belonging to the first donor node.

According to a fourth aspect, a method for reporting support of an IAB function is provided, where the method is applied to an IAB communication network. The IAB communication network includes an IAB donor node, and the IAB donor node includes a centralized unit CU and at least one distributed unit DU. The CU includes a centralized unit-control plane CU-CP entity and a centralized unit-user plane CU-UP entity. The method includes: The CU-UP entity of the donor node generates fifth indication information, where the fifth indication information is used to indicate that the CU-UP entity of the donor node supports an IAB function or supports access of an IAB node. The CU-UP entity of the donor node sends the fifth indication information to the CU-CP entity of the donor node.

According to the method for reporting support of an IAB function provided in the fourth aspect. When selecting CU-UP entities of the donor node to perform data transmission, the CU-CP entity of the donor node can accurately select CU-UP entities that are of the donor node and that support IAB, and use the CU-UP entities of the donor node to perform routing and bearer mapping before sending data, so as to ensure normal user-plane transmission and ensure quality and efficiency of data transmission of a terminal device.

Optionally, if a CU-UP entity of the donor node supports attaching or can attach a DSCP/flow label to data of the terminal device, the CU-UP entity of the donor node supports the IAB function or supports access of the IAB node.

In a possible implementation of the fourth aspect, the fifth indication information performs indication based on each public land mobile network PLMN. In this implementation, flexibility of indicating that the CU-UP entity supports the IAB function or supports access of the IAB node can be improved, and signaling overheads can be reduced.

In a possible implementation of the fourth aspect, that the CU-UP entity of the donor node sends the fifth indication information to the CU-CP entity of the donor node includes: The CU-UP entity of the donor node sends an E1 interface setup request to the CU-CP entity of the donor node, where the E1 interface setup request includes the fifth indication information, and an E1 interface is an interface between the CU-UP entity of the donor node and the CU-CP entity of the donor node. In this implementation, the CU-UP entity of the donor node actively triggers E1 interface setup, and carries, in an E1 interface setup request message, indication information indicating that the CU-UP entity of the donor node supports the IAB function, supports access of the IAB node, or supports IAB, to help the CU-CP entity of the donor node select an appropriate CU-UP entity of the donor node, and improve resource utilization.

In a possible implementation of the fourth aspect, the method further includes: The CU-UP entity of the donor node receives the E1 interface setup request from the CU-CP entity of the donor node, where the E1 interface is an interface between the CU-UP entity of the donor node and the CU-CP entity of the donor node. That the CU-UP entity of the donor node sends the fifth indication information to the CU-CP entity of the donor node includes: The CU-UP entity of the donor node sends an E1 interface setup response to the CU-CP entity of the donor node, where the E1 interface setup response includes the fifth indication information. In this implementation, resource utilization can be improved.

In a possible implementation of the fourth aspect, the method further includes: The CU-UP entity of the donor node receives sixth indication information from the CU-CP entity of the donor node, where the sixth indication information is used to indicate the CU-UP entity of the donor node to report a capability that the CU-UP entity of the donor node supports the IAB function or access of the IAB node.

According to a fifth aspect, a method for obtaining an IP address of an IAB node is provided. The method may be performed by a donor node of a first IAB node, a centralized unit CU of the donor node of the first IAB node, or a chip used in the donor node or the donor CU. The first IAB node may include a mobile terminal MT unit and a distributed unit DU, and the donor node may include the donor CU and a donor DU. For example, the method is performed by the donor node. The method includes: The donor node receives first information from a first IAB node, where the first information is used to request to allocate one or more IP addresses to the first IAB node. The donor node sends second information to the first IAB node, where the second information includes the one or more IP addresses allocated to the first IAB node, one or more IP address prefixes allocated to the first IAB node, or first n bits of the IP address allocated to the first IAB node, where n is an integer greater than 0.

According to the method for obtaining an IP address of an IAB node provided in the fifth aspect, when the IAB node needs to obtain more IP addresses, the IAB node may request a donor CU to which the IAB node is attached to allocate more IP addresses to the IAB node, to satisfy a requirement of communication between the IAB node and new donor nodes (for example, a donor CU and a donor DU). This can ensure normal communication between the IAB node and a target donor node, and ensure communication efficiency.

In a possible implementation of the fifth aspect, the first information includes at least one of a quantity of IP addresses requested to be allocated to the first IAB node, a length of the one or more IP address prefixes requested to be allocated to the first IAB node, or a value of n of first n bits of the IP address requested to be allocated to the first IAB node.

In a possible implementation of the fifth aspect, a centralized unit CU of the donor node includes a centralized unit-control plane CU-CP entity and a centralized unit-user plane CU-UP entity. The first information further includes at least one of a quantity of IP addresses requested to be allocated to an F1-C interface, a length of the one or more IP address prefixes requested to be allocated to the F1-C interface, a value of x of first x bits of the IP address requested to be allocated to the F1-C interface, a quantity of IP addresses requested to be allocated to an F1-U interface, a length of the one or more IP address prefixes requested to be allocated to the F1-U interface, or a value of y of first y bits of the IP address requested to be allocated to the F1-U interface, where the F1-C interface is a communication interface between the first IAB node and the CU-CP entity of the donor node, the F1-U interface is a communication interface between the first IAB node and the CU-UP entity of the donor node, and both x and y are integers greater than 0.

In a possible implementation of the fifth aspect, the method further includes: The donor node sends third indication information to the first IAB node, where the third indication information is used to indicate at least one of a first IP address used for the F1-U interface in the one or more IP addresses allocated to the first IAB node, a first IP address prefix used for the F1-U interface, first y bits of the first IP address used for the F1-U interface, a second IP address used for the F1-C interface in the one or more IP addresses allocated to the first IAB node, a second IP address prefix used for the F1-C interface, or first x bits of the second IP address used for the F1-C interface.

In a possible implementation of the fifth aspect, the donor node includes a centralized unit CU and at least one distributed unit DU. The method further includes: The donor node sends fourth indication information to the first IAB node, where the fourth indication information is used to indicate information that is about the DU of the donor node and that corresponds to the one or more IP addresses allocated to the first IAB node.

In a possible implementation of the fifth aspect, the donor node includes a centralized unit CU and a distributed unit DU. The method further includes: The CU of the donor node sends the first information to the DU of the donor node.

The CU of the donor node receives, from the DU of the donor node, at least one of the one or more IP addresses allocated to the first IAB node, the one or more IP address prefixes allocated to the first IAB node, or the first n bits of the IP address allocated to the first IAB node.

According to a sixth aspect, a communication apparatus is provided. The apparatus includes units configured to perform the steps in any one of the first aspect or the possible implementations of the first aspect.

According to a seventh aspect, a communication apparatus is provided. The apparatus includes units configured to perform the steps in any one of the second aspect and the third aspect or the possible implementations of the second aspect and the third aspect, or the apparatus includes units configured to perform the steps in any one of the fifth aspect or the possible implementations of the fifth aspect.

According to an eighth aspect, a communication apparatus is provided. The apparatus includes units configured to perform the steps in any one of the fourth aspect or the possible implementations of the fourth aspect.

According to a ninth aspect, a communication apparatus is provided. The apparatus includes at least one processor and a memory, and the at least one processor is configured to perform the method in any one of the first aspect or the possible implementations of the first aspect.

According to a tenth aspect, a communication apparatus is provided. The apparatus includes at least one processor and a memory, and the at least one processor is configured to perform the method in any one of the second aspect or the possible implementations of the second aspect, the at least one processor is configured to perform the method in any one of the third aspect or the possible implementations of the third aspect, or the at least one processor is configured to perform the method in any one of the fifth aspect or the possible implementations of the fifth aspect.

According to an eleventh aspect, a communication apparatus is provided. The apparatus includes at least one processor and a memory, and the at least one processor is configured to perform the method in any one of the fourth aspect or the possible implementations of the fourth aspect.

According to a twelfth aspect, a communication apparatus is provided. The apparatus includes at least one processor and an interface circuit, and the at least one processor is configured to perform the method in any one of the first aspect or the possible implementations of the first aspect.

According to a thirteenth aspect, a communication apparatus is provided. The apparatus includes at least one processor and an interface circuit, and the at least one processor is configured to perform the method in any one of the second aspect or the possible implementations of the second aspect, the at least one processor is configured to perform the method in any one of the third aspect or the possible implementations of the third aspect, or the at least one processor is configured to perform the method in any one of the fifth aspect or the possible implementations of the fifth aspect.

According to a fourteenth aspect, a communication apparatus is provided. The apparatus includes at least one processor and an interface circuit, and the at least one processor is configured to perform the method in any one of the fifth aspect or the possible implementations of the fifth aspect.

According to a fifteenth aspect, an IAB node is provided. The IAB node includes the communication apparatus provided in the sixth aspect, the IAB node includes the communication apparatus provided in the ninth aspect, or the IAB node includes the communication apparatus provided in the twelfth aspect.

According to a sixteenth aspect, an IAB donor node is provided. The IAB donor node includes the communication apparatus provided in the seventh aspect, the IAB donor node includes the communication apparatus provided in the tenth aspect, or the IAB donor node includes the communication apparatus provided in the thirteenth aspect.

According to a seventeenth aspect, a CU-CP entity of a donor node is provided. The CU-CP entity of the donor node includes the communication apparatus provided in the eighth aspect, the CU-CP entity of the donor node includes the communication apparatus provided in the eleventh aspect, or the CU-CP entity of the donor node includes the communication apparatus provided in the fourteenth aspect.

According to an eighteenth aspect, a computer program product is provided. The computer program product includes a computer program, and when the computer program is executed by a processor, the computer program is configured to perform the method in any one of the first aspect to the fifth aspect or the possible implementations of the first aspect to the fifth aspect.

According to a nineteenth aspect, a computer-readable storage medium is provided. The computer-readable storage medium stores a computer program, and when the computer program is executed, the computer program is configured to perform the method in any one of the first aspect to the fifth aspect or the possible implementations of the first aspect to the fifth aspect.

According to a twentieth aspect, a communication system is provided. The communication system includes the foregoing IAB node and IAB donor node.

According to a twenty-first aspect, a chip is provided. The chip includes a processor, configured to invoke a computer program from a memory and run the computer program, so that a communication device on which the chip is installed performs the method in any one of the first aspect to the fifth aspect or the possible implementations of the first aspect to the fifth aspect, or performs the method in any one of the second aspect or the possible implementations of the second aspect.

According to an IAB node dual connectivity setup method in embodiments of this application, one IAB node sets up F1 interfaces with both a primary donor CU and a secondary donor CU. Before the IAB node is handed over from the primary donor CU to the secondary donor CU, because the IAB-DU has set up the F1 interface with the secondary donor CU in advance, after the IAB-DU is handed over to the secondary donor CU, F1 interface setup may not be triggered again. In this way, a latency for setting up the F1 interface between the IAB-DU and the secondary donor CU after the IAB node is handed over to the secondary donor CU is reduced, and a problem of service interruption caused by a latency existing when the IAB node is handed over to a donor node is avoided, thereby ensuring communication quality and improving communication efficiency.

DESCRIPTION OF EMBODIMENTS

Figure 1:
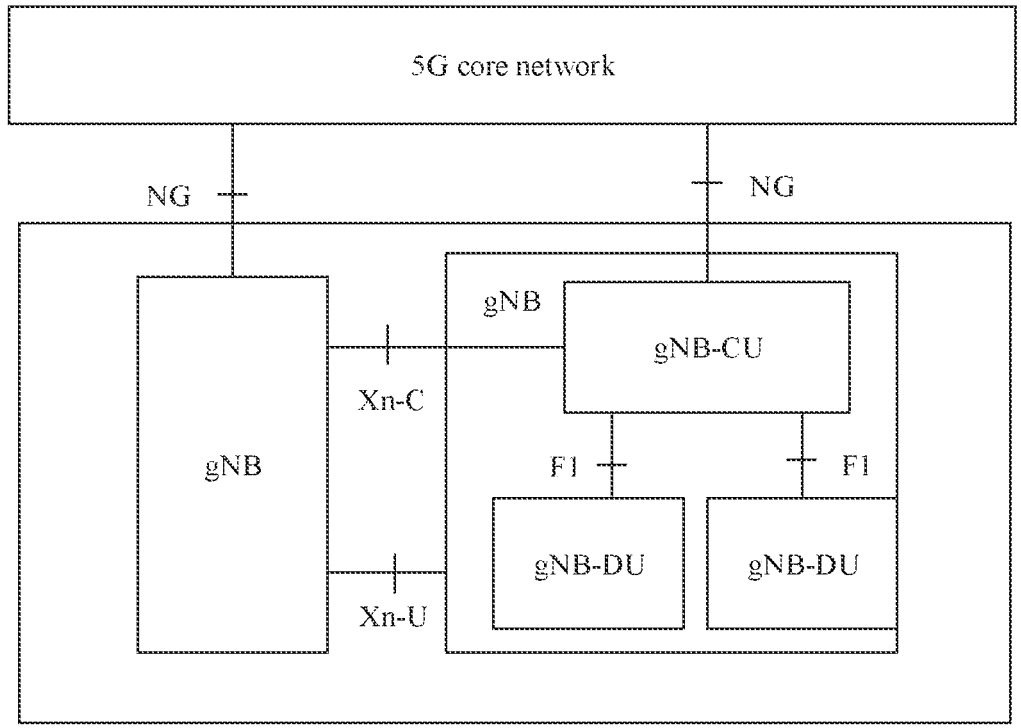
FIG. 1 is a schematic diagram of a gNB using a CU-DU split structure.

The following describes technical solutions in this application with reference to the accompanying drawings.

The technical solutions in embodiments of this application may be applied to various communication systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system, or a new radio (NR) system.

A terminal device in embodiments of this application may be user equipment, an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in the future 5G network, a terminal device in a future evolved public land mobile communication network (PLMN), or the like. This is not limited in embodiments of this application.

A network device in embodiments of this application may be a device configured to communicate with the terminal device. The network device may be a base transceiver station (BTS) in the global system for mobile communications (GSM) system or the code division multiple access (CDMA) system, a NodeB (NB) in the wideband code division multiple access (WCDMA) system, an evolved NodeB (eNB or eNodeB) in the LTE system, a new radio NodeB (gNB), or a radio controller in a cloud radio access network (CRAN) scenario. Alternatively, the network device may be a relay node, an access point, a vehicle-mounted device, a wearable device, a network device in the future 5G network, a network device in the future evolved PLMN network, or the like. This is not limited in embodiments of this application.

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device or the network device, or a function module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

In an NR technology, an access network device (for example, a gNB) may include one gNB centralized unit (CU) and one or more gNB distributed units (DUs). The gNB-CU and the gNB-DU are different logical nodes, and may be deployed on different physical devices or deployed on a same physical device.

A CU-DU split structure used by the gNB is shown in FIG. 1. The gNB-CU is connected to the gNB-DU through an F1 interface, the gNB-CU is connected to a 5G core network through an NG interface, and gNBs are connected to each other through an Xn interface. The Xn interface includes an Xn-C interface and an Xn-U interface. The Xn-C interface is used to transmit control plane signaling between the two gNBs, and the Xn-U interface is used to transmit user plane data between the two gNBs. An interface between the gNB and UE is referred to as a Uu interface (namely, an interface between the UE and the gNB-DU). The terminal device accesses the gNB-CU through the gNB-DU. A peer physical (PHY) layer/media access control (MAC) layer/radio link control (RLC) layer of the terminal device is located on the gNB-DU, and a peer packet data convergence protocol (PDCP) layer/radio resource control (RRC) layer/service data adaptation protocol (SDAP) layer of the terminal device is located on the gNB-CU.

It should be understood that, the foregoing deployment of the protocol layers on the gNB-DU and the gNB-CU is merely one possibility, and the protocol layers may be deployed in another manner. For example, the peer PHY layer/MAC layer of the terminal device is located on the gNB-DU, the peer PDCP layer/RRC layer/SDAP layer of the terminal device is located on the gNB-CU, and the peer RLC layer of the terminal device is also located on the gNB-CU. All these fall within the protection scope of this application, and are not limited herein in this application.

For a control plane, in an uplink (UL) direction, the gNB-DU encapsulates, into an F1 application protocol (F1AP) message of the F1 interface, an RRC message generated by the terminal device, and sends the F1AP message to the gNB-CU. In a downlink (DL) direction, the gNB-CU encapsulates the RRC message into the F1 AP message and sends the F1AP message to the gNB-DU. The gNB-DU extracts the RRC message from the FLAP message, maps the RRC message to a signaling radio bearer (SRB) corresponding to the Uu interface, and sends the signaling radio bearer to the terminal device.

For a user plane, in a UL direction, the gNB-DU maps, to a corresponding general packet radio service tunneling protocol (GTP) tunnel, a data packet that is of the terminal device and that is received from a data radio bearer (DRB) of the Uu interface, and sends the GTP tunnel to the gNB-CU. In a DL direction, the gNB-CU maps the data packet of the terminal device to the corresponding GTP tunnel and sends the GTP tunnel to the gNB-DU. The gNB-DU extracts the data packet of the terminal device from the GTP tunnel, maps the data packet to the DRB corresponding to the Uu interface, and sends the DRB to the terminal device.

If an architecture in which the control plane and the user plane are split is considered, the gNB-CU may be further divided into a centralized unit-control plane (CU-CP) entity (or may be referred to as a CU-CP node) and a centralized unit-user plane (CU-UP) entity (or may be referred to as a CU-UP node). The gNB-CU-CP is a control plane entity, and is configured to provide signaling control. The gNB-CU-UP is a user plane entity, and is configured to provide transmission of data of the terminal device. The gNB-CU-CP is connected to the gNB-CU-UP through an E1 interface, the gNB-CU-CP is connected to the gNB-DU through an F1-C interface, and the gNB-CU-UP is connected to the gNB-DU through an F1-U interface. A structure is shown in FIG. 2.

Figure 2:
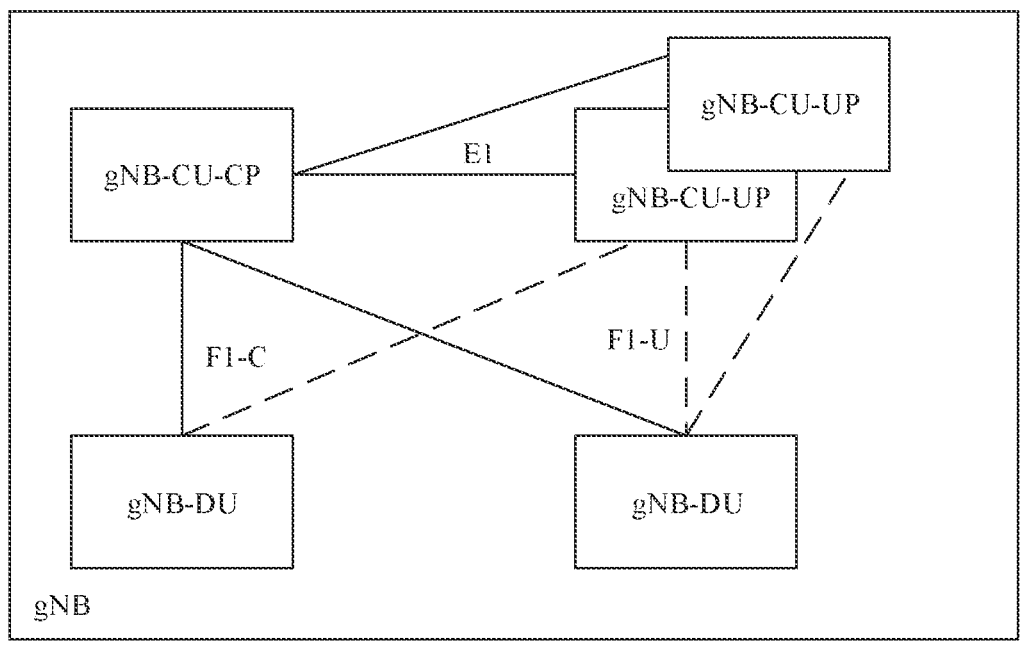
FIG. 2 is a schematic diagram of an architecture in which a gNB-CU-CP and a gNB-CU-UP are split.

FIG. 2 shows an architecture in which the gNB-CU-CP and the gNB-CU-UP are split. The gNB-CU-CP includes an RRC function and a PDCP control plane function (for example, configured to process data on a signaling radio bearer). The gNB-CU-UP mainly includes an SDAP function and a PDCP user plane function (for example, configured to process data on a radio bearer of the user equipment/an IAB node).

In the architecture shown in FIG. 2, the following characteristics are further included:
 one gNB includes one gNB-CU-CP, a plurality of gNB-CU-UPs, and a plurality of gNB-DUs;
 one DU can be connected only to one gNB-CU-CP;
 one CU-UP can be connected only to one gNB-CU-CP;
 one DU can be connected to a plurality of gNB-CU-UPs under control of a same CU-CP; and
 one CU-UP can be connected to a plurality of gNB-DUs under control of a same CU-CP.

It should be understood that, FIG. 2 is only an example and should not impose any limitation on the gNB architecture. For example, in an architecture in which a CU and a DU are split and a CP and a UP are split, the gNB may include only one gNB-CU-UP, one gNB-CU-CP, and one gNB-DU, or may include more gNB-CU-UPs and gNB-DUs. This is not limited herein in this application.

A 5G communication system imposes stricter requirements on various network performance indicators in an all-round manner. For example, a capacity indicator is increased by 1000 times, wider coverage is required, and ultra-high reliability and an ultra-low latency are required. Therefore, an integrated access and backhaul (IAB) technology is introduced.

In an IAB network, a relay node (RN), or may be referred to as an IAB node, may provide a wireless access service and a wireless backhaul service for the user equipment. Specifically, service data of the user equipment is transmitted by the IAB node to an IAB donor node through a wireless backhaul link. The IAB donor node may also be referred to as a donor IAB node or an IAB donor base station. In an NR system, the IAB donor base station may be a donor gNodeB (DgNB). In an LTE system (or referred to as a 4G system), the IAB donor base station may be a donor eNodeB (DeNB). Certainly, the IAB donor node may alternatively be referred to as a gNB, an eNB, or an IAB donor for short.

The IAB donor may alternatively use a CU-DU split architecture. To be specific, the IAB donor includes an IAB donor CU (or may be referred to as a donor CU) and an IAB donor DU (or may be referred to as a donor DU). An interface between the IAB donor CU and the IAB donor DU is an F1 interface. The IAB node may include a mobile terminal (MT) unit and a distributed unit (DU). The IAB-MT may also be referred to as IAB-UE, has a function of the terminal device, and mainly completes an operation similar to that of the terminal device. The IAB-DU has some functions of a base station, and mainly completes an operation similar to that of the base station.

For the IAB donor, the donor DU has a function similar to that of the gNB-DU in NR, and the donor CU has a function similar to that of the gNB-CU in NR.

For the IAB node, the IAB-DU has a function similar to that of the gNB-DU in NR, and provides an access service for a child node of the IAB-DU. The child node of the IAB-DU may be a terminal device, or may be another IAB node. The IAB-MT is similar to the terminal device, and is configured to provide data backhaul. An IAB node accessed by the terminal device may be referred to as an access IAB node, and an IAB node on a path between the access IAB node and the IAB donor is referred to as an intermediate IAB node.

Figure 3:
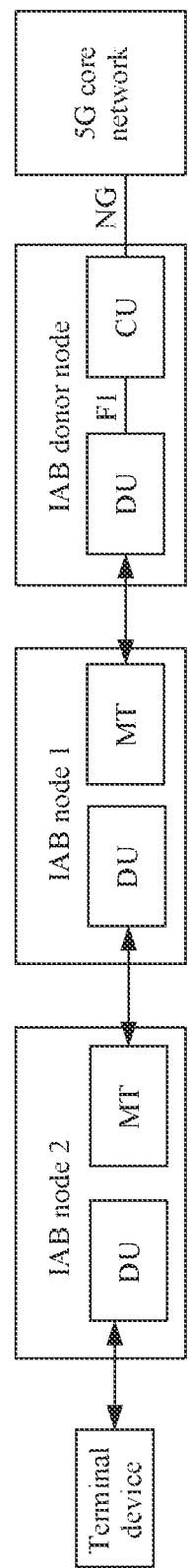
FIG. 3 is a schematic diagram of data transmission performed by a terminal device through two-hop data backhaul (BH)
Figure 4:
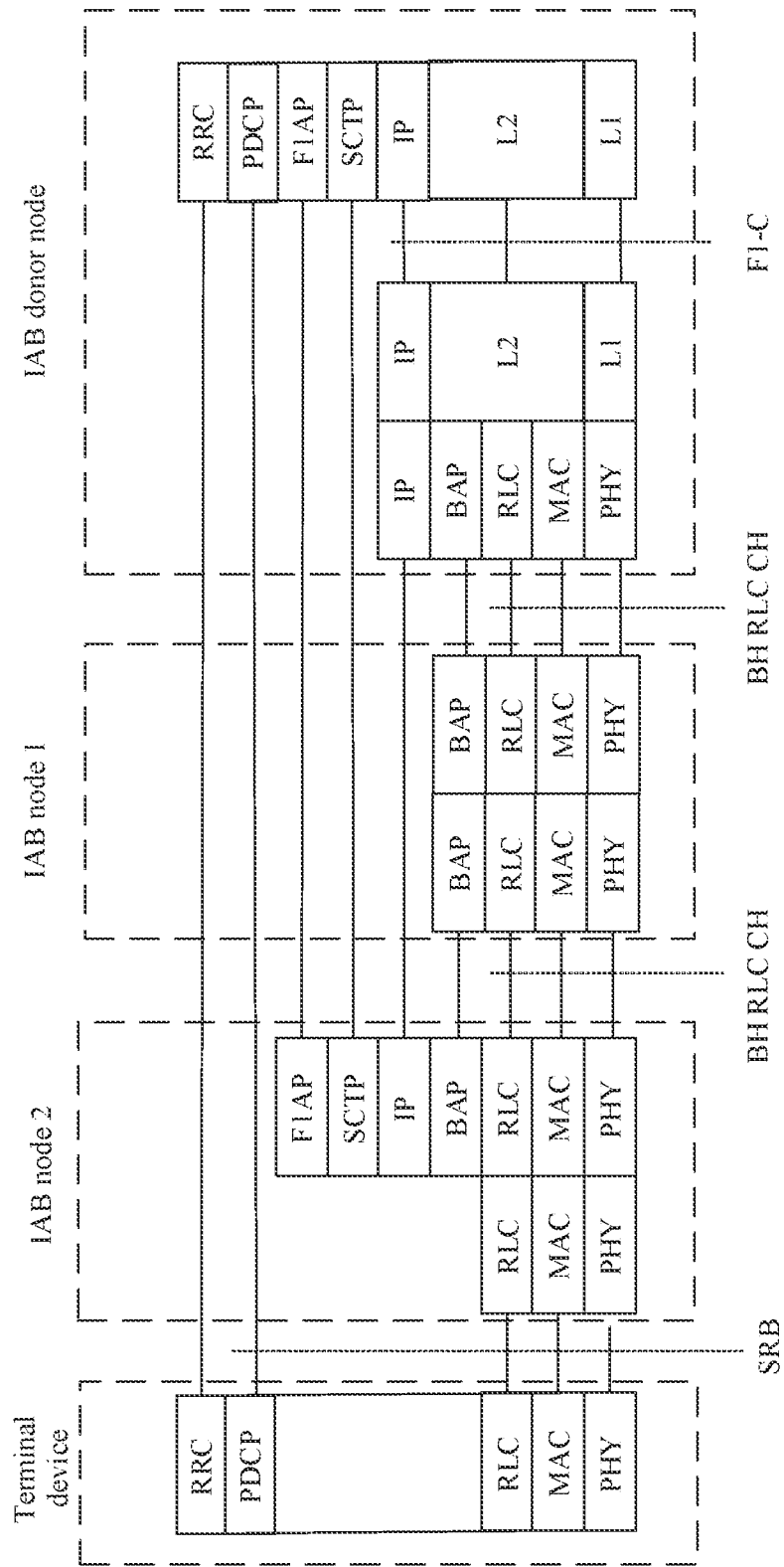
FIG. 4 is a schematic diagram of a control plane protocol stack during two-hop data backhaul.

A two-hop data backhaul (BH) scenario is used as an example. As shown in FIG. 3, a terminal device accesses an IAB node 2. In this case, the IAB node 2 is referred to as an access IAB node (or a previous-hop parent node of the terminal device), and the terminal device is referred to as a next-hop child node of the IAB node 2. An IAB node 1 is referred to as an intermediate IAB node, in other words, a previous-hop parent node of the IAB node 1 is an IAB donor node, or a next-hop child node of the IAB donor is the IAB node 1. A next-hop child node of the IAB node 1 is the IAB node 2. A peer PHY layer, MAC layer, and RLC layer of the terminal device are located on the access IAB node (namely, on a DU of the IAB node 2), and a peer PDCP layer, SDAP layer, and RRC layer of the terminal device are located on a donor CU. An IAB node uses a layer 2 (L2) data forwarding architecture. The following shows a specific user plane protocol stack and a specific control plane protocol stack:

FIG. 4 is a schematic diagram of a control plane protocol stack during two-hop data backhaul. As shown in FIG. 4, an access IAB node (namely, a DU of an IAB node 2) encapsulates, into an F1 AP message, an RRC message generated by a terminal device, and sends the F1 AP message to a donor CU. If the donor CU uses a CP-UP split architecture, the DU of the IAB node 2 encapsulates, into the F1AP message, the RRC message generated by the terminal device and sends the F1AP message to a donor CU-CP. An interface between the DU of the IAB node 2 and the donor CU-CP is also referred to as an F1-C interface.

Figure 5:
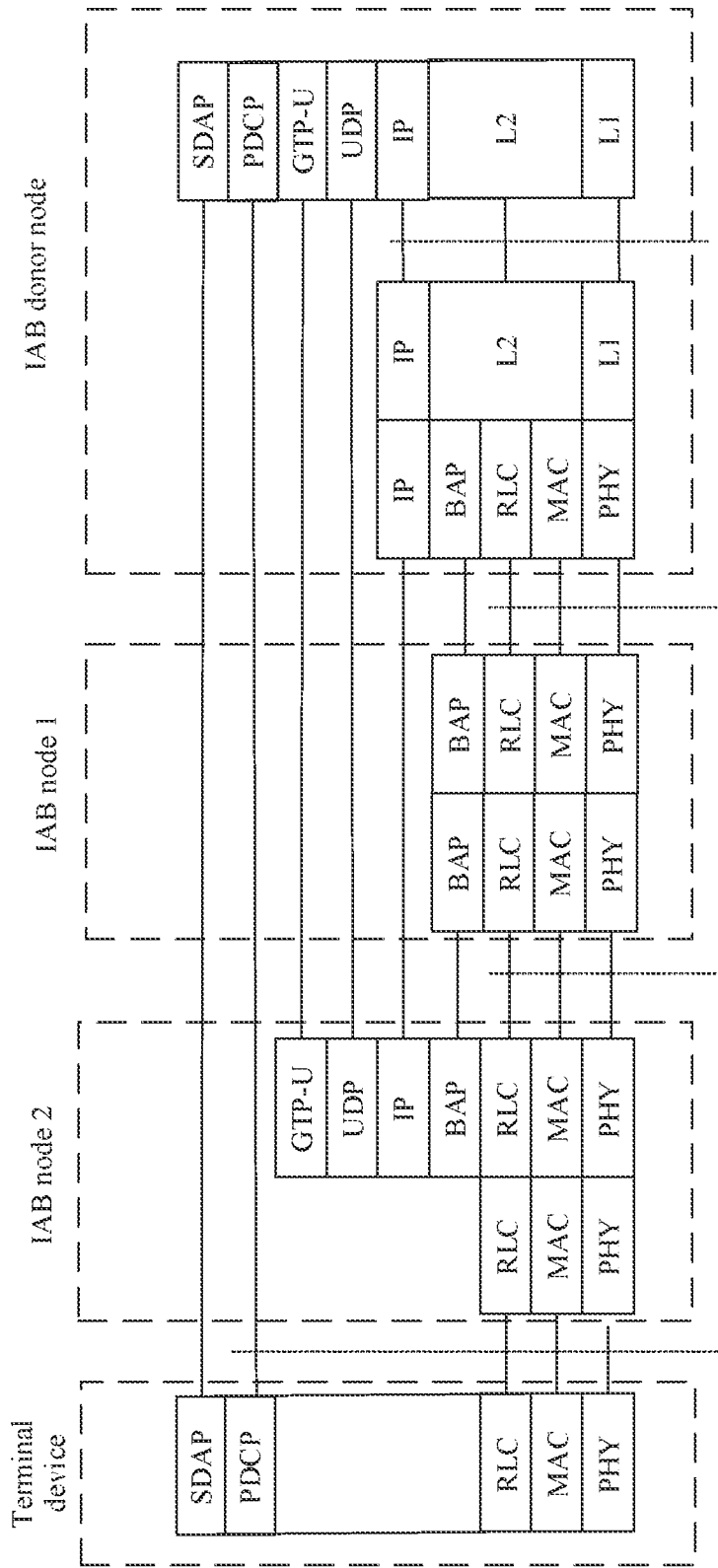
FIG. 5 is a schematic diagram of a user plane protocol stack during two-hop data backhaul.

FIG. 5 is a schematic diagram of a user plane protocol stack during two-hop data backhaul. As shown in FIG. 5, a corresponding GTP tunnel (a GTP tunnel per UE bearer) is set up, for a service bearer of each terminal device, between an access IAB node (namely, a DU of an IAB node 2) and a donor CU. If the donor CU uses a CP-UP split architecture, the DU of the IAB node 2 sends a service of the terminal device to a donor CU-UP through the corresponding GTP tunnel. An interface between the DU of the IAB node 2 and the donor CU-UP is also referred to as an F1-U interface.

Currently, once an IAB node is deployed, the IAB node does not move, and mobility of the IAB node is not considered. With network development, a mobile network scenario is one of important scenarios of 5G. Because the IAB node can provide wireless backhaul, the IAB node is suitable for improving network coverage and capacities in the mobile scenario. In the scenario, because the IAB node is deployed on a mobile device (for example, a high-speed railway, a car, or a subway) and moves with the mobile device, the IAB node may be referred to as a mobile IAB node.

Regardless of a mobile IAB node or a fixed IAB node (namely, an IAB node that does not move), provided that an IAB donor node connected to the IAB node changes, the IAB node may be referred to as a handover IAB node. To reduce a problem of a signaling storm caused by the handover IAB node in a handover process (when an IAB node is handed over, child nodes of the IAB node need to be handed over together with the IAB node, and a signaling storm is caused by independent handover procedures triggered by the child nodes of the IAB node), the handover IAB node and a child node of the handover IAB node may be considered as a group. The group may be referred to as an IAB node group or a handover IAB node group. In other words, in the group, the handover IAB node may be used as a head node, and the child node of the handover IAB node is handed over together with the head node. For example, when the handover IAB node is handed over to an IAB donor node, the child node of the handover IAB node is handed over together with the handover IAB node. However, in the handover process, a topology relationship between the handover IAB node and the child node of the handover IAB node remains unchanged.

Currently, in the handover process of the IAB node group, an IAB node (or may be referred to as a mobile IAB node) can communicate with only one previous-hop IAB donor node at any moment. An example in which an IAB node is handed over from a source donor node to a target donor node is used for description. The source donor node includes a source donor CU and a source donor DU, the target donor node includes a target donor CU and a target donor DU, and the IAB node includes an IAB-MT and an IAB-DU.

A main process in which the IAB node is handed over from the source donor node to the target donor node includes:

The IAB node (specifically, the IAB-MT) and a child node (for example, a terminal device) of the IAB node are used as a group. In other words, in a handover preparation process, the source donor CU migrates context information of the IAB node and context information of the child node of the IAB node to the target donor CU together.

Further, the target donor CU generates RRC configuration information for the child node of the IAB node, where the RRC configuration information includes configuration information of a PDCP layer of the terminal device and a new security parameter (a security algorithm and/or a parameter for deriving a new air interface key by the terminal device) selected for transmitting data of the terminal device in an air interface, and sends the RRC configuration information to the terminal device through the source donor CU.

The target donor CU generates handover command information for the IAB-MT, and indicates, through the source donor CU, the IAB-MT to execute a handover process.

After the IAB-MT is handed over to the target donor CU, the IAB-DU triggers setup of a stream control transmission protocol (SCTP) association with the target donor CU.

The IAB-DU triggers setup of an F1 interface with the target donor CU.

Corresponding GTP tunnels are set up between the IAB-DU and the target donor CU for different bearers of the terminal device. In this way, the IAB node can resume data transmission of the child node of the IAB node.

Although the foregoing solution can avoid the problem of the signaling storm caused in the process in which the IAB node is handed over to a donor node, a latency when the child node of the IAB node resumes data transmission is still long. Once a handover or re-setup procedure occurs on the IAB node to which the IAB-DU belongs, a connected donor CU changes. In this case, the IAB-DU needs to delete an F1 interface between the IAB-DU and the source donor CU and re-set up an F1 interface between the IAB-DU and the target donor CU. In other words, data transmission can be resumed only after a new F1 interface is set up between the IAB-DU and the target donor CU and corresponding GTP tunnels are set up for different bearers of the child node of the IAB node. This generates a long handover latency, and the long handover latency causes a problem of service interruption. Consequently, communication quality is severely affected and communication efficiency is reduced.

In view of this, this application provides an IAB node dual connectivity setup method. Before an IAB node is handed over to a donor node, a dual connectivity procedure is introduced. To be specific, the IAB node is connected to both a source donor node and a secondary donor node, and an F1 interface between the IAB node and the secondary donor node is set up for the IAB node in advance. In this way, after the IAB node is handed over to the secondary donor node, there is no need to trigger a procedure of setting up the F1 interface with the secondary donor node, to reduce a latency generated when the IAB node is handed over to the donor node, ensure communication quality, and improve communication efficiency.

For ease of understanding embodiments of this application, a communication system applicable to embodiments of this application is first briefly described with reference to FIG. 6.

Figure 6:
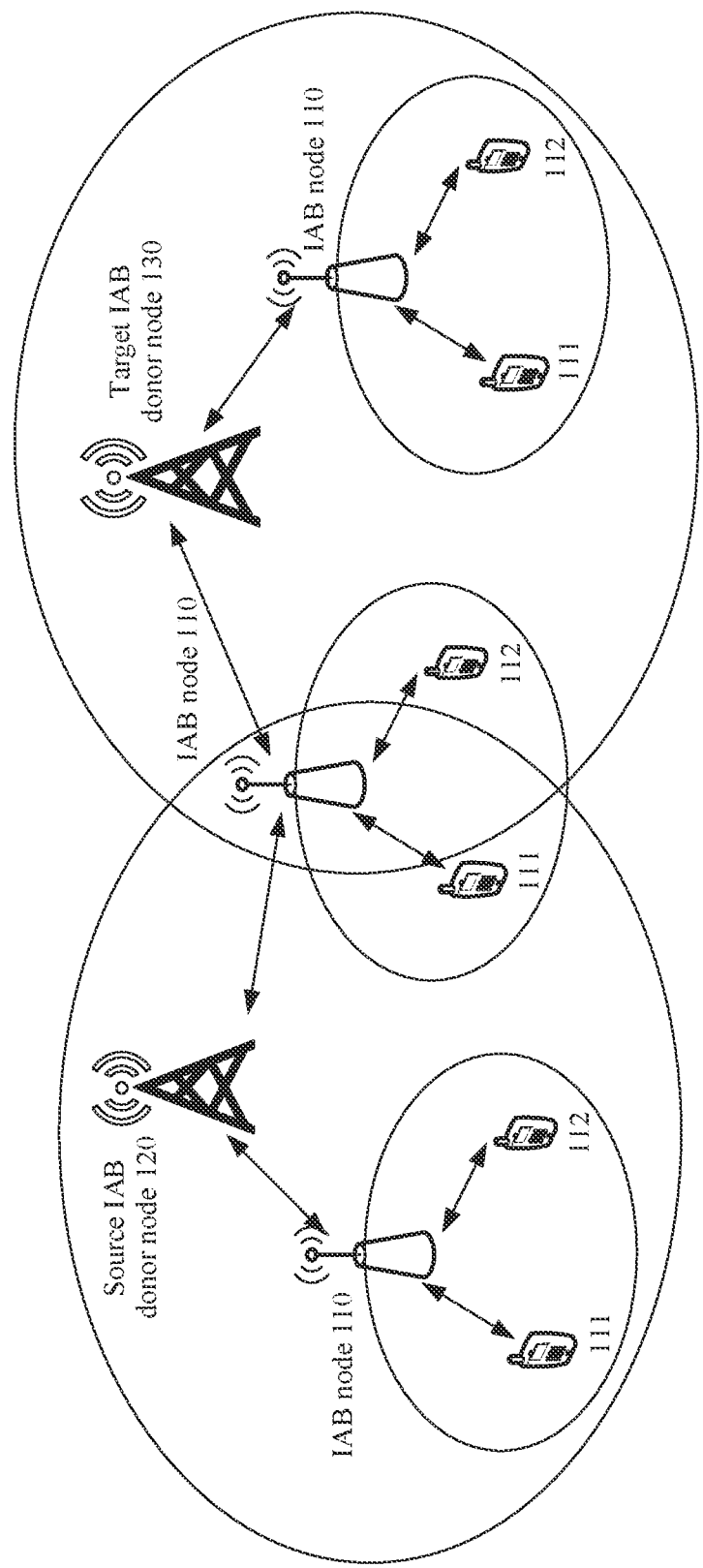
FIG. 6 is a schematic diagram of a communication system applicable to an embodiment of this application.

FIG. 6 is a schematic diagram of a communication system applicable to an embodiment of this application. As shown in FIG. 6, the mobile communication system 100 may include a mobile IAB node 110, a source IAB donor node 120, and a target IAB donor node 130. Child nodes of the mobile IAB node 110 include a terminal device 111 and a terminal device 112. First, the mobile IAB node is in coverage of the source IAB donor node, and accesses the source IAB donor node. Second, as the mobile IAB node moves, the mobile IAB node enters an overlapping area covered by the source IAB donor node and the target IAB donor node. The mobile IAB node may start a dual connectivity operation, and access both the source IAB donor node and the target IAB donor node. In other words, the source IAB donor node is used as a primary IAB donor node, and the target IAB donor node is used as a secondary IAB donor node. Then, as the mobile IAB node moves, the mobile IAB node enters coverage of the target IAB donor node. In this case, the mobile IAB node executes a handover process of handover from a dual-connectivity state in which the mobile IAB node is connected to both the source IAB donor node and the target IAB donor node to a single-connectivity state in which the mobile IAB node is connected only to the target IAB donor node. In a process in which the mobile IAB node is handed over from the source IAB donor node to the target IAB donor node, the IAB node dual connectivity setup method provided in this application may be used to for donor node handover.

It should be noted that, for ease of understanding, FIG. 6 is merely a schematic diagram in which the mobile IAB node and the child nodes of the mobile IAB node that are included in the communication system 100 is handed over from the source IAB donor node 120 to the target IAB donor node 130. However, this should not constitute any limitation on this application. The communication system 100 may further include more network nodes. For example, the child nodes of the mobile IAB node 110 may further include more terminal devices and/or IAB nodes. The IAB donor node, the IAB node, and the terminal device that are included in the communication system shown in FIG. 6 may be the IAB donor node, the IAB node, and the terminal device that are in the foregoing various forms. These are not shown one by one in the figures in embodiments of this application.

It should be noted that, all embodiments of this application are applicable to a mobile IAB scenario, and are also applicable to an IAB node handover scenario (a scenario in which an IAB node does not move, and handover occurs due to quality of an IAB node link).

Figure 7:
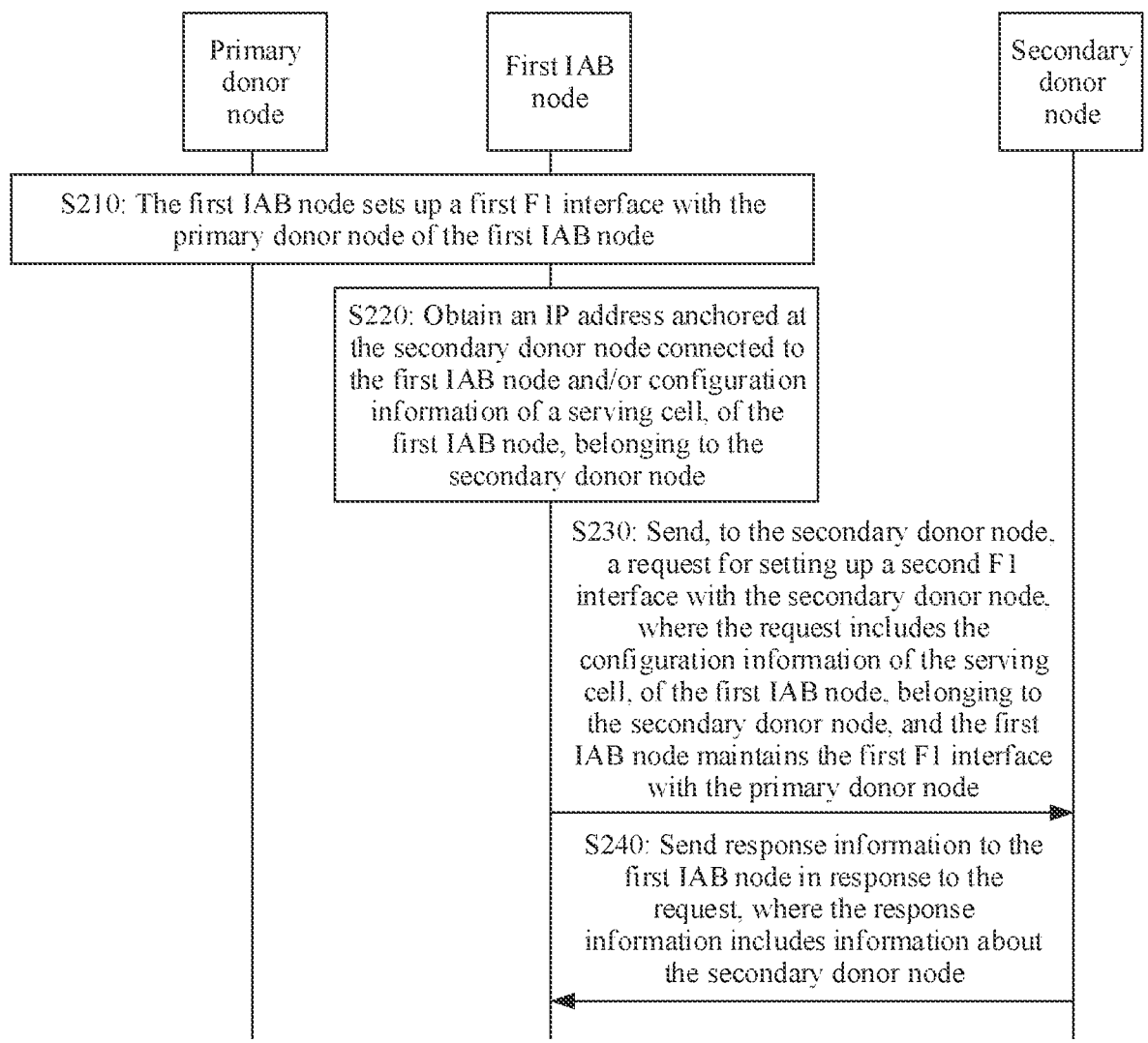
FIG. 7 is a schematic interaction diagram of an IAB node dual connectivity setup method according to an embodiment of this application.

The following describes in detail the IAB node dual connectivity setup method provided in this application with reference to FIG. 7. FIG. 7 is a schematic flowchart of an IAB node dual connectivity setup method 200 according to an embodiment of this application. The method 200 may be applied to the scenario shown in FIG. 6. Certainly, the method may alternatively be applied to another scenario in which an IAB node needs to be handed over to a donor node. This is not limited herein in this embodiment of this application.

It should be understood that, in the following descriptions, a method in each embodiment is described by using an example in which the method in each embodiment is performed by an IAB node and an IAB donor node. By way of example but not limitation, the method may alternatively be performed by chips used in the IAB node and the IAB donor node.

As shown in FIG. 7, the method 200 shown in FIG. 7 may include step S210 to step S250. The following describes in detail the steps in the method 200 with reference to FIG. 3. The method 200 includes the following steps.

S210: A first IAB node sets up a first F1 interface with a primary donor node of the first IAB node.

S220: The first IAB node obtains an internet protocol (IP) address anchored at a secondary donor node connected to the first IAB node and/or configuration information of a serving cell, of the first IAB node, belonging to the secondary donor node.

S230: The first IAB node sends, to the secondary donor node, a request for setting up a second F1 interface with the secondary donor node, where the request includes the configuration information of the serving cell, of the first IAB node, belonging to the secondary donor node. Correspondingly, the secondary donor node receives the request.

Specifically, when the first IAB node sends, to the secondary donor node, the request for setting up the F1 interface with the secondary donor node, the first IAB node maintains the first F1 interface with the primary donor node.

S240: The secondary donor node sends response information to the first IAB node in response to the request, where the response information includes information about the secondary donor node. Correspondingly, the first IAB node receives the response information.

In this way, the first IAB node completes a process of setting up the second F1 interface with the secondary donor node. The second F1 interface is used to transmit application layer information (for example, an F1 AP message) between the first IAB node and the secondary donor node.

Specifically, in this embodiment of this application, the first IAB node may be a mobile IAB node, and the first IAB node has set up a connection to the primary donor node (or referred to as a source donor node) of the first IAB node and performs data transmission. The first IAB node may include an IAB-MT and an IAB-DU, and the primary donor node (or may be referred to as a primary IAB donor node) may include a primary donor CU and a primary donor DU. For the first IAB node, the source donor node is used as the primary donor node of the first IAB node. In other words, a source donor CU and a source donor DU are also referred to as the primary donor CU and the primary donor DU. In other words, in S210, the IAB-MT of the first IAB node has been connected to the primary donor CU. For a control plane, the IAB-DU of the first IAB node has set up an F1 interface (namely, the first F1 interface) with the primary donor CU, and the first F1 interface is used to transmit the application layer information (for example, the F1 AP message) between the IAB-DU and the primary donor CU. For a user plane, corresponding GTP tunnels have been set up, for different bearers of a child node (for example, a terminal device) of the first IAB node, between the IAB-DU and the primary donor CU.

The IAB-MT of the first IAB node may add the secondary donor node as a secondary station of the IAB-MT by using a secondary station addition procedure. The secondary donor node (or may be referred to as a secondary IAB donor node) may further include a secondary donor CU and a secondary donor DU. For the first IAB node, a target donor node is used as the secondary donor node of the first IAB node. In other words, a target donor CU and a target donor DU are also referred to as the secondary donor CU and the secondary donor DU. In other words, the IAB-MT is connected to both the primary donor CU and the secondary donor CU, where the primary donor CU is used as a primary station, and the secondary donor CU is used as a secondary station.

After the IAB-MT adds the secondary donor node as the secondary station of the IAB-MT, in S220, the first IAB node obtains the IP address anchored at the secondary donor node connected to the first IAB node and/or the configuration information of the serving cell, of the IAB-DU, belonging to the secondary donor node. Specifically, when the IAB-MT is connected to the primary donor node, the IAB-MT obtains the IP address to facilitate communication with the primary donor node, where the IP address and the primary donor node belong to a same network segment. In addition, the IAB-DU obtains the configuration information of the serving cell of the IAB-DU, where the configuration information of the serving cell is associated with the primary donor node. For example, an identifier of the serving cell of the IAB-DU includes an identifier of the primary donor node. When the IAB-MT is connected to the secondary donor node, the IAB-MT needs to obtain a new IP address, where the IP address and the secondary donor node belong to a same network segment, so that the IAB-MT can communicate with the secondary donor node. In addition, the IAB-DU needs to obtain configuration information of a new serving cell. In other words, the configuration information of the serving cell is associated with the secondary donor node. For example, an identifier of the serving cell of the IAB-DU includes an identifier of the secondary donor node.

It should be understood that, in this embodiment of this application, unless otherwise specified, each serving cell in this embodiment of this application is a serving cell of the IAB-DU, but information, such as an identifier, of the serving cell of the IAB-DU changes due to a change of the donor node.

In a possible implementation, the IAB-DU may request, from an operation, administration, and maintenance (OAM) server through the primary IAB donor node, to obtain the configuration information of the serving cell, of the IAB-DU, belonging to the secondary IAB donor node; or the IAB-DU requests, from an OAM server through the secondary IAB donor node, to obtain the configuration information of the serving cell, of the IAB-DU, belonging to the secondary IAB donor node.

In a possible implementation, the IP address, of the IAB-DU, anchored at the secondary IAB donor node may be allocated by the secondary donor CU, and sent to the primary IAB donor node by using a secondary node addition request acknowledgment (S-Node Addition Request Acknowledge) message. The primary IAB donor node sends the IP address to the IAB-DU. Alternatively, the IP address, of the IAB-DU, anchored at the secondary IAB donor node may be allocated by the secondary donor DU. The secondary donor DU includes the allocated IP address in a context setup response (UE Context Setup Response) message of the terminal device and sends the context setup response message to the secondary donor CU. The secondary donor CU sends the context setup response message to the primary IAB donor node by using an S-Node Addition Request Acknowledge message. The primary IAB donor node sends the IP address to the IAB-DU. Alternatively, the IP address, of the IAB-DU, anchored at the secondary IAB donor node may be allocated by the OAM server, and sent to the IAB-DU through the primary IAB donor node or the secondary IAB donor node.

After the IAB-DU obtains the IP address anchored at the secondary donor node connected to the IAB-DU and/or the configuration information of the serving cell, of the IAB-DU, belonging to the secondary donor node, in S230, the first IAB node sends, to the secondary donor node, the request for setting up the second F1 interface with the secondary donor node, where the request includes the configuration information of the serving cell, of the first IAB node, belonging to the secondary donor node. Specifically, the IAB-DU of the first IAB node sends the request to the secondary donor CU, where the request is used for setting up the second F1 interface between the IAB-DU and the secondary donor CU. Optionally, the request may be an F1 interface setup request (F1 Setup Request) message or a newly defined FLAP message.

The request, sent by the IAB-DU, for setting up the second F1 interface with the secondary donor CU may include at least one of the following information:

information about the IAB-DU, information about the serving cell of the IAB-DU, an RRC version that can be identified by the IAB-DU, or indication information indicating the secondary donor node not to start an operation of activating the serving cell of the IAB-DU.

The information about the IAB-DU may include an identifier (ID) of the IAB-DU and/or a name of the IAB-DU.

The information about the serving cell of the IAB-DU may include one or more of a cell global identifier (CGI) of the serving cell, a physical cell identifier (PCI) of the serving cell, a frequency of the serving cell, bandwidth of the serving cell, a public land mobile network (PLMN) of the serving cell, a system broadcast message MIB (Master Information Block) of the serving cell, a system broadcast message SIB 1 (System Information Block 1) of the serving cell, or indication information indicating that the serving cell has been activated.

In S240, after receiving the request sent by the IAB-DU, the secondary donor CU may feed back, to the IAB-DU, a response to the request. Optionally, the response may be an F1 interface setup response (F1 Setup Response) message or a newly defined F1 AP message. Optionally, the response may include information about the secondary donor CU, an RRC version that can be identified by the secondary donor CU, and the like. The information about the secondary donor CU may include an identifier of the secondary donor CU, for example, a name of the secondary donor CU. Correspondingly, the IAB-DU receives the response information.

After the IAB-DU of the first IAB node receives the response, the first IAB node completes the process of setting up the second F1 interface with the secondary donor node. The second F1 interface is used to transmit the application layer information between the IAB-DU and the secondary donor CU. Although the IAB-DU sets up the second F1 interface with the secondary donor CU, the serving cell, of the IAB-DU, belonging to the secondary donor node is not activated. In other words, the IAB-DU does not broadcast, over an air interface, information such as the CGI about a cell, of the IAB-DU, belonging to the secondary donor node.

The IAB-DU has set up an F1 interface with the primary donor CU, and through the foregoing steps S220 to S240, the IAB-DU also sets up an F1 interface with the secondary donor CU, that is, the IAB-DU sets up the F1 interfaces with both the two donor CUs.

According to the IAB node dual connectivity setup method provided in this application, one IAB node (one IAB-DU) sets up F1 interfaces with both a primary donor CU and a secondary donor CU. Before the IAB node is handed over from the primary donor CU to the secondary donor CU, because the IAB-DU has set up the F1 interface with the secondary donor CU in advance, after the IAB-DU is handed over to the secondary donor CU, F1 interface setup may not be triggered again. In this way, a latency for setting up the F1 interface between the IAB-DU and the secondary donor CU after the IAB node is handed over to the secondary donor CU is reduced, and a problem of service interruption caused by a latency existing when the IAB node is handed over to a donor node is avoided, thereby ensuring communication quality and improving communication efficiency.

Optionally, in some possible implementations of this application, the first IAB node further sends first indication information to the secondary donor node, where the first indication information is used to indicate the secondary donor node (secondary donor CU) not to start an operation of activating the serving cell, of the first IAB node, belonging to the secondary donor node, or the first indication information is used to indicate the secondary donor node (secondary donor CU) to start the operation of activating the serving cell, of the first IAB node, belonging to the secondary donor node. The following provides descriptions separately.

Figure 8:
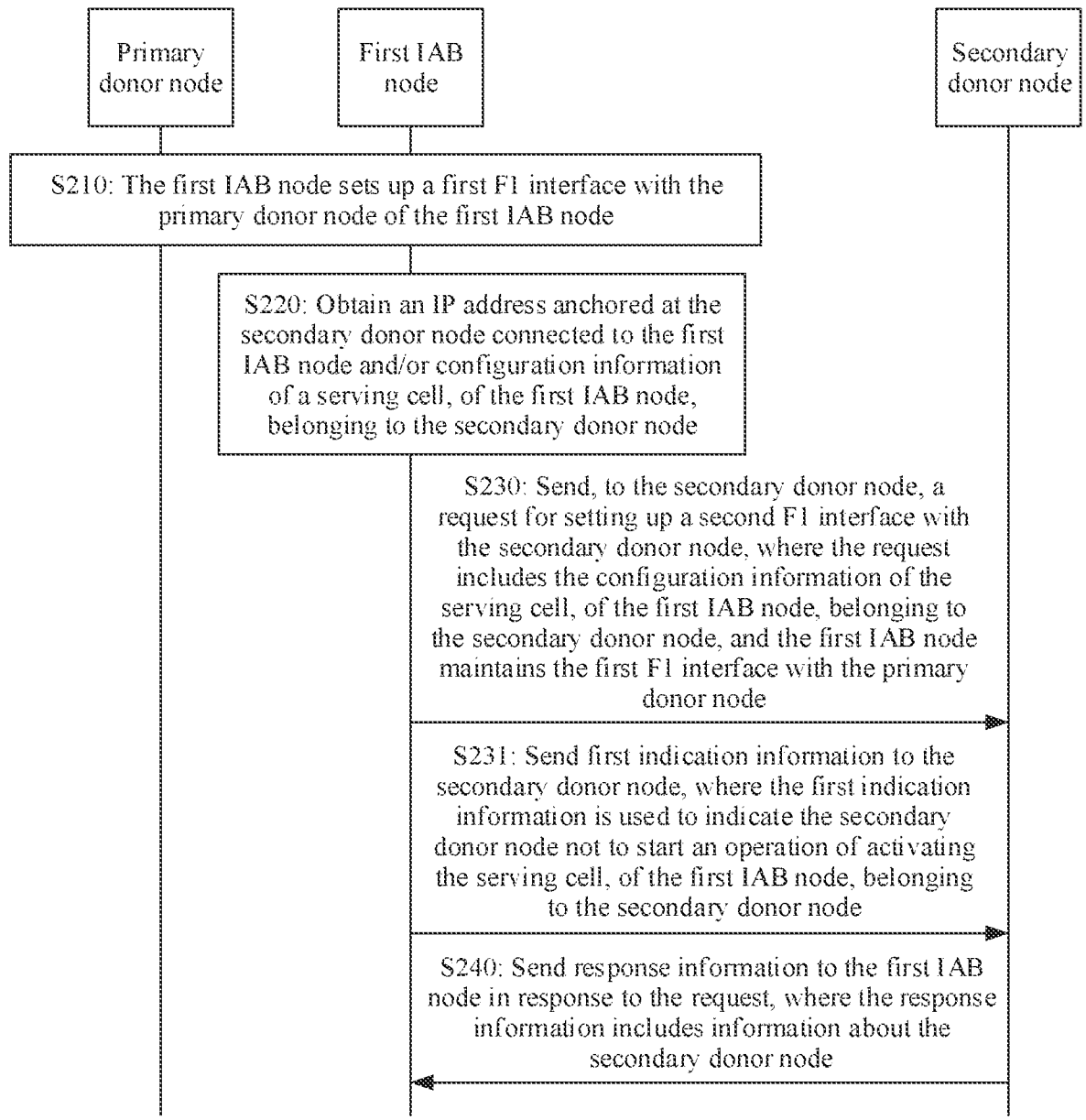
FIG. 8 is a schematic interaction diagram of an IAB node dual connectivity setup method according to another embodiment of this application.

FIG. 8 is a schematic flowchart of an IAB node dual connectivity setup method in some other embodiments of this application. The method 200 further includes S231 based on the steps in the method shown in FIG. 7.

S231: The first IAB node sends first indication information to the secondary donor node, where the first indication information is used to indicate the secondary donor node (secondary donor CU) not to start an operation of activating the serving cell, of the first IAB node, belonging to the secondary donor node. Correspondingly, the secondary donor node receives the first indication information.

For steps S210, S220, S230, and S240 shown in FIG. 8, refer to the foregoing related descriptions of S210, S220, S230, and S240. For brevity, details are not described herein again.

Because the IAB-DU sets up the F1 interfaces with both the primary donor CU and the secondary donor CU, before the IAB-MT is handed over to the secondary donor CU, the IAB-DU further communicates with the primary donor CU. In other words, the IAB-DU still transmits the application layer information through the first F1 interface between the primary donor CU and the IAB-DU. The serving cell of the IAB-DU is a serving cell, of the IAB-DU, belonging to the primary donor node. In other words, although the IAB-DU sets up the F1 interface with the secondary donor CU, the serving cell, of the IAB-DU, belonging to the secondary donor node is not activated. Therefore, the IAB-DU does not broadcast, over an air interface, information such as the CGI about a cell, of the IAB-DU, belonging to the secondary donor node. Therefore, in S231, after the IAB-MT adds the secondary donor node as a secondary station and accesses the secondary donor node, the IAB-DU of the first IAB node may send the first indication information to the secondary donor CU of the secondary donor node, where the first indication information is used to indicate the secondary donor CU not to start the operation of activating the serving cell, of the IAB-DU, belonging to the secondary donor CU connected to the IAB-DU. Correspondingly, the secondary donor CU receives the first indication information. After receiving the first indication information, the secondary donor CU determines that the operation of activating the serving cell of the IAB-DU does not need to be started currently. In this case, the secondary donor CU does not send, to the IAB-DU, indication information indicating the IAB-DU to activate the serving cell.

Optionally, if in S240, the response, to the request, fed back by the secondary donor CU to the IAB-DU does not carry an identifier of a to-be-activated serving cell, the IAB-DU considers that the serving cell, of the IAB-DU, belonging to the secondary donor node connected to the IAB-DU is not activated.

According to the IAB node dual connectivity setup method provided in this application, one IAB node (IAB-DU) sets up F1 interfaces with both a secondary donor node (secondary donor CU) and a primary donor node (primary donor CU). However, before the IAB node is handed over to the secondary donor CU, a serving cell, of the IAB-DU, belonging to the secondary donor node is not activated. According to the IAB node dual connectivity setup method provided in this application, a latency when the IAB node is handed over to a donor CU can be reduced, and a problem of service interruption caused by a latency existing when the IAB node is handed over to a donor node is avoided, thereby ensuring communication quality.

It should be understood that, the first indication information may be carried in the request for setting up the second F1 interface with the donor CU in S220 and sent to the secondary donor CU together. That is, the first indication information and the request for setting up the second F1 interface may be sent to the secondary donor CU in one piece of signaling, or the first indication information and the request for setting up the second F1 interface may be respectively sent to the secondary donor CU in different signaling. This is not limited herein in this embodiment of this application.

Figure 9:
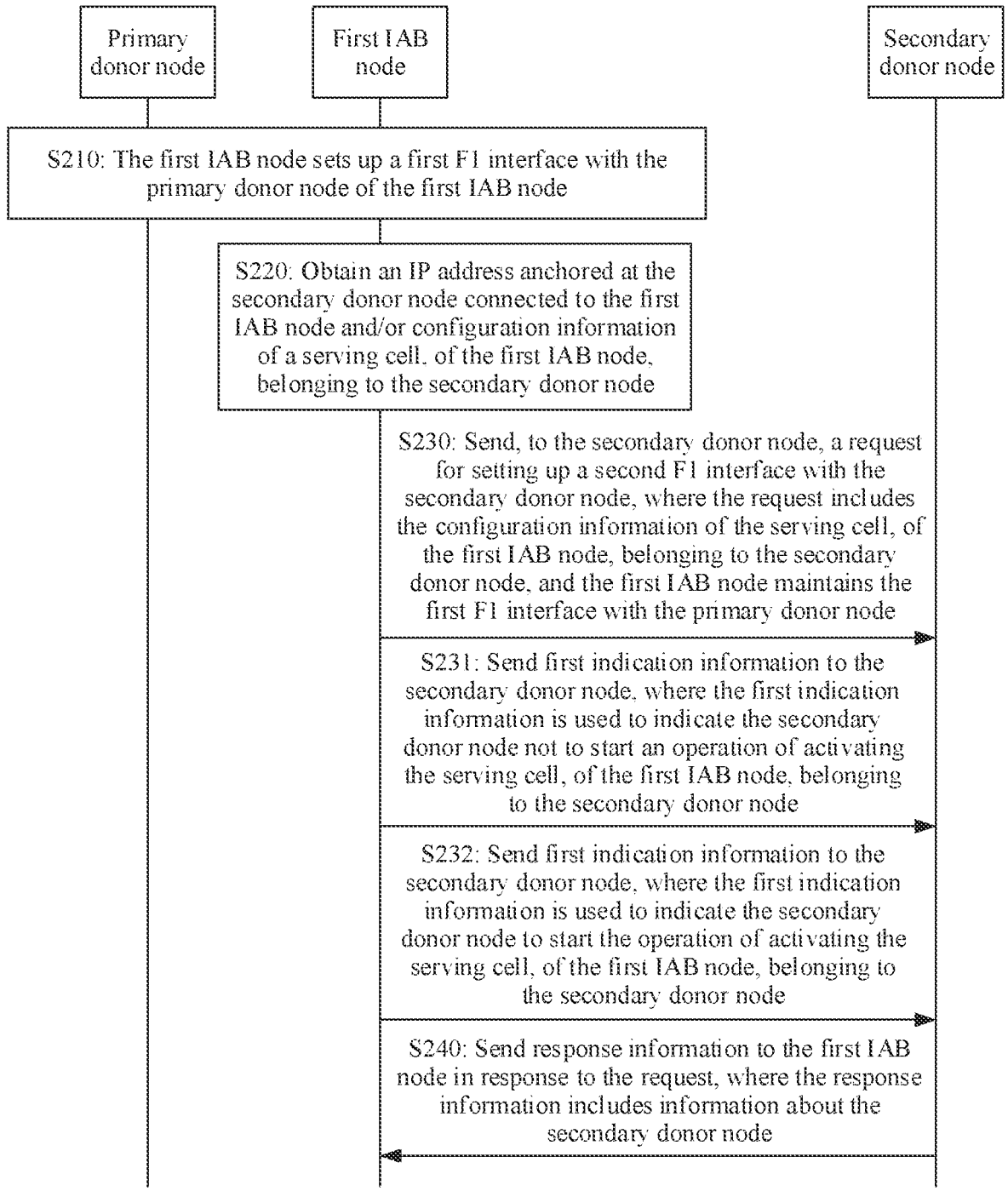
FIG. 9 is a schematic interaction diagram of an IAB node dual connectivity setup method according to another embodiment of this application.

When a first IAB node working in a dual-connectivity mode needs to fall back to a single-connectivity mode, for example, when quality of a link between the first IAB node and a primary IAB donor becomes worse, and quality of a link between the first IAB node and a secondary IAB donor becomes better, the first IAB node may use the secondary IAB donor as a unique parent node (or access node). An IAB-MT in the first IAB node may trigger a handover procedure, to be specific, the IAB-MT is handed over to the secondary IAB donor, and removes a connection to the primary IAB donor. After the IAB-MT is handed over to a secondary donor CU, an IAB-DU may notify the secondary IAB donor CU to activate the second F1 interface that is set up in advance, and activate a serving cell, of the IAB-DU, belonging to the secondary IAB donor. FIG. 9 is a schematic flowchart of an IAB node dual connectivity setup method in some other embodiments of this application. The method 200 further includes S232 based on the steps in the method shown in FIG. 8.

S232: The first IAB node (IAB-DU) sends first indication information to the secondary donor node (secondary donor CU), where the first indication information is used to indicate the secondary donor node (secondary donor CU) to start an operation of activating the serving cell, of the IAB-DU, belonging to the secondary donor CU connected to the IAB-DU. Correspondingly, the secondary donor node (secondary donor CU) receives the first indication information.

For steps S210, S220, S230, S231, and S240 shown in FIG. 9, refer to the foregoing related descriptions of S210, S220, S230, S231, and S240. For brevity, details are not described herein again.

After the IAB-MT is handed over to the secondary IAB donor, and removes the connection to the primary IAB donor, the IAB-MT is connected only to the secondary donor CU. In S232, the IAB-DU in the first IAB node may send the first indication information to the secondary donor CU. In this case, the first indication information is used to indicate the secondary donor CU to start the operation of activating the serving cell, of the IAB-DU, belonging to the secondary donor CU, to be specific, request to activate the second F1 interface that is set up in advance and activate the serving cell, of the IAB-DU, belonging to the secondary donor CU. After receiving the first indication information, the secondary donor CU may start the operation of activating the serving cell of the IAB-DU. Optionally, the secondary donor CU may send indication information to the IAB-DU, where the indication information may be carried in a non-user equipment associated F1AP message (non-UE associated F1 AP message) or a newly defined F1 AP message. The indication information includes information about a serving cell that the IAB-DU is requested to activate. After receiving the indication information, the IAB-DU may activate the corresponding serving cell. In this way, after the first IAB node is handed over to the secondary donor node, the first F1 interface may be quickly activated, to reduce a latency caused by handover and ensure that the first IAB node and a child node of the first IAB node can normally communicate with the secondary donor node, ensure communication quality, and avoid service interruption caused by the handover latency.

It should be understood that, the indication information used to indicate the secondary donor CU not to start the operation of activating the serving cell, of the IAB-DU, belonging to the secondary donor node and the indication information used to indicate the secondary donor CU to start the operation of activating the serving cell may be carried in same signaling or different signaling and sent to the secondary donor CU. This is not limited herein in this application.

Figure 10:
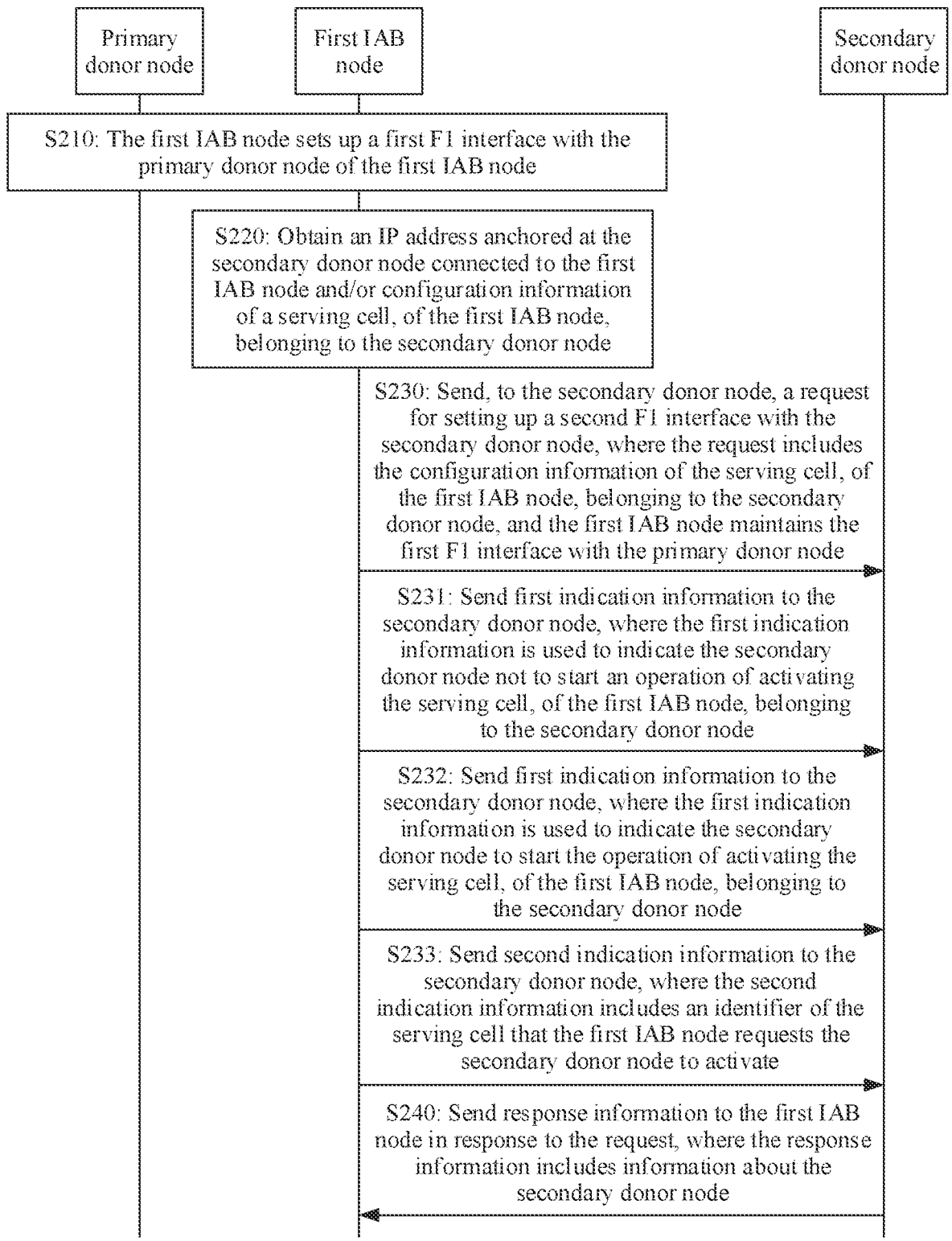
FIG. 10 is a schematic interaction diagram of an IAB node dual connectivity setup method according to still another embodiment of this application.

Optionally, in some possible implementations of this application, after the IAB-DU is handed over from the primary donor CU to the secondary donor CU, a physical cell of the IAB-DU remains unchanged, but a name or an identifier of the physical cell changes. For example, assuming that there are four physical cells of the IAB-DU, when the IAB-DU is connected to the primary donor CU, identifiers of the four physical cells are 11, 12, 13, and 14 respectively. After the IAB-DU is handed over from the primary donor CU to the secondary donor CU, identifiers of the four physical cells change to 21, 22, 23, and 24 respectively. Cells whose identifiers are 11 and 21 are a same physical cell, cells whose identifiers are 12 and 22 are a same physical cell, cells whose identifiers are 12 and 23 are a same physical cell, and cells whose identifiers are 14 and 24 are a same physical cell. The cell 21, the cell 22, the cell 23, and the cell 24 are serving cells, of the IAB-DU, belonging to the secondary donor node connected to the IAB-DU. When the IAB-DU is connected to the primary donor CU, only some cells may be in an active state. Therefore, after the IAB-DU is handed over to the secondary donor CU, the IAB-DU needs to notify the secondary donor CU of cells that need to be activated, and the cells that definitely need to be activated may be cells that are already in the active state when the IAB-DU is connected to the primary donor CU, to provide reference for the secondary donor CU to request to activate a cell of the IAB-DU. Specifically, FIG. 10 is a schematic flowchart of an IAB node dual connectivity setup method in some other embodiments of this application. The method 200 further includes S233 based on the steps in the method shown in FIG. 9.

S233: The first IAB node sends second indication information to the secondary donor node, where the second indication information includes an identifier of the serving cell that the first IAB node requests the secondary donor node to activate.

For steps S210, S220, S230, S231, S232, and S240 shown in FIG. 10, refer to the foregoing related descriptions of S210, S220, S230, S231, S232, and S240. For brevity, details are not described herein again.

In S233, the IAB-DU of the first IAB node may send the second indication information to the secondary donor CU of the secondary donor node, where the second indication information includes the identifier of the serving cell that the IAB-DU requests the secondary donor CU to activate. For example, the identifier of the serving cell may include a CGI of the serving cell and/or a PCI of the serving cell. For differentiation, the serving cell that the IAB-DU requests the secondary donor CU to activate is referred to as a first cell, and the first cell may be a physical cell that is already in the active state when the IAB-DU is connected to the primary donor CU. The first cell may be some or all of serving cells of the IAB-DU. The second indication information is used to indicate the secondary donor CU node that the first cell needs to be activated.

For example, 1-bit indication information corresponding to an identifier of a serving cell may be used to indicate whether the serving cell needs to be activated. In a possible implementation, when the 1-bit indication information is set to 0, it indicates that the serving cell needs to be activated; or when the 1-bit indication information is set to 1, it indicates that the serving cell does not need to be activated. In another possible implementation, when the 1-bit indication information is set to true, it indicates that the serving cell needs to be activated; or when the 1-bit indication information does not occur, it indicates that the serving cell does not need to be activated.

The secondary donor CU receives the second indication information, and determines that the IAB-DU needs to activate at least the first cell. The secondary donor CU may send indication information to the IAB-DU, where the indication information may be carried in a non-UE associated F1 AP message or a newly defined F1 AP message. The indication information includes information about the first cell that the IAB-DU is requested to activate. After receiving the indication information, the IAB-DU may activate the first cell.

It should be understood that, cells that the secondary donor CU requests the IAB-DU to activate may include only a to-be-activated cell, of the IAB-DU, belonging to the source IAB donor, that is, may include only the first cell. Certainly, in addition to the first cell, the cells that the secondary donor CU requests the IAB-DU to activate may also include other cells that the secondary donor CU expects the IAB-DU to activate (for example, more air interface resources on the secondary IAB donor are available, and more cells may be activated to provide services). In other words, the first cell may be a subset of the cells that the secondary donor CU requests the IAB-DU to activate.

It should be further understood that, the second indication information may alternatively be carried in the first indication information in S232 and sent to the secondary donor CU together. In other words, the second indication information and the first indication information in S232 may be sent to the secondary donor CU in a same piece of signaling. Certainly, the second indication information and the first indication information in S232 may alternatively be sent to the secondary donor CU in different signaling. This is not limited herein in this embodiment of this application.

It should be further understood that, when the IAB-DU is connected to the primary donor CU, if all serving cells are in the active state, but terminal devices or IAB nodes are attached only to some of the serving cells, after the IAB-DU is handed over from the primary donor CU to the secondary donor CU, the IAB-DU sends second indication information to the secondary donor CU, where the indication information is used to indicate, to the secondary donor CU node, that only the serving cells to which the terminal devices or the IAB nodes are attached need to be activated. The secondary donor CU receives the second indication information, and determines at least the serving cells, of the IAB-DU, that need to be activated. Whether another cell is activated depends on implementation of the secondary donor CU.

The IAB-DU sends the second indication information to the secondary donor CU, and when the secondary donor CU starts an operation of activating serving cells, serving cells that need to be activated may be determined. In this way, normal communication in the serving cells that need to be activated and communication between the serving cells that need to be activated and the secondary donor node are ensured, thereby ensuring communication quality and avoiding service interruption caused by donor node handover.

Optionally, in some possible implementations of this application, the secondary donor CU may further indicate the primary donor CU to release the first F1 interface between the primary donor CU and the IAB-DU. For example, the secondary donor CU may use an existing XnAP message or a newly defined XnAP message, where the message carries an identifier of the IAB-DU or a name of the IAB-DU, so that the primary donor CU releases an F1 interface resource corresponding to the IAB-DU. The existing XnAP message may be an NG-RAN node Configuration Update message, a UE Context Release message, or the like. This is not limited herein in this embodiment of this application.

Figure 11:
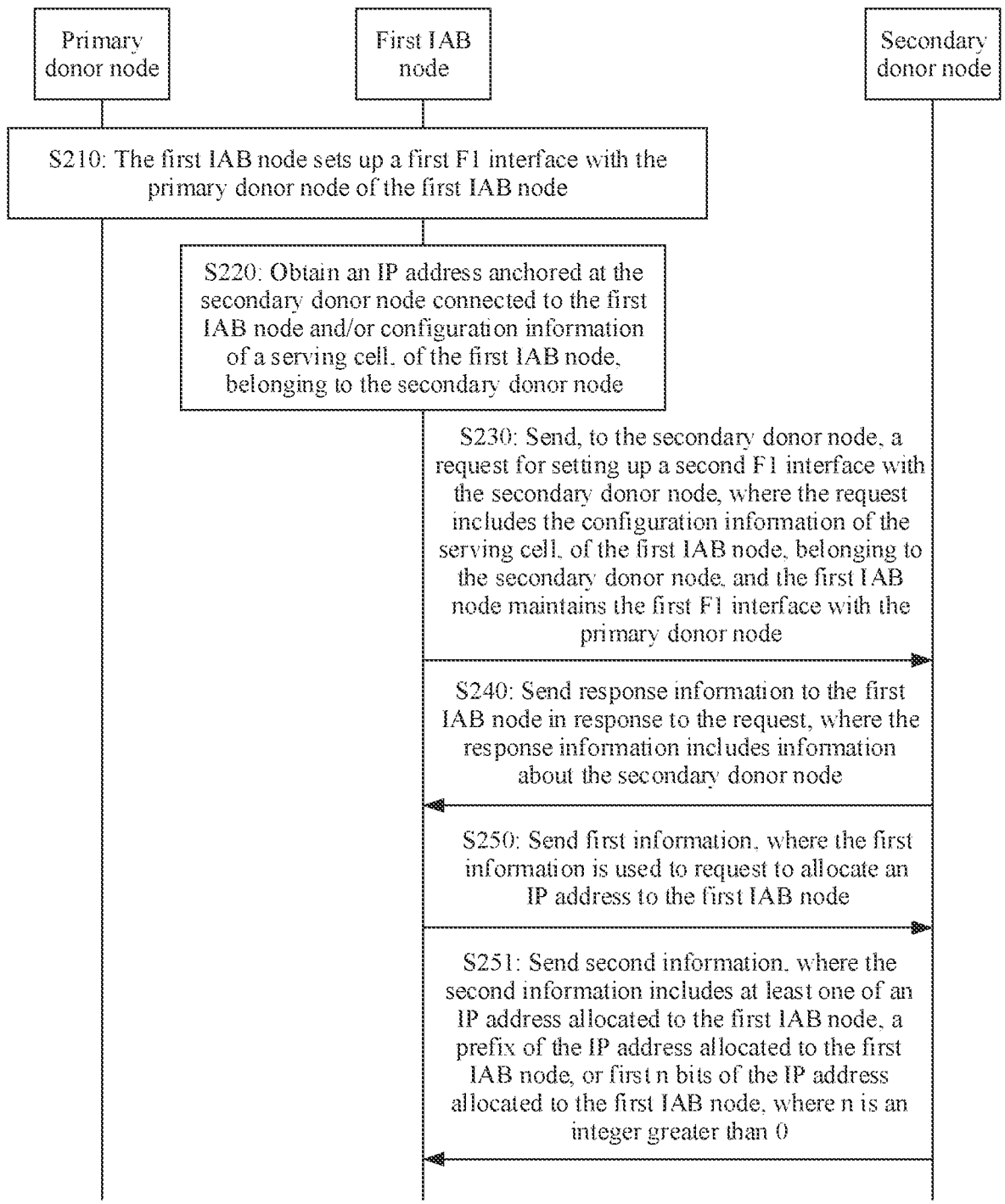
FIG. 11 is a schematic interaction diagram of an IAB node dual connectivity setup method according to still another embodiment of this application.

Optionally, in some other possible implementations of this application, FIG. 11 is a schematic flowchart of an IAB node dual connectivity setup method in some other embodiments of this application. The method 200 further includes S250 and S251 based on the steps in the method shown in FIG. 7.

S250: The first IAB node sends first information to the secondary donor node, where the first information is used to request to allocate an IP address to the first IAB node.

S251: The secondary donor node sends second information to the first IAB node, where the second information includes at least one of an IP address allocated to the first IAB node, an IP address prefix allocated to the first IAB node, or first n bits of the IP address allocated to the first IAB node, where n is an integer greater than 0.

For steps S210, S220, S230, and S240 shown in FIG. 11, refer to the foregoing related descriptions of S210, S220, S230, and S240. For brevity, details are not described herein again.

In S250, because a donor DU to which the first IAB node is attached changes, and the donor node is handed over from the primary donor DU to the secondary donor DU, the first IAB node needs to re-obtain more IP addresses, for example, set up the second F1 interface with the secondary donor CU by using the IP address. In addition, in another case, for example, in an initial access process of the first IAB node, or when the first IAB node may determine, based on implementation of the first IAB node, to request more IP addresses (may request more IP addresses based on an upper-layer service requirement of the IAB node), or during or after an RRC re-setup or handover process, the first IAB node needs to obtain more IP addresses. This solution is also applicable to these scenarios. Therefore, in S250, the first IAB node sends the first information to the secondary donor node, where the first information is used to request to allocate the IP address to the first IAB node. Specifically, the first IAB node may send the first information to the secondary donor CU of the secondary donor node. Correspondingly, the secondary donor CU receives the first information. Alternatively, the first IAB node may send the first information to the secondary donor CU of the secondary donor node through the primary donor CU of the primary donor node. Correspondingly, the secondary donor CU receives the first information through the primary donor CU.

In S251, after the secondary donor CU receives the first information, the secondary donor CU may allocate a new IP address to the first IAB node, or the secondary donor CU may request another node to allocate an IP address to the first IAB node, where the another node may be a secondary donor DU, an OAM server, a dynamic host configuration protocol (DHCP) server, or the like. After allocating an IP address to the first IAB node, the nodes may send the allocated IP address to the secondary donor CU. The secondary donor CU may send second information to the first IAB node, where the second information includes the IP address allocated by the secondary donor CU or the IP address allocated by the another node to the first IAB node. Alternatively, the secondary donor CU may send the second information to the first IAB node through the primary donor CU.

Optionally, the second information may include at least one of the one or more IP addresses allocated to the first IAB node, the one or more IP address prefixes allocated to the first IAB node, or first n bits of the one or more IP address allocated to the first IAB node, where n is an integer greater than 0. When the second information includes the IP address prefix allocated to the first IAB node, or the first n bits of the IP address allocated to the first IAB node, the first IAB node may determine a quantity of remaining bits other than a length of the one or more IP address prefixes, or may determine a quantity of remaining bits other than the first n bits of the IP address, to obtain a plurality of available IP addresses of the IAB node. For example, assuming that a total length of an IP address is 32 bits, if it is indicated that a length of the one or more IP address prefixes is 30 bits, the length of the IP address prefix allocated by the secondary donor CU or the another node to the first IAB node is 30 bits, and the first IAB node may determine the remaining two bits other than the 30-bit length of the IP address prefix. In other words, the first IAB node requests to allocate four IP addresses, and correspondingly, the secondary donor CU or the another node allocates four IP addresses to the first IAB node.

According to the IAB node dual connectivity setup method provided in this application, after a donor DU to which an IAB node is attached changes, the IAB node may request a donor CU to which the IAB node is attached to allocate more IP addresses to the IAB node, to satisfy a requirement of communication between the IAB node and new donor nodes (for example, the donor CU and the donor DU). This can ensure normal communication between the IAB node and a target donor node, and ensure communication efficiency.

It should be understood that, the method shown in FIG. 8 to FIG. 10 may alternatively include S250 and S251.

Optionally, in a possible implementation, the first information includes at least one of a quantity of IP addresses requested to be allocated to the first IAB node, a length of the one or more IP address prefixes requested to be allocated to the first IAB node, or a value of n of first n bits of the IP address requested to be allocated to the first IAB node.

Specifically, the first information may explicitly indicate the quantity of IP addresses requested to be allocated to the first IAB node, that is, the first information includes the quantity of IP addresses requested to be allocated to the first IAB node. Certainly, the first information may alternatively implicitly indicate the quantity of IP addresses requested to be allocated to the first IAB node. For example, the first information includes the length of the IP address prefix requested to be allocated to the first IAB node, or includes the value of n of the first n bits of the IP address requested to be allocated to the first IAB node. In this way, the quantity of IP addresses requested to be allocated to the first IAB node may be determined based on a quantity of remaining bits of the IP address. For example, assuming that a total length of an IP address is 64 bits, and the first information includes first 60 bits of the IP address requested to be allocated to the first IAB node, the second information may include the first 60 bits of the IP address allocated to the first IAB node, and the first IAB node may determine the remaining 4 bits other than the first 60 bits of the IP address, that is, it is implicitly indicated that 16 IP addresses are requested to be allocated to the first IAB node.

The quantity of IP addresses requested to be allocated to the first IAB node is explicitly or implicitly indicated, so that flexibility of allocating the IP addresses to the first IAB node can be improved, and efficiency of allocating the IP addresses to the first IAB node can be improved.

Optionally, in some possible implementations of this application, the secondary donor CU may be further divided into a CU-CP entity (which may also be referred to as a CU-CP node) and at least one CU-UP entity (which may also be referred to as a CU-UP node). The CU-UP entity and the CU-CP entity may be distributed on different physical devices, or may be disposed on a same physical device. The CU-CP entity includes an RRC function and a PDCP control plane function (for example, configured to process data on a signaling radio bearer). The CU-UP entity includes an SDAP function and a user plane function of a PDCP protocol stack (for example, configured to process data on a radio bearer of the user equipment). An F1-C interface is a communication interface between the first IAB node and the CU-CP entity, and an F1-U interface is a communication interface between the first IAB node and the CU-UP entity.

Therefore, the first information may further include at least one of a quantity of IP addresses requested to be allocated to the F1-C interface, a length of the one or more IP address prefixes requested to be allocated to the F1-C interface, a value of x of first x bits of the IP address requested to be allocated to the F1-C interface, a quantity of IP addresses requested to be allocated to the F1-U interface, a length of the one or more IP address prefixes requested to be allocated to the F1-U interface, or a value of y of first y bits of the IP address requested to be allocated to the F1-U interface. Both x and y are integers greater than 0. It should be understood that, if the first information includes the first n bits of the IP address requested to be allocated to the first IAB node, the quantity of IP addresses requested to be allocated may be determined based on the remaining bits of the IP address, that is, the quantity of IP addresses requested to be allocated to the first IAB node=$2^{(total\ quantity\ of\ bits\ of\ the\ IP\ address-n)}$. The quantity of IP addresses requested to be allocated needs to be equal to a sum of the quantity of IP addresses used for the F1-C interface and the quantity of IP addresses used for the F1-U interface. If the first information further includes the first x bits of the IP address requested to be allocated to the F1-C interface, the quantity of IP addresses requested to be allocated to the F1-C interface=$2^{(total\ quantity\ of\ bits\ of\ the\ IP\ address-x)}$. Similarly, if the quantity of IP addresses requested to be allocated to the F1-U interface=$2^{(total\ quantity\ of\ bits\ of\ the\ IP\ address-y)}$, $2^{(total\ quantity\ of\ bits\ of\ the\ IP\ address-n)} = 2^{(total\ quantity\ of\ bits\ of\ the\ IP\ address-x)} + 2^{(total\ quantity\ of\ bits\ of\ the\ IP\ address-y)}$. Optionally, the quantity of IP addresses that the first IAB node requests to allocate may alternatively be greater than the sum of the quantity of IP addresses used for the F1-C interface and the quantity of IP addresses used for the F1-U interface. This is not limited herein in this application.

When allocating IP addresses to the first IAB node, the secondary donor CU or the another node may clearly know the quantity of IP addresses that need to be allocated to the F1-C interface and/or the quantity of IP addresses that need to be allocated to the F1-U interface. Similarly, the quantity of IP addresses allocated to the F1-C interface may be indicated in an explicit or implicit manner, and the quantity of IP addresses allocated to the F1-U interface may also be indicated in an explicit or implicit manner. For example, if the first information includes the length of the IP address prefix requested to be allocated to the F1-C interface, or the value of x of the first x bits of the IP address requested to be allocated to the F1-C interface, it may be considered that the first information implicitly indicates the quantity of IP addresses requested to be allocated to the F1-C interface. A quantity of IP addresses that are requested to be allocated to the first IAB node and that are used for F1-C interface communication and F1-U interface communication is explicitly or implicitly indicated, so that flexibility of allocating the IP addresses to the first IAB node can be improved, and efficiency of allocating the IP addresses to the first IAB node can be improved. In addition, in an architecture in which a control plane and a user plane of the secondary donor CU are split, efficiency and quality of communication between the first IAB node and the CU-CP entity and between the first IAB node and the CU-UP entity are ensured.

Optionally, the value of x and the value of y may be the same, or may be different.

Optionally, in some possible implementations of this application, the donor node may send third indication information to the first IAB node, where the third indication information is used to indicate at least one of a first IP address used for the F1-U interface in the one or more IP addresses allocated to the first IAB node, a first IP address prefix used for the F1-U interface, first y bits of the first IP address used for the F1-U interface, a second IP address used for the F1-C interface in the one or more IP addresses allocated to the first IAB node, a second IP address prefix used for the F1-C interface, or first x bits of the second IP address used for the F1-C interface.

Specifically, in S251, the secondary donor CU may send second information to the first IAB node, where the second information includes at least one of the one or more IP addresses allocated to the first IAB node, an IP address prefix allocated to the first IAB node, or first n bits of the IP address allocated to the first IAB node. However, the secondary donor CU may be further divided into a CU-CP entity and at least one CU-UP entity, the F1-C interface is a communication interface between the first IAB node and the CU-CP entity, and the F1-U interface is a communication interface between the first IAB node and the CU-UP entity. Therefore, the secondary donor CU may further send third indication information to the first IAB node, where the third indication information is used to indicate IP addresses (namely, the first IP address) used for F1-U interface communication and/or IP addresses (namely, the second IP address) used for F1-C interface communication in the plurality of IP addresses allocated to the first IAB node. Alternatively, the third indication information is used to indicate IP address prefixes, used for F1-U interface communication and/or IP address prefixes, used for F1-C interface communication in the plurality of IP address prefixes allocated to the first IAB node. Alternatively, the third indication information is used to indicate bits, of IP addresses, used for F1-U interface communication and/or bits, of IP addresses, used for F1-C interface communication in first n bits of the plurality of IP addresses allocated to the first IAB node.

In a possible implementation, the secondary donor CU may further send second information to the first IAB node, where the second information includes the one or more IP addresses allocated to the first IAB node. After receiving the one or more allocated IP addresses, the first IAB node determines IP addresses used for F1-C interface communication and/or IP addresses used for F1-U interface communication.

In another possible implementation, if the OAM server allocates IP addresses to the first IAB node, the OAM server may further indicate IP addresses (namely, the first IP address) used for F1-U interface communication and/or IP addresses (namely, the second IP address) used for F1-C interface communication in the plurality of IP addresses allocated to the first IAB node.

In this embodiment, the first IAB node clearly knows the IP address used for F1-C interface communication and the IP address used for F1-U interface communication, so that in an architecture in which a control plane and a user plane of the secondary donor CU are split, efficiency and quality of communication between the first IAB node and the CU-CP entity and between the first IAB node and the CU-UP entity are ensured.

It should be understood that, in this embodiment of this application, the third indication information may alternatively be carried in the second information in S251 and sent to the first IAB node together. In other words, the third indication information and the second information in S251 may be sent to the first IAB node in a same piece of signaling. Certainly, the third indication information and the second information in S251 may alternatively be sent to the first IAB node in different signaling. This is not limited herein in this embodiment of this application.

Optionally, in some possible implementations of this application, because the secondary donor node may be further divided into a secondary donor CU and at least one secondary donor DU, the secondary donor CU may further send fourth indication information to the first IAB node, where the fourth indication information is used to indicate information that is about the secondary donor DU and that corresponds to the IP address allocated to the first IAB node. The information about the secondary donor DU may be an identifier of the secondary donor DU, a name of the secondary donor DU, an address of a backhaul adaptation protocol layer (BAP) of the secondary donor DU, an IP address of the secondary donor DU, or the like.

It should be understood that, in this embodiment of this application, the fourth indication information may alternatively be carried in the second information in S251 or carried in the third indication information and sent to the first IAB node together. In other words, the fourth indication information and the second information in S251 or the third indication information may be sent to the first IAB node in a same piece of signaling. Certainly, the fourth indication information, the second information in S251, and the third indication information may alternatively be sent to the first IAB node in different signaling. This is not limited herein in this embodiment of this application.

Optionally, in some possible implementations of this application, because the secondary donor node may be further divided into a secondary donor CU and a secondary donor DU, when the secondary donor DU allocates an IP address to the first IAB node, the secondary donor CU may forward, to the secondary donor DU, the first information sent by the first IAB node, and the secondary donor DU allocates the IP address to the first IAB node. The secondary donor DU may send the allocated IP address to the secondary donor CU, and the secondary donor CU notifies the first IAB node of the allocated IP address. Alternatively, the secondary donor DU may further send, to the secondary donor CU, at least one of an IP address prefix allocated to the first IAB node or first n bits of the IP address allocated to the first IAB node. Optionally, the secondary donor DU may further send the third indication information to the secondary donor CU.

Figure 12:
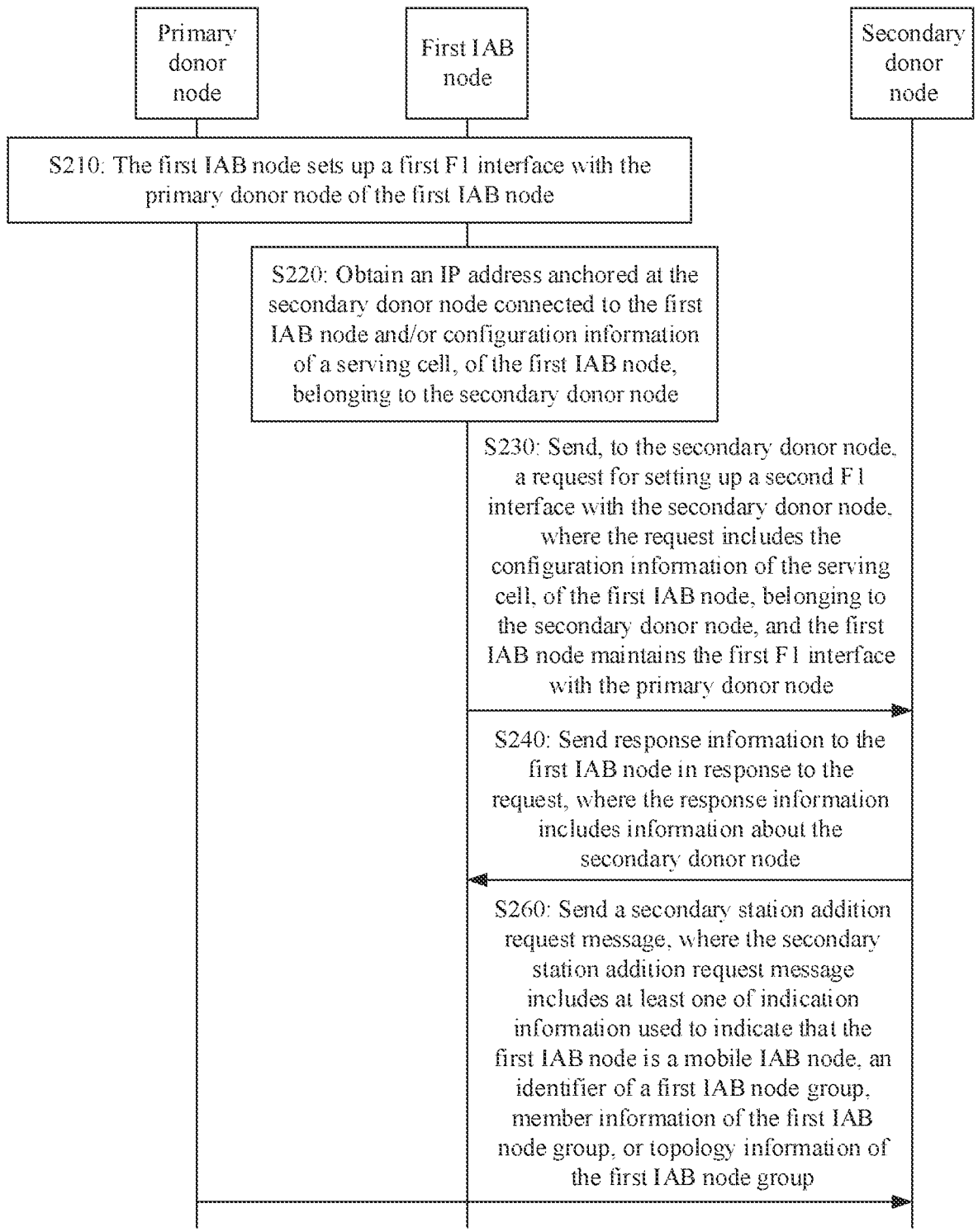
FIG. 12 is a schematic interaction diagram of an IAB node dual connectivity setup method according to still another embodiment of this application.

Optionally, in some other possible implementations of this application, FIG. 12 is a schematic flowchart of an IAB node dual connectivity setup method in some other embodiments of this application. The method 200 further includes S260 based on the steps in the method shown in FIG. 7.

S260: The primary donor node sends a secondary station addition request message to the secondary donor node, where the secondary station addition request message is used to request to add the secondary donor node as a secondary station of the first IAB node, and the secondary station addition request message includes:

at least one of indication information indicating that the first IAB node is a mobile IAB node, an identifier of a first IAB node group, member information of the first IAB node group, or topology information of the first IAB node group, where the first IAB node group is a group including the first IAB node and a child node of the first IAB node. Correspondingly, the secondary donor node receives the secondary station addition request message.

For steps S210, S220, S230, S240, and S260 shown in FIG. 12, refer to the foregoing related descriptions of S210, S220, S230, S240, and S250. For brevity, details are not described herein again.

To support IAB node group handover and reduce a service interruption latency caused by the handover, a dual connectivity procedure may be introduced before the IAB-MT of the first IAB node is handed over to a donor IAB donor, and a user plane backhaul link between the IAB-MT and the secondary IAB donor is set up in advance (where the backhaul link is used to transmit a service of a child node of an IAB node). In other words, before S220, the IAB-MT may add the secondary donor node as a secondary station of the IAB-MT. That is, the primary IAB donor is used as a primary station of the IAB-MT, and the secondary IAB donor is used as a secondary station of the IAB-MT. Before and after handover of the first IAB node, a DRB set up between the terminal device and the IAB-DU of the first IAB node remains unchanged.

Before the primary donor CU sends the secondary station addition request message to the secondary donor CU, the IAB-MT of the first IAB node may report a measurement result to the secondary donor CU through the primary donor DU. The measurement result includes quality of a link between the first IAB node and the secondary IAB donor, and the like. Based on the measurement result of the IAB-MT, for example, when the measurement result indicates that the quality of the link between the first IAB node and the secondary IAB donor is good, the primary donor CU determines to add the target IAB donor as a secondary station of the IAB-MT.

In S260, the primary donor CU may send the secondary station addition request message to the secondary donor CU. Optionally, the secondary station addition request message may be an S-Node Addition Request message. The secondary station addition request message is used to request to add the secondary donor node as a secondary station of the first IAB node, and the secondary station addition request message includes:

at least one of indication information indicating that the first IAB node is a mobile IAB node, an identifier of a first IAB node group, member information of the first IAB node group, or topology information of the first IAB node group. The first IAB node group is a group including the first IAB node and a child node of the first IAB node.

The identifier of the first IAB node group may be a group identifier (group ID) of the first IAB node group.

The member information of the first IAB node group may include information about the IAB-MT and information about all child nodes (for example, UE) of the IAB-MT. The information about the UE includes context information of the UE, an identifier of the UE (for example, a cell radio network temporary identifier (C-RNTI) or a CGI), quality of service (QoS) information of a service of the UE, and the like. The information about the IAB-MT includes bearer QoS information corresponding to a backhaul radio resource control link (BH RLC channel), set up by the IAB-MT, of a topology of the source IAB donor. Optionally, the member information of the first IAB node group may further include information about the IAB-DU, for example, an identifier of the IAB-DU, a name of the IAB-DU, an RRC version supported by the IAB-DU, and configuration information of a serving cell, of the IAB-DU, belonging to the primary donor node.

After the secondary donor CU receives the secondary station addition request message, the secondary donor CU sends a context setup request message of the child node (for example, the UE) of the IAB-MT to the secondary donor DU for the secondary donor DU to set up a context of the IAB-MT. After the secondary donor DU receives the context setup request message, the secondary donor DU sends a context setup response (UE Context Setup Response) message to the secondary donor CU.

After receiving the context setup response message, the secondary donor CU sends a secondary station addition response message to the primary donor node (primary donor CU). In other words, the secondary donor node sends the secondary station addition response message to the primary donor node. Optionally, the secondary station addition response message may be an S-Node Addition Request Acknowledge message.

The secondary station addition response message includes at least one of an IP address, of the first IAB node (specifically, the IAB-DU), anchored at the secondary donor node or an IP address of the secondary donor node (specifically, the secondary donor CU).

Optionally, the secondary station addition response message may further include at least one of identifiers (for example, XnAP IDs) of the first IAB node and the child node of the first IAB node on an Xn interface or a tunnel identifier allocated by the secondary donor CU to a bearer of the child node of the first IAB node. The Xn interface is a communication interface between the primary donor node and the secondary donor node. Optionally, the tunnel identifier allocated to the bearer of the child node of the first IAB node may include an IP address of a tunnel and a GTP-tunnel endpoint identifier (Tunnel Endpoint ID, TEID).

Further, the primary donor CU sends an RRC reconfiguration message to the IAB-MT, where the RRC reconfiguration message is used to indicate the IAB-MT to use the secondary IAB donor as a secondary station, and trigger initiation of a random access procedure to the secondary IAB donor.

After receiving the RRC reconfiguration message, the IAB-MT sends an RRC reconfiguration complete message to the primary donor CU. After receiving the RRC reconfiguration complete message, the primary donor CU sends a secondary node configuration complete (S-Node Reconfiguration Complete) message to the secondary donor CU.

Afterwards, the IAB-MT triggers the random access (Random Access Channel, RACH) procedure with the secondary IAB donor. After the RACH procedure, the IAB-MT performs security protection by using a peer security key of the target donor CU. In addition, the IAB-DU further obtains the configuration information of the serving cell, of the IAB-DU, belonging to the secondary IAB donor.

For example, the IAB-DU may request, from the OAM server through the primary IAB donor, to obtain the configuration information of the serving cell, of the IAB-DU, belonging to the secondary IAB donor. Alternatively, the LAB-DU requests, from the OAM server through the secondary IAB donor, to obtain configuration information of a new cell, of the IAB-DU, belonging to the secondary IAB donor.

Further, the IAB-DU obtains information about the IP address, of the IAB-DU, anchored at the target IAB donor.

For the obtaining, by the IAB-DU, the configuration information of the serving cell, of the IAB-DU, belonging to the secondary IAB donor, and obtaining the information about the IP address of the IAB-DU, anchored at the target IAB donor, refer to the foregoing related descriptions in S220. For brevity, details are not described herein again.

Then, the IAB-DU sets up an SCTP connection to the secondary donor CU and sets up, in advance, an F1 interface between the IAB-DU and the secondary donor CU.

According to the foregoing procedure, a dual connectivity procedure may be introduced before the IAB-MT of the first IAB node is handed over to a donor IAB donor, a user plane backhaul link between the IAB-DU and the secondary IAB donor is set up in advance, and the IAB-MT may add the secondary donor node as a secondary station of the IAB-MT. In other words, the IAB-MT is connected to both the primary donor CU and the secondary donor CU, where the primary donor CU is used as a primary station, and the secondary donor CU is used as a secondary station. In addition, the F1 interface between the IAB-DU and the secondary donor CU is set up in advance, that is, the IAB-DU sets up the F1 interfaces with both the two donor CUs.

According to the IAB node dual connectivity setup method provided in this application, a dual connectivity procedure is introduced before IAB node handover. In a process in which an IAB node adds a secondary station, a primary IAB donor sends information about an IAB node group to a secondary IAB donor, and sets up a user plane backhaul link between the IAB node and the secondary IAB donor in advance. When donor node handover is performed subsequently, only an identifier of the IAB node group needs to be notified to the secondary IAB donor in a handover request, to reduce a handover processing latency in a subsequent handover process.

It should be understood that, the method shown in FIG. 8 to FIG. 11 may alternatively include S270.

Figure 13:
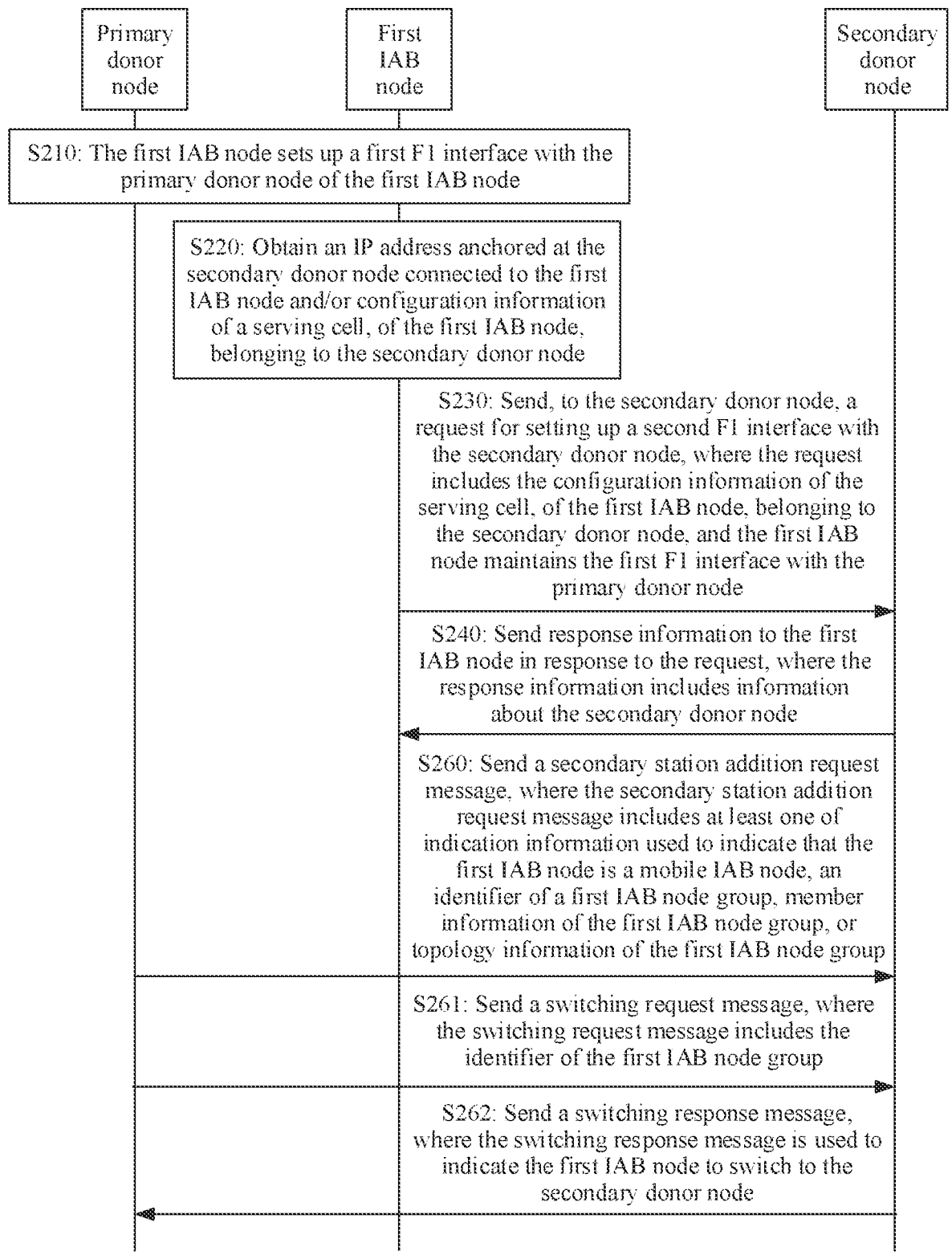
FIG. 13 is a schematic interaction diagram of an IAB node dual connectivity setup method according to still another embodiment of this application.

Optionally, in some other possible implementations of this application, FIG. 13 is a schematic flowchart of an IAB node dual connectivity setup method in some other embodiments of this application. The method 200 further includes S261 and S262 based on the steps in the method shown in FIG. 12.

S261: The primary donor node sends a handover request message to the secondary donor node, where the handover request message includes the identifier of the first IAB node group.

S262: The secondary donor node sends a handover response message to the primary donor node, where the handover response message is used to indicate the first IAB node to be handed over to the secondary donor node.

For steps S210, S220, S230, S240, and S260 shown in FIG. 13, refer to the foregoing related descriptions of S210, S220, S230, S240, and S260. For brevity, details are not described herein again.

When the quality of the link between the IAB-MT of the first IAB node and the primary IAB donor becomes worse, and the quality of the link between the IAB-MT and the secondary IAB donor becomes better, the IAB-MT performs an IAB node group handover procedure.

In S261, that the primary donor node sends the handover request message to the secondary donor node may be specifically: The primary donor CU of the primary donor node sends the handover request message to the secondary donor CU of the secondary donor node, where the handover request message may be an existing handover request message, or may be a newly defined IAB group handover request message, and the handover request message carries the identifier of the first IAB node group (for example, a group ID). In the secondary station addition process in S270, the primary IAB donor has sent contexts of the first IAB node and the child node of the first IAB node to the secondary IAB donor. Therefore, the handover request message in S271 needs to carry only the identifier of the first IAB node group, and the primary IAB donor can find context information of all members in the first IAB node group based on the identifier of the first IAB node group.

In S262, that the secondary donor node sends the handover response message to the primary donor node may be specifically: The secondary IAB donor sends the handover response message to the primary IAB donor, where the handover response message may be an existing handover response message, or may be a newly defined IAB group handover response message. The handover response message is used to indicate the first IAB node to be handed over to the secondary donor node, that is, indicate the IAB-MT to be handed over to the secondary donor CU.

Optionally, the handover response message carries at least one of the following information:

at least one of handover command information instructing the IAB-MT to execute handover or configuration information of the child node of the first IAB node. The handover command information is used to set up an air interface DRB between the IAB-MT and the secondary IAB donor. For example, when the child node of the first IAB node is UE, the configuration information of the child node of the first IAB node may include an association relationship between a UE PDCP and a DRB ID, and the like.

After the primary donor CU sends the handover command information to the first IAB node, the IAB-MT of the first IAB node is handed over to the secondary IAB donor, and removes a connection to the primary IAB donor. In this case, the secondary donor CU is used as a unique donor node connected to the IAB-MT, and then the first IAB node may perform data or signaling transmission with the secondary IAB donor.

In a process of donor node handover, the primary donor CU notifies, in the handover request message, the secondary donor CU of only a group identifier of an IAB node that needs to be handed over, and does not need to notify the secondary donor CU of context information of the IAB node and the child node of the IAB node, to reduce a handover processing latency in a subsequent handover process and improve handover efficiency.

Optionally, the primary donor node may further send, to the first IAB node, an IP address, of the first IAB node, anchored at the first donor node and/or configuration information of a serving cell, of the first IAB node, belonging to the first donor node. Specifically, the primary donor CU of the primary donor node may send, to the IAB-DU of the first IAB node, a new IP address, of the IAB-DU, anchored at the secondary donor CU connected to the IAB-DU and/or the configuration information of the serving cell, of the IAB-DU, belonging to the donor CU.

Figure 14:
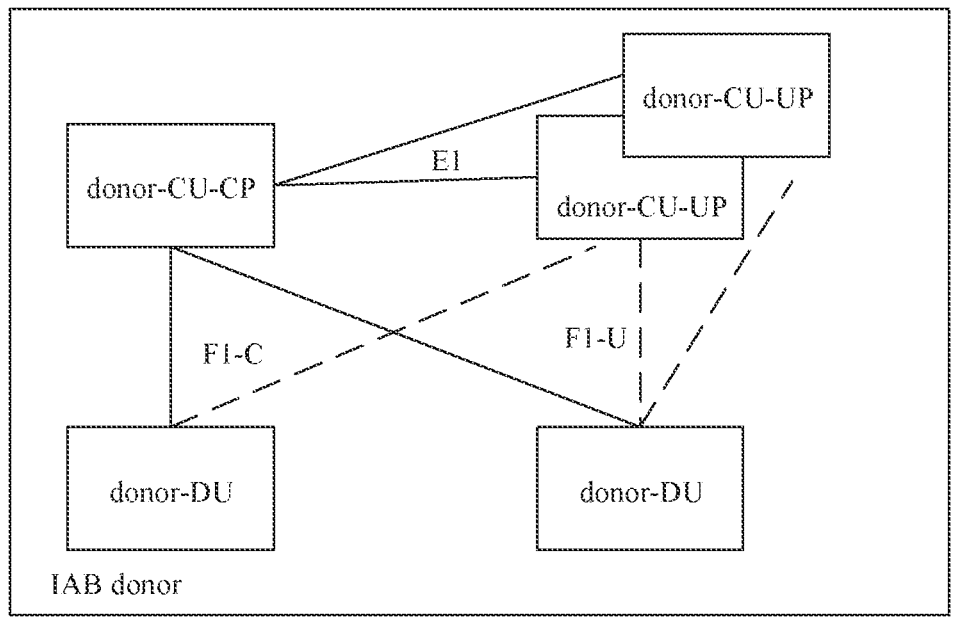
FIG. 14 is a schematic diagram of an application scenario of a method for reporting support of an IAB function according to an embodiment of this application.

This application further provides a method for reporting support of an IAB function. The method may be applied to an IAB communication network. The IAB communication network includes an IAB donor node, the IAB donor node includes a centralized unit CU and at least one distributed unit DU, and the CU includes a centralized unit-user plane CU-CP entity and a CU-UP entity. The CU and the DU may be deployed on different physical devices, or the CU-UP entity and the CU-CP entity may be deployed on a same physical device. An application scenario of the method may be shown in FIG. 14. As shown in FIG. 14, the IAB donor may use an architecture in which a control plane CP and a user plane UP are split. In other words, the IAB donor includes an IAB donor CU (or may be referred to as a donor CU) and an IAB donor DU (or may be referred to as a donor DU), and the donor CU and the donor DU may be deployed on different physical devices, or may be deployed on a same physical device. Further, the donor CU may be divided into a CU-CP entity and at least one CU-UP entity. The CU-CP entity is a control plane entity, and is configured to provide a signaling control function. The CU-UP entity is a user plane entity, and is configured to provide transmission of data of a terminal device. The CU-CP entity and the CU-UP entity are connected through an E1 interface, the CU-CP entity and the donor DU are connected through an F1-C interface, and the CU-UP entity and the donor DU are connected through an F1-U interface. The CU-CP includes an RRC function and a PDCP control plane function (for example, configured to process data on a signaling radio bearer). The CU-UP includes an SDAP function and a PDCP user plane function (for example, configured to process data on a radio bearer of the user equipment).

Figure 15:
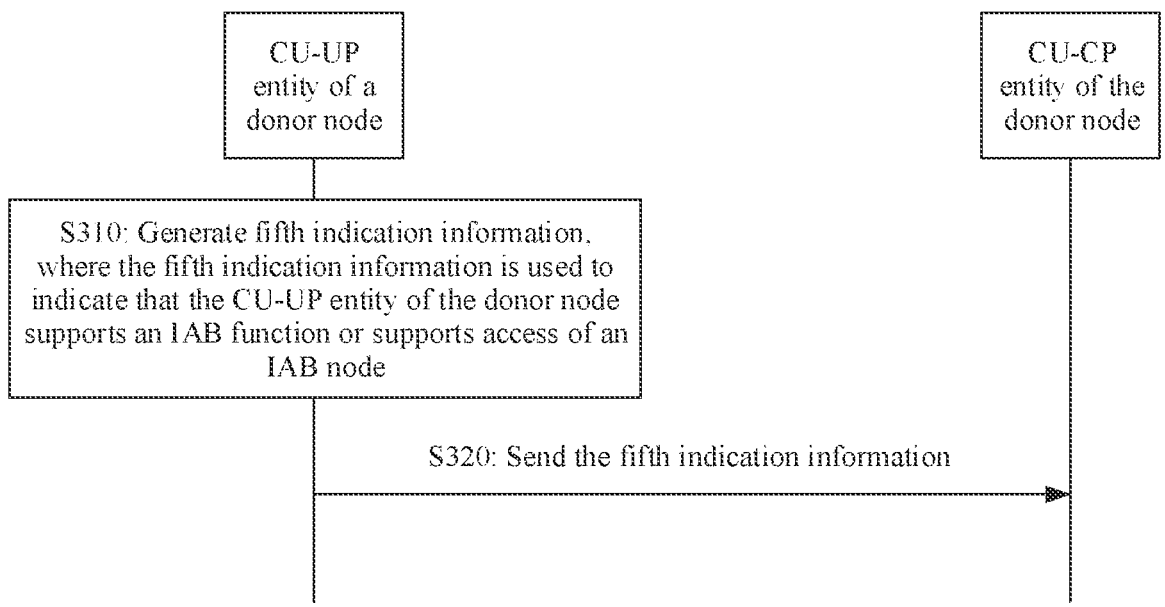
FIG. 15 is a schematic interaction diagram of a method for reporting support of an IAB function according to an embodiment of this application.

FIG. 15 is a schematic flowchart of a method 300 for reporting support of an IAB function according to an embodiment of this application. As shown in FIG. 15, the method 300 shown in FIG. 15 may include step S310 and step S320. The following describes in detail the steps in the method 300 with reference to FIG. 15. The method 300 includes S310 and S320.

S310: A CU-UP entity of a donor node generates fifth indication information, where the fifth indication information is used to indicate that the CU-UP entity of the donor node supports an IAB function or supports access of an IAB node.

S320: The CU-UP entity of the donor node sends the fifth indication information to a CU-CP entity of the donor node.

Specifically, in a scenario in which a donor CU uses a CP-UP split architecture, to be specific, the donor CU includes one CU-CP (or may be referred to as a donor-CU-CP) entity and a plurality of CU-UP (or may be referred to as a donor-CU-UP) entities, to help a donor DU perform routing and bearer mapping, the CU-UP entity of the donor node needs to attach a differentiated services code point (DSCP)/flow label to data of a terminal device based on configuration of the CU-CP entity of the donor node. That is, in an IAB scenario, the CU-UP entity of the donor node needs to perform an additional label attaching operation. Therefore, the CU-CP entity of the donor node needs to know whether the CU-UP entity of the donor node supports the function, so that the CU-UP entity that is of the donor node and that supports the function can be selected for the terminal device to perform data transmission. That the CU-UP entity of the donor node supports the IAB function, supports access of the IAB node, or supports IAB may be understood as that the CU-UP entity of the donor node supports attaching the DSCP/flow label to the data of the terminal device. For example, if the CU-UP entity of the donor node supports attaching or can attach the DSCP/flow label to the data of the terminal device, the CU-UP entity of the donor node supports the IAB function or supports access of the IAB node. Therefore, in S310, any one of a plurality of CU-UP entities may generate the fifth indication information or support IAB, where the fifth indication information is used to indicate that the CU-UP entity of the donor node supports the IAB function or supports access of the IAB node. In S320, the CU-UP entity of the donor node sends the fifth indication information to the CU-CP entity of the donor node. After receiving the fifth indication information, the CU-CP entity of the donor node may determine that the CU-UP entity of the donor node supports the IAB function, supports access of the IAB node, or supports IAB. In this way, when selecting CU-UP entities of the donor node to perform data transmission, the CU-CP entity of the donor node can accurately select CU-UP entities that are of the donor node and that support IAB, and use the CP-UP entities of the donor node to perform routing and bearer mapping before sending data, so as to ensure normal user-plane transmission and ensure quality and efficiency of data transmission of a terminal device.

Optionally, in a possible implementation, the fifth indication information performs indication based on each public land mobile network (PLMN). One PLMN may be understood as one operator. For example, China Mobile, China Unicorn, and China Telecom correspond to different PLMNs. The CU-UP entities of the donor node may be leased by different operators together, some of the operators configure that the CU-UP entity of the donor node leased by the operators supports the IAB function, supports access of the IAB node, or supports IAB, and some of the operators configure that the CU-UP entity of the donor node leased by the operators does not support the IAB function, does not support access of the IAB node, or does not support IAB. Therefore, the fifth indication information may perform indication based on the PLMN.

Figure 16:
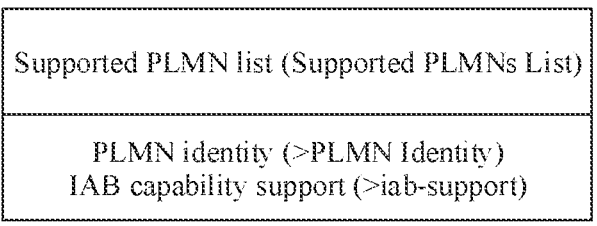
FIG. 16 is a schematic diagram of a supported PLMN list according to an embodiment of this application.

Optionally, the fifth indication information is in one-to-one correspondence with a PLMN identity. For example, the CU-UP entity of the donor node sends a list, for example, a supported PLMN list (Supported PLMNs List), to the CU-CP entity of the donor node. FIG. 16 shows an example of the Supported PLMNs List. As shown in FIG. 16, the list includes a plurality of items, and each item includes one PLMN identity (for example, a PLMN Identity) and one piece of fifth indication information (for example, iab-support). For example, if iab-support is set to true or 1, it indicates that a CU-UP that is of the donor node and that corresponds to the PLMN supports IAB. If iab-support is set to false or 0, it indicates that a CU-UP that is of the donor node and that corresponds to the PLMN does not support IAB.

It should be understood that, the foregoing example is merely used to describe an example of content specifically included when the fifth indication information performs indication based on the PLMN, and should not impose any limitation on a specific form of the fifth indication information or content included in the fifth indication information. This is not limited herein in this application.

Optionally, in another possible implementation, the fifth indication information may perform indication based on one CU-UP entity of the donor node, to be specific, fifth indication information sent by one CU-UP entity of the donor node is used to indicate that the CU-UP entity of the donor node supports the IAB function, supports access of the IAB node, or supports IAB.

Figure 17:
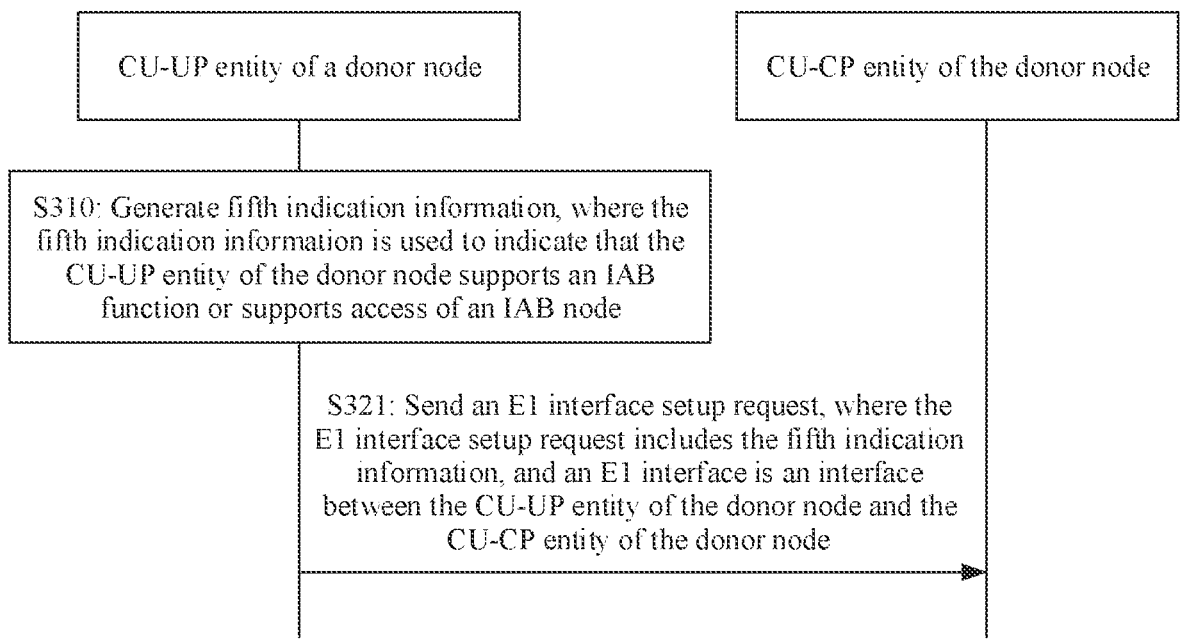
FIG. 17 is a schematic interaction diagram of a method for reporting support of an IAB function according to another embodiment of this application.

Optionally, in some possible implementations of this application, FIG. 17 is a schematic flowchart of a method for reporting support of an IAB function in some other embodiments of this application. S320 in the method 300 may include S321 based on the steps in the method shown in FIG. 15.

S321: The CU-UP entity of the donor node sends an E1 interface setup request to the CU-CP entity of the donor node, where the E1 interface setup request includes the fifth indication information, and an E1 interface is an interface between the CU-UP entity of the donor node and the CU-CP entity of the donor node.

For step S310 shown in FIG. 17, refer to the foregoing related descriptions of S310. For brevity, details are not described herein again.

In an E1 interface setup process, the CU-UP entity of the donor node may actively report information about a capability that the CU-UP entity supports IAB. That is, E1 interface setup may be triggered by the CU-UP entity of the donor node. In S321, the CU-UP entity of the donor node may carry the fifth indication information in the E1 interface setup request (E1 Setup Request) message sent to the CU-CP entity of the donor node, and the fifth indication information is used to indicate that the CU-UP entity of the donor node supports the IAB function, supports IAB, or supports access of the IAB node. Optionally, the fifth indication information may perform indication based on each PLMN, or may perform indication based on one CU-UP entity of the donor node. The CU-UP entity of the donor node actively triggers E1 interface setup, and carries, in the E1 interface setup request message, indication information indicating that the CU-UP entity of the donor node supports the IAB function, supports access of the IAB node, or supports IAB, to help the CU-CP entity of the donor node select an appropriate CU-UP entity of the donor node, and improve resource utilization.

Figure 18:
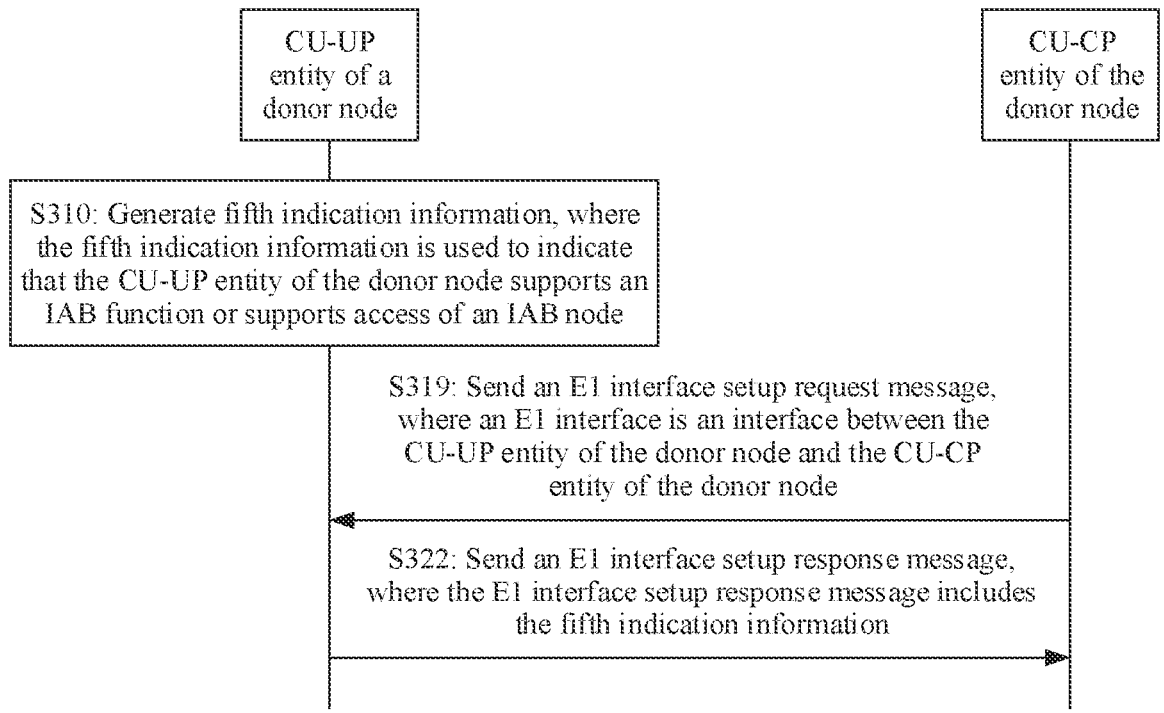
FIG. 18 is a schematic interaction diagram of a method for reporting support of an IAB function according to another embodiment of this application.

Optionally, in some other possible implementations of this application, FIG. 18 is a schematic flowchart of a method for reporting support of an IAB function in some other embodiments of this application. The method 300 may further include S322 based on the steps in the method shown in FIG. 15.

S319: The CU-CP entity of the donor node sends an E1 interface setup request message to the CU-UP entity of the donor node, where an E1 interface is an interface between the CU-UP entity of the donor node and the CU-CP entity of the donor node.

S320 in the method 300 may include S322.

S322: The CU-UP entity of the donor node sends an E1 interface setup response message to the CU-CP entity of the donor node, where the E1 interface setup response message includes the fifth indication information.

For step S310 shown in FIG. 18, refer to the foregoing related descriptions of S310. For brevity, details are not described herein again.

Not only the CU-UP entity of the donor node can actively trigger E1 interface setup, but also the CU-CP entity of the donor node can actively trigger E1 interface setup. In S319, the CU-CP entity of the donor node may send the E1 interface setup request (E1 Setup Request) message to the CU-UP entity of the donor node, to request to set up the E1 interface between the CU-UP entity of the donor node and the CU-CP entity of the donor node. Optionally, the E1 interface setup request message may carry one piece of indication information. The indication information is used to indicate the CU-UP entity of the donor node to report a capability that the CU-UP entity of the donor node supports the IAB function, supports access of the IAB node, or supports IAB. After the CU-UP entity of the donor node receives the E1 interface setup request message, in S322, the CU-UP entity of the donor node sends the E1 interface setup response (E1 Setup Response) message to the CU-CP entity of the donor node, where the E1 interface setup response message includes the fifth indication information. Optionally, the fifth indication information may perform indication based on each PLMN, or may perform indication based on one CU-UP entity of the donor node. The CU-CP entity of the donor node actively triggers E1 interface setup, and sends the E1 interface setup request message to the CU-UP entity of the donor node. The CU-UP entity of the donor node carries, in the fed back E1 interface setup response message, indication information indicating that the CU-UP entity of the donor node supports the IAB function, supports access of the IAB node, or supports IAB, to help the CU-CP entity of the donor node select an appropriate CU-UP entity of the donor node, and improve resource utilization.

Figure 19:
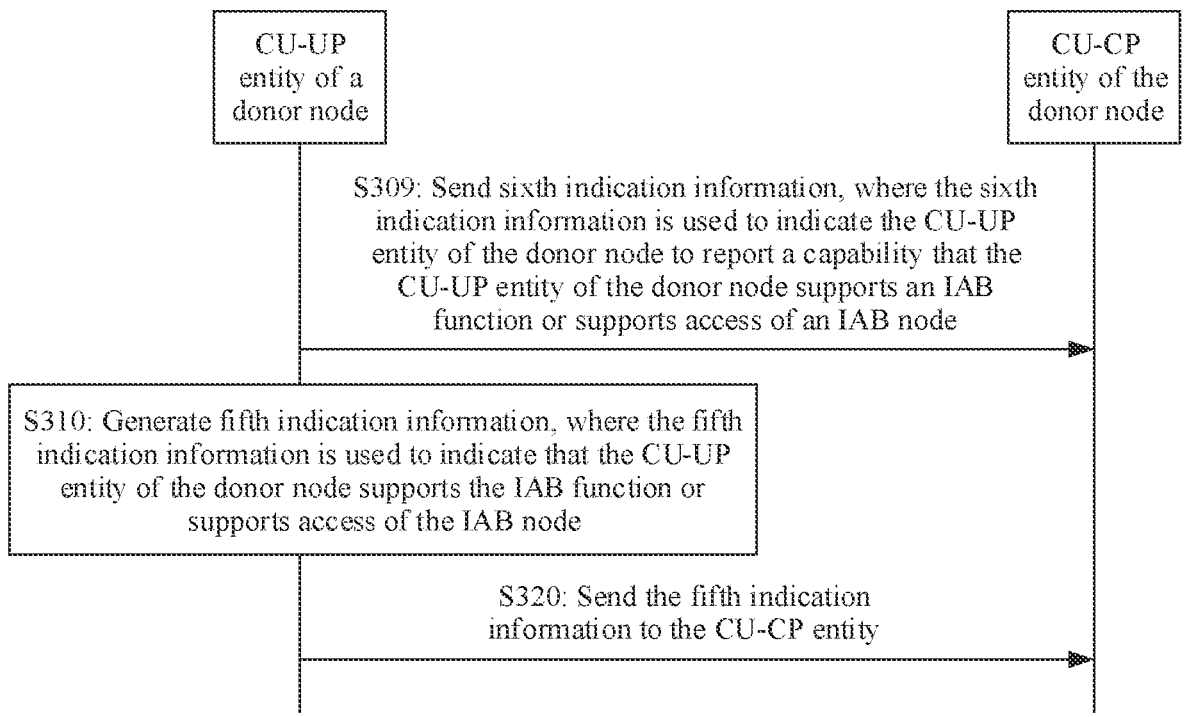
FIG. 19 is a schematic interaction diagram of a method for reporting support of an IAB function according to another embodiment of this application.

Optionally, in some other possible implementations of this application, FIG. 19 is a schematic flowchart of a method for reporting support of an IAB function in some other embodiments of this application. The method 300 may further include S309 based on the steps in the method shown in FIG. 15.

S309: The CU-CP entity of the donor node sends sixth indication information to the CU-UP entity of the donor node, where the sixth indication information is used to indicate the CU-UP entity of the donor node to report a capability that the CU-UP entity of the donor node supports the IAB function or supports access of the IAB node.

For steps S310 and S320 shown in FIG. 19, refer to the foregoing related descriptions of S310 and S320. For brevity, details are not described herein again.

Before S310, that is, in S309, the CU-CP entity of the donor node may send the sixth indication information to the CU-UP entity of the donor node, where the sixth indication information is used to indicate the CU-UP entity of the donor node to report the capability that the CU-UP entity of the donor node supports the IAB function, supports access of the IAB node, or supports IAB. That is, the CU-CP entity of the donor node may indicate the CU-UP entity of the donor node to report the capability that the CU-UP entity of the donor node supports the IAB function, supports access of the IAB node, or supports IAB. After receiving the sixth indication information, the CU-UP entity of the donor node determines that the CU-UP entity of the donor node needs to report the capability of supporting the IAB function, supporting access of the IAB node, or supporting IAB, so that S310 and S320 can be performed.

Optionally, the sixth indication information may be an E1 interface setup request message.

Figure 20:
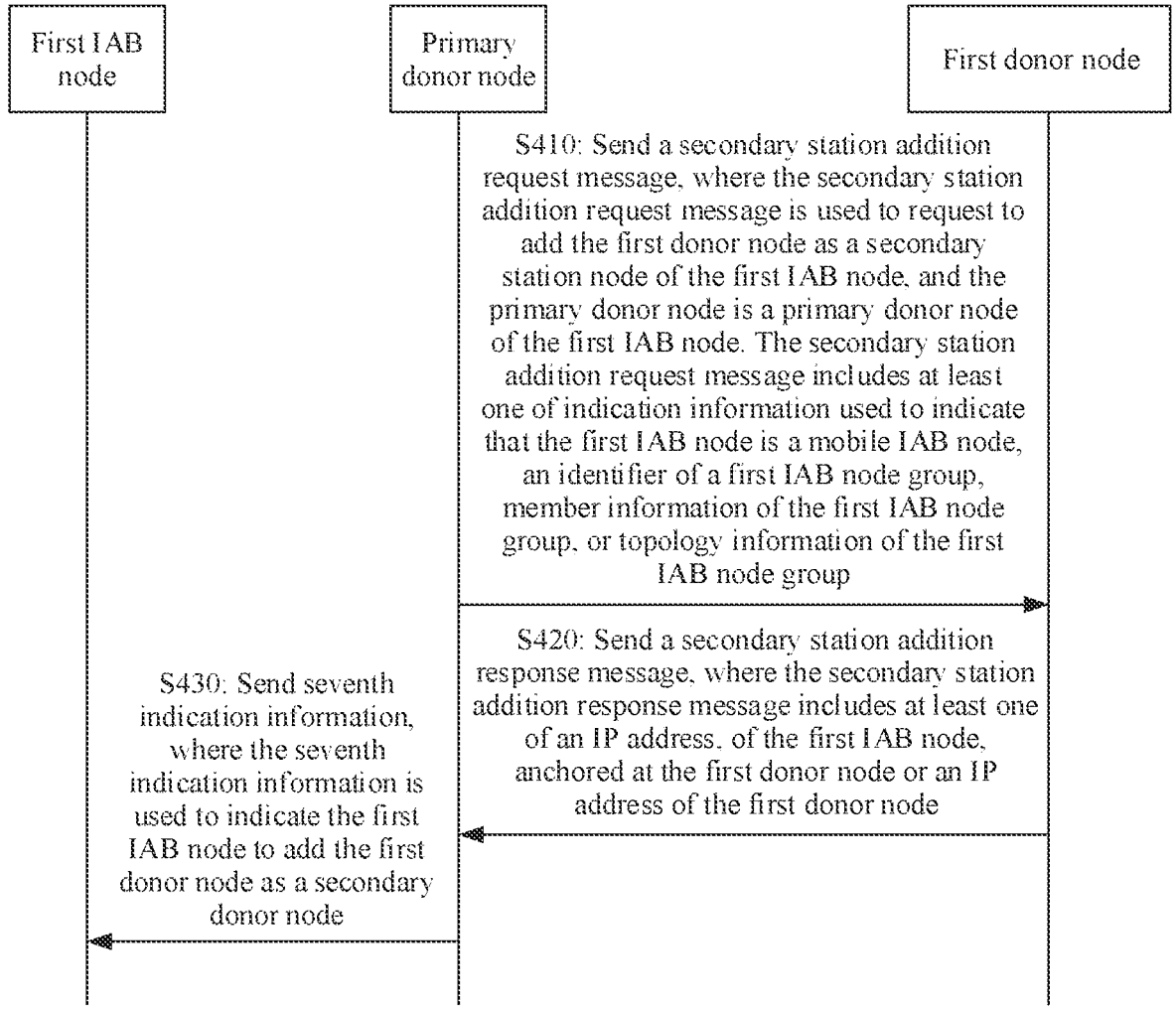
FIG. 20 is a schematic flowchart of a method for adding a secondary station by an IAB node according to an embodiment of this application.

This application further provides a method for adding a secondary station by an IAB node. The method 400 may be applied to the application scenario shown in FIG. 6. FIG. 20 is a schematic flowchart of a method for adding a secondary station by an IAB node according to an embodiment of this application. As shown in FIG. 20, the method 400 shown in FIG. 20 may include step S410 and step S420. The following describes in detail the steps in the method 400 with reference to FIG. 20.

S410: A primary donor node sends a secondary station addition request message to a first donor node, where the secondary station addition request message is used to request to add the first donor node as a secondary donor node of a first IAB node, and the primary donor node is a primary donor node of the first IAB node. The secondary station addition request message includes at least one of indication information indicating that the first IAB node is a mobile IAB node, an identifier of a first IAB node group, member information of the first IAB node group, or topology information of the first IAB node group, where the first IAB node group is a group including the first IAB node and a child node of the first IAB node. Correspondingly, the first donor node receives the secondary station addition request message.

S420: The first donor node sends a secondary station addition response message to the primary donor node, where the secondary station addition response message includes at least one of an IP address, of the first IAB node, anchored at the first donor node or an IP address of the first donor node.

S430: The primary donor node sends seventh indication information to the first IAB node, where the seventh indication information is used to indicate the first IAB node to add the first donor node as a secondary donor node (or secondary station).

Specifically, the first donor node may be a first IAB donor, and the first IAB donor may include a donor CU and a donor DU. The first IAB donor is equivalent to the secondary donor node in the method 200. The first IAB node may be a mobile IAB node, and the first IAB node has set up a connection to the primary donor node (or referred to as a source donor node) of the first IAB node and performs data transmission. The first IAB node may include an IAB-MT and an IAB-DU, and the primary donor node may include a primary donor CU and a primary donor DU. In addition, the IAB-MT of the first IAB node has been connected to the primary donor CU, the IAB-DU of the first IAB node has set up an F1 interface with the primary donor CU, and corresponding GTP tunnels have been set up, for different bearers of the child node of the first IAB node, between the IAB-DU and the primary donor CU.

To support IAB node group handover and reduce a service interruption latency caused by the handover, a dual connectivity procedure may be introduced before the IAB-MT of the first IAB node is handed over to a donor IAB donor, and a user plane backhaul link between the IAB-MT and the first IAB donor is set up in advance (where the backhaul link is used to transmit a service of the child node of an IAB node).

The first donor node in the method 400 is equivalent to the secondary donor node in the method 200. For specific descriptions of S410, S420, and S430, refer to related specific descriptions of S260 in the method 200. For brevity, details are not described herein again.

According to the method for adding a secondary station by an IAB node provided in this application, a dual connectivity procedure is introduced before IAB node handover. In a process in which an IAB node adds a secondary station, a primary IAB donor sends information about an IAB node group to a first IAB donor, and sets up a user plane backhaul link between the IAB node and the first IAB donor. When donor node handover is performed subsequently, only an identifier of the IAB node group needs to be notified to the first donor node in a handover request, to reduce a handover processing latency in a subsequent handover process.

Optionally, the member information of the first IAB node group includes:

at least one of an identifier of the child node of the first IAB node, quality of service QoS information of a service of the child node of the first IAB node, or QoS corresponding to a backhaul radio link control channel of the first IAB node under a topology of the primary donor node.

Optionally, in a possible implementation, the method 400 further includes the following steps.

S440: The primary donor node sends a handover request message to the first donor node, where the handover request message includes the identifier of the first IAB node group.

S450: The primary donor node receives a handover response message from the first donor node, where the handover response message is used to indicate the first IAB node to be handed over to the first donor node.

For specific descriptions of S440 and S450, refer to related specific descriptions of S271 and S272 in the method 200. For brevity, details are not described herein again.

Optionally, in a possible implementation, the method 400 further includes: The primary donor node sends, to the first IAB node, the IP address, of the first IAB node, anchored at the first donor node and/or configuration information of a serving cell, of the first IAB node, belonging to the first donor node. Specifically, the primary donor CU of the primary donor node may send, to the IAB-DU of the first IAB node, a new IP address, of the IAB-DU, anchored at the secondary donor CU connected to the IAB-DU and/or the configuration information of the serving cell, of the IAB-DU, belonging to the donor CU.

It should be understood that, for a specific process of the method 400 and the implementations of the method 400, refer to related descriptions of the method 200. For brevity, details are not described herein again.

According to the method for adding a secondary station by an IAB node provided in this application, it is considered that a dual connectivity procedure is introduced before an IAB-MT of an IAB node is handed over to a donor node, and a user plane backhaul link between the IAB-MT and a first IAB donor (or a secondary IAB donor) is set up in advance. When quality of a link between the IAB-MT and a primary IAB donor becomes worse and quality of a link between the IAB-MT and the first IAB donor becomes better, a handover procedure is performed, the IAB-MT is handed over to the first IAB donor, and removes the link between the IAB-MT and the primary IAB donor, to reduce a service interruption latency in the handover process.

This application further provides a method for obtaining an IP address of an IAB node. The method may be applied a scenario in which if a donor DU to which an IAB node is attached or connected changes, for example, as shown in FIG. 6, handover from the primary donor DU to the secondary donor DU, the IAB node needs to re-obtain more IP addresses. Alternatively, the method may be further applied to a scenario in which an IAB node determines, based on implementation of the IAB node, to request more IP addresses (request more IP addresses based on an upper-layer service requirement of the IAB node) or a scenario in which the IAB node needs to obtain more IP addresses during or after an RRC re-setup or handover process, or in an initial access process of the IAB node.

Figure 21:
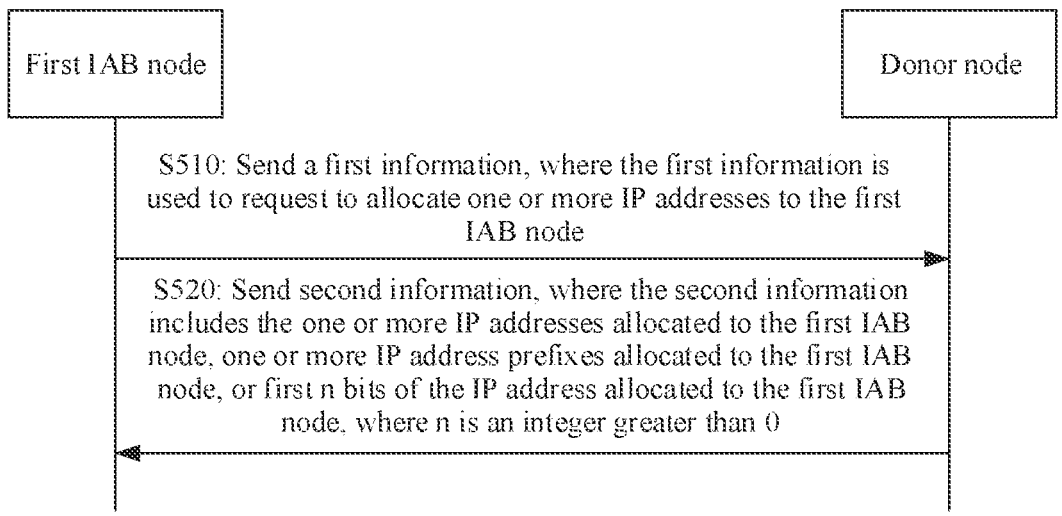
FIG. 21 is a schematic flowchart of a method for obtaining an IP address of an IAB node according to an embodiment of this application.

FIG. 21 is a schematic flowchart of a method 500 for obtaining an IP address of an IAB node according to an embodiment of this application. The method 500 further includes S510 and S520.

S510: A first IAB node sends first information to a donor node of the first IAB node, where the first information is used to request to allocate one or more IP addresses to the first IAB node.

S520: The donor node sends second information to the first IAB node, where the second information includes the one or more IP addresses allocated to the first IAB node, one or more IP address prefixes allocated to the first IAB node, or first n bits of the IP address allocated to the first IAB node, where n is an integer greater than 0.

Specifically, the first IAB node may be a mobile IAB node or an IAB node that does not move. The first IAB node may be in dual connectivity, to be specific, the first IAB node is connected to both two donor nodes, or the first IAB node may be connected only to one donor node. The first IAB node may include an IAB-MT and an IAB-DU. The donor node is a donor node currently connected to the first IAB node. For example, the donor node may be a primary donor node of the first IAB node, or a secondary donor node of the first IAB node. The donor node may include a donor CU and a donor DU.

In S510, that a first IAB node sends first information to a donor node of the first IAB node may be specifically: The first IAB node sends the first information to the donor CU of the donor node. Correspondingly, the donor CU receives the first information.

In S520, after the donor CU receives the first information, the donor CU may allocate one or more IP addresses to the first IAB node, or the donor CU may request another node to allocate one or more IP addresses to the first IAB node, where the another node may be a donor DU, an OAM server, a DHCP server, or the like. After allocating one or more IP addresses to the first IAB node, the nodes may send the allocated one or more IP addresses to the donor CU. The donor CU may send second information to the first IAB node, where the second information includes the one or more IP addresses allocated by the donor CU or the one or more IP addresses allocated by the another node to the first IAB node.

Optionally, the second information may include at least one of the one or more IP addresses allocated to the first IAB node, the one or more IP address prefixes allocated to the first IAB node, or first n bits of the one or more IP address allocated to the first IAB node, where n is an integer greater than 0.

For specific descriptions of S510 and S520, refer to the descriptions of S250 and S251 in the method 200. For brevity, details are not described herein again.

According to the method for obtaining an IP address of an IAB node provided in this application, when an IAB node needs to obtain more IP addresses, the IAB node may request a donor CU to which the IAB node is attached to allocate more IP addresses to the IAB node, to satisfy a requirement of communication between the IAB node and new donor nodes (for example, the donor CU and a donor DU). This can ensure normal communication between the IAB node and a target donor node, and ensure communication efficiency.

Optionally, in a specific implementation, the first information includes at least one of a quantity of IP addresses requested to be allocated to the first IAB node, a length of the one or more IP address prefixes requested to be allocated to the first IAB node, or a value of n of first n bits of the IP address requested to be allocated to the first IAB node.

Optionally, in a specific implementation, the donor CU may be further divided into a CU-CP entity and at least one CU-UP entity. The CU-UP entity and the CU-CP entity may be on different physical devices or on a unified physical device. The first information may further include at least one of a quantity of IP addresses requested to be allocated to an F1-C interface, a length of the one or more IP address prefixes requested to be allocated to the F1-C interface, a value of x of first x bits of the IP address requested to be allocated to the F1-C interface, a quantity of IP addresses requested to be allocated to an F1-U interface, a length of the one or more IP address prefixes requested to be allocated to the F1-U interface, or a value of y of first y bits of the IP address requested to be allocated to the F1-U interface. The F1-C interface is a communication interface between the first IAB node and the CU-CP entity, and the F1-U interface is a communication interface between the first IAB node and the CU-UP entity. Both x and y are integers greater than 0. For example, if the first information includes the first n bits of the IP address requested to be allocated to the first IAB node, the quantity of IP addresses requested to be allocated to the first IAB node=$2^{(total\ quantity\ of\ bits\ of\ the\ IP\ address-n)}$. If the first information further includes the first x bits of the IP address requested to be allocated to the F1-C interface, the quantity of IP addresses requested to be allocated to the F1-C interface=$2^{(total\ quantity\ of\ bits\ of\ the\ IP\ address-x)}$. Similarly, if the quantity of IP addresses requested to be allocated to the F1-U interface=$2^{(total\ quantity\ of\ bits\ of\ the\ IP\ address-y)}$, $2^{(total\ quantity\ of\ bits\ of\ the\ IP\ address-n)} = 2^{(total\ quantity\ of\ bits\ of\ the\ IP\ address-x)} + 2^{(total\ quantity\ of\ bits\ of\ the\ IP\ address-y)}$.

It should be understood that, the quantity of IP addresses requested to be allocated to the F1-C interface/the length of the one or more IP address prefixes requested to be allocated to the F1-C interface/the value of x of the first x bits of the IP address requested to be allocated to the F1-C interface specifically refers to a quantity of IP addresses requested to be allocated to the first IAB node on the F1-C interface/a length of the one or more IP address prefixes requested to be allocated to the first IAB node on the F1-C interface/a value of x of first x bits of the IP address requested to be allocated to the first IAB node on the F1-C interface. Similarly, the quantity of IP addresses requested to be allocated to the F1-U interface/the length of the one or more IP address prefixes requested to be allocated to the F1-U interface/the value of y of the first y bits of the IP address requested to be allocated to the F1-U interface specifically refers to a quantity of IP addresses requested to be allocated to the first IAB node on the F1-U interface/a length of the one or more IP address prefixes requested to be allocated to the first IAB node on the F1-U interface/a value of y of first y bits of the IP address requested to be allocated to the first IAB node on the F1-U interface.

Optionally, in a specific implementation, the method 500 further includes:

The donor node sends third indication information to the first IAB node, where the third indication information is used to indicate at least one of a first IP address used for the F1-U interface in the one or more IP addresses allocated to the first IAB node, a first IP address prefix used for the F1-U interface in the one or more IP address prefixes allocated to the first IAB node, first y bits of the first IP address used for the F1-U interface, a second IP address used for the F1-C interface in the one or more IP addresses allocated to the first IAB node, a second IP address prefix used for the F1-C interface in the one or more IP address prefixes allocated to the first IAB node, or first x bits of the second IP address used for the F1-C interface.

Optionally, in a specific implementation, because the donor node may be further divided into a donor CU and at least one donor DU, the method 500 further includes: The donor CU sends fourth indication information to the first IAB node, where the fourth indication information is used to indicate information that is about the donor DU and that corresponds to the one or more IP addresses allocated to the first IAB node. The information about the donor DU may be an identifier of the donor DU, a name of the donor DU, an address of a BAP of the donor DU, an IP address of the donor DU, or the like.

Optionally, in a specific implementation, because the donor node may be further divided into a donor CU and a donor DU, when the donor DU allocates an IP address to the first IAB node, the method 500 further includes: The donor CU forward, to the donor DU, the first information sent by the first IAB node, and the donor DU allocates the one or more IP addresses to the first IAB node. The donor DU may send the allocated one or more IP addresses to the donor CU, and the donor CU notifies the first IAB node of the allocated one or more IP addresses. Optionally, the donor DU may notify the donor CU of at least one of the one or more IP addresses allocated to the first IAB node, the one or more IP address prefixes allocated to the first IAB node, or the first n bits of the IP address allocated to the first IAB node. Optionally, the donor DU may further send third indication information to the donor CU.

In a possible implementation, the donor CU sends second information to the first IAB node, where the second information includes the one or more IP addresses allocated to the first IAB node. After receiving the one or more allocated IP addresses, the first IAB node determines IP addresses used for F1-C interface communication and/or IP addresses used for F1-U interface communication.

In another possible implementation, if an OAM server allocates IP addresses to the first IAB node, the OAM server may further indicate IP addresses used for F1-U interface communication and/or IP addresses used for F1-C interface communication in a plurality of IP addresses allocated to the first IAB node.

It should be understood that, for a specific process of the method 500 and the implementations of the method 500, refer to related descriptions of the method 200. For brevity, details are not described herein again.

The foregoing describes in detail the method side embodiments provided in embodiments of this application with reference to FIG. 1 to FIG. 21. The following describes in detail apparatus embodiments of this application with reference to FIG. 22 to FIG. 28. It should be understood that, descriptions of the method embodiments correspond to descriptions of the apparatus embodiments. Therefore, for a part not described in detail, refer to the foregoing method embodiments.

Figure 22:
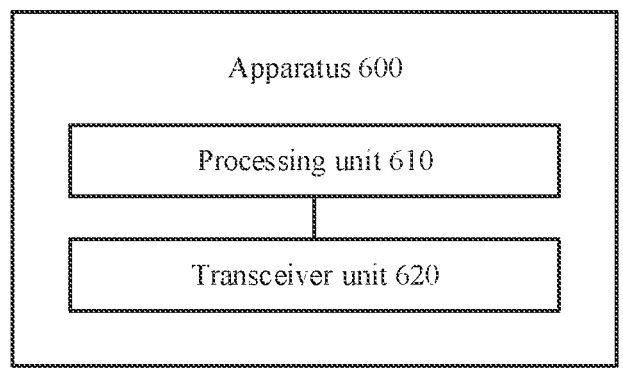
FIG. 22 is a schematic block diagram of a communication apparatus according to an embodiment of this application.

FIG. 22 is a schematic diagram of a structure of a communication apparatus 600 according to an embodiment of this application. The apparatus 600 may correspond to the first IAB node or correspond to a DU of the first IAB node described in the method 200, the method 400, and the method 500. Alternatively, the apparatus 600 may be a chip or a component used in the first IAB node, or may be a chip or a component used in the DU of the first IAB node. In addition, modules or units in the apparatus 600 are separately configured to perform actions or processing processes performed by the first IAB node or the DU of the first IAB node in the foregoing method embodiments.

As shown in FIG. 22, the apparatus 600 may include a processing unit 610 and a transceiver unit 620. The transceiver unit 620 is configured to perform specific signal receiving and sending under driving of the processing unit 610.

In some possible implementations, the processing unit 610 is configured to set up a first F1 interface with a primary donor node of the communication apparatus.

The processing unit 610 is further configured to obtain an internet protocol IP address, of the communication apparatus, anchored at a secondary donor node connected to the communication apparatus and/or configuration information of a serving cell, of the communication apparatus, belonging to the secondary donor node connected to the communication apparatus.

The transceiver unit 620 is configured to send, to the secondary donor node, a request for setting up a second F1 interface with the secondary donor node, where the request includes the configuration information of the serving cell.

According to the communication apparatus provided in this application, the communication apparatus (for example, an IAB node) sets up an F1 interface with a primary donor CU and a secondary donor CU. Before the communication apparatus is handed over from the primary donor CU to the secondary donor CU, because the communication apparatus has set up the F1 interface with the secondary donor CU in advance, after the communication apparatus is handed over to the secondary donor CU, F1 interface setup may not be triggered again. In this way, a latency for setting up an F1 interface between an IAB-DU and the secondary donor CU after the communication apparatus is handed over to the secondary donor CU is reduced, and a problem of service interruption caused by a latency existing when the communication apparatus is handed over to a donor node is avoided, thereby ensuring communication quality and improving communication efficiency.

Optionally, in some embodiments of this application, the transceiver unit 620 is further configured to send first indication information to the secondary donor node, where the first indication information is used to indicate, to the secondary donor node, whether to start an operation of activating the serving cell of the communication apparatus.

Optionally, in some embodiments of this application, the transceiver unit 620 is further configured to send second indication information to the secondary donor node, where the second indication information includes an identifier of the serving cell that the communication apparatus requests the secondary donor node to activate.

Optionally, in some embodiments of this application, the transceiver unit 620 is further configured to send first information to the secondary donor node, where the first information is used to request to allocate an IP address to the communication apparatus.

The transceiver unit 620 is further configured to receive second information from the secondary donor node, where the second information includes at least one of an IP address allocated to the communication apparatus, an IP address prefix allocated to the communication apparatus, or first n bits of the IP address allocated to the communication apparatus, where n is an integer greater than 0.

Optionally, in some embodiments of this application, the first information includes at least one of a quantity of IP addresses requested to be allocated to the first IAB node, a length of the one or more IP address prefixes requested to be allocated to the first IAB node, or a value of n of first n bits of the IP address requested to be allocated to the first IAB node.

Optionally, in some embodiments of this application, a centralized unit CU of the secondary donor node includes a centralized unit-control plane CU-CP entity and a centralized unit-user plane CU-UP entity. The first information further includes at least one of a quantity of IP addresses requested to be allocated to an F1-C interface, a length of the one or more IP address prefixes requested to be allocated to the F1-C interface, a value of x of first x bits of the IP address requested to be allocated to the F1-C interface, a quantity of IP addresses requested to be allocated to an F1-U interface, a length of the one or more IP address prefixes requested to be allocated to the F1-U interface, or a value of y of first y bits of the IP address requested to be allocated to the F1-U interface, where the F1-C interface is a communication interface between the communication apparatus and the CU-CP entity of the secondary donor node, the F1-U interface is a communication interface between the communication apparatus and the CU-UP entity of the secondary donor node, and both x and y are integers greater than 0.

Optionally, in some implementations of this application, the transceiver unit 620 is further configured to receive third indication information from the secondary donor node, where the third indication information is used to indicate at least one of a first IP address used for the F1-U interface in the one or more IP addresses allocated to the communication apparatus, a length of the first IP address prefix used for the F1-U interface, first y bits of the first IP address used for the F1-U interface, a second IP address used for the F1-C interface in the one or more IP addresses allocated to the communication apparatus, a length of the second IP address prefix used for the F1-C interface, or first x bits of the second IP address used for the F1-C interface.

Optionally, in some embodiments of this application, the secondary donor node includes a centralized unit CU and at least one distributed unit DU. The transceiver unit 620 is further configured to receive fourth indication information from the secondary donor node, where the fourth indication information is used to indicate information that is about the DU of the secondary donor node and that corresponds to the IP address allocated to the communication apparatus.

Further, the apparatus 600 may further include a storage unit, and the transceiver unit 620 may be a transceiver, an input/output interface, or an interface circuit. The storage unit is configured to store instructions executed by the transceiver unit 620 and the processing unit 610. The transceiver unit 620, the processing unit 610, and the storage unit are coupled to each other. The storage unit stores instructions. The processing unit 610 is configured to execute the instructions stored in the storage unit. The transceiver unit 620 is configured to perform specific signal receiving and sending under driving of the processing unit 610.

It should be understood that, for a specific process of performing the foregoing corresponding steps by the units in the apparatus 600, refer to the foregoing related descriptions of the first IAB node or the IAB-DU in related embodiments in the method 200, the method 400, the method 500, FIG. 7 to FIG. 13, FIG. 20, and FIG. 21. For brevity, details are not described herein again.

Optionally, the transceiver unit 620 may include a receiving unit (module) and a sending unit (module), and may be configured to perform the steps of receiving information and sending information by the first IAB node or the IAB-DU in related embodiments in the method 200, the method 400, the method 500, FIG. 7 to FIG. 13, FIG. 20, and FIG. 21.

Figure 23:
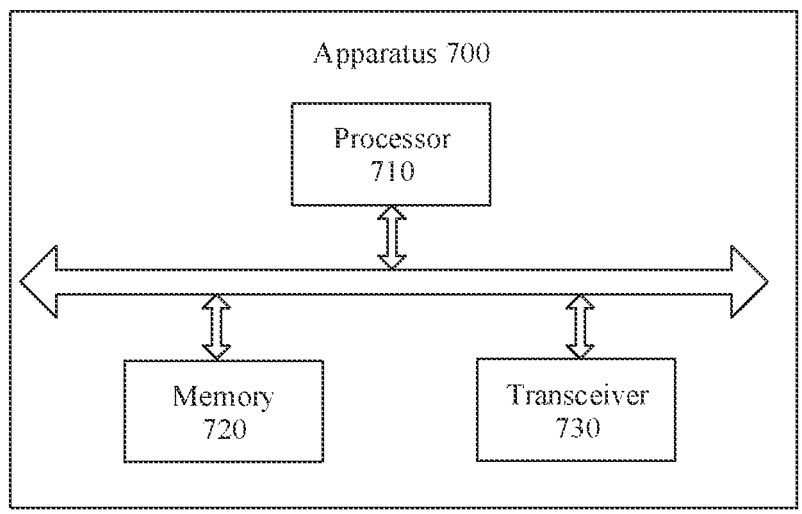
FIG. 23 is a schematic block diagram of another communication apparatus according to an embodiment of this application.

It should be understood that, the transceiver unit 620 may be a transceiver, an input/output interface, or an interface circuit. The storage unit may be a memory. The processing unit 610 may be implemented by a processor. As shown in FIG. 23, the communication apparatus 700 may include a processor 710, a memory 720, and a transceiver 730.

The communication apparatus 600 shown in FIG. 22 or the communication apparatus 700 shown in FIG. 23 can implement the steps performed by the first IAB node or the IAB-DU in related embodiments in the method 200, the method 400, the method 500, FIG. 7 to FIG. 13, FIG. 20, and FIG. 21. For similar descriptions, refer to the descriptions in the foregoing corresponding methods. To avoid repetition, details are not described herein again.

It should be further understood that the communication apparatus 600 shown in FIG. 22 or the communication apparatus 700 shown in FIG. 23 may be the IAB node or the IAB-DU.

Figure 24:
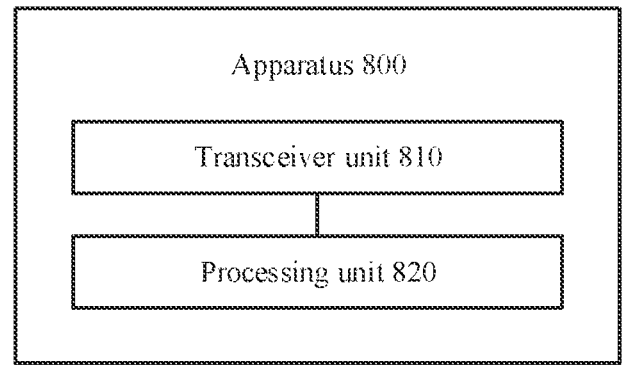
FIG. 24 is a schematic block diagram of still another communication apparatus according to an embodiment of this application.

FIG. 24 is a schematic diagram of a structure of a communication apparatus 800 according to an embodiment of this application. The apparatus 800 may correspond to the secondary donor node or the secondary donor CU in related embodiments in the method 200, the method 400, the method 500, FIG. 7 to FIG. 13, FIG. 20, and FIG. 21. Alternatively, the apparatus 800 may correspond to the primary donor node or the primary donor CU in related embodiments in the method 200, the method 400, the method 500, FIG. 7 to FIG. 13, FIG. 20, and FIG. 21. In addition, the modules or units in the apparatus 800 are respectively configured to perform actions or processing processes performed by the secondary donor node, the secondary donor CU, the primary donor node, or the primary donor CU in the foregoing method embodiments.

As shown in FIG. 24, the apparatus 800 may include a transceiver unit 810 and a processing unit 820. The transceiver unit 810 is configured to perform specific signal receiving and sending under driving of the processing unit 820.

In some possible implementations, when the apparatus 800 corresponds to the secondary donor node or the secondary donor CU in related embodiments in the method 200, the method 400, the method 500, FIG. 7 to FIG. 13, FIG. 20, and FIG. 21, the transceiver unit 810 is configured to receive, from a first IAB node, a request for setting up a second F1 interface with the communication apparatus, where the communication apparatus is a secondary donor node of the first IAB node.

The transceiver unit 810 is further configured to send, to the first IAB node, response information for setting up the second F1 interface, where the response information includes information about the communication apparatus.

When the communication apparatus sets up the second F1 interface with the first IAB node, the first IAB node maintains a first F1 interface with a primary donor node of the first IAB node.

According to the apparatus provided in this application, an IAB node sets up an F1 interface with a primary donor CU and the communication apparatus (a secondary donor CU). Before the IAB node is handed over from the primary donor CU to the communication apparatus, because the IAB node has set up the F1 interface with the communication apparatus in advance, after the IAB node is handed over to the communication apparatus, F1 interface setup may not be triggered again. In this way, a latency for setting up the F1 interface between the IAB-DU and the secondary donor CU after the IAB node is handed over to a donor CU is reduced, and a problem of service interruption caused by a latency existing when the IAB node is handed over to a donor node is avoided, thereby ensuring communication quality and improving communication efficiency.

Optionally, in some embodiments of this application, the transceiver unit 810 is further configured to receive first indication information from the first IAB node, where the first indication information is used to indicate, to the communication apparatus, whether to start an operation of activating a serving cell of the first IAB node.

Optionally, in some embodiments of this application, the transceiver unit 810 is further configured to receive second indication information from the first IAB node, where the second indication information includes an identifier of the serving cell that the first IAB node requests the communication apparatus to activate.

Optionally, in some embodiments of this application, the transceiver unit 810 is further configured to: receive first information from the first IAB node, where the first information is used to request to allocate an IP address to the first IAB node; and send second information to the first IAB node, where the second information includes at least one of an IP address allocated to the first IAB node, an IP address prefix allocated to the first IAB node, or first n bits of the IP address allocated to the first IAB node, where n is an integer greater than 0.

Optionally, in some embodiments of this application, the first information includes at least one of a quantity of IP addresses requested to be allocated to the first IAB node, a length of the one or more IP address prefixes requested to be allocated to the first IAB node, or a value of n of first n bits of the IP address requested to be allocated to the first IAB node.

Optionally, in some embodiments of this application, a centralized unit CU of the communication apparatus includes a centralized unit-control plane CU-CP entity and a centralized unit-user plane CU-UP entity. The first information further includes at least one of a quantity of IP addresses requested to be allocated to an F1-C interface, a length of the one or more IP address prefixes requested to be allocated to the F1-C interface, a value of x of first x bits of the IP address requested to be allocated to the F1-C interface, a quantity of IP addresses requested to be allocated to an F1-U interface, a length of the one or more IP address prefixes requested to be allocated to the F1-U interface, or a value of y of first y bits of the IP address requested to be allocated to the F1-U interface, where the F1-C interface is a communication interface between the first IAB node and the CU-CP entity of the communication apparatus, the F1-U interface is a communication interface between the first IAB node and the CU-UP entity of the communication apparatus, and both x and y are integers greater than 0.

Optionally, in some implementations of this application, the transceiver unit 810 is further configured to send third indication information to the first IAB node, where the third indication information is used to indicate at least one of a first IP address used for the F1-U interface in the one or more IP addresses allocated to the first IAB node, a length of the first IP address prefix used for the F1-U interface, first y bits of the first IP address used for the F1-U interface, a second IP address used for the F1-C interface in the one or more IP addresses allocated to the first IAB node, a length of the second IP address prefix used for the F1-C interface, or first x bits of the second IP address used for the F1-C interface.

Optionally, in some embodiments of this application, the communication apparatus includes a centralized unit CU and at least one distributed unit DU. The transceiver unit 810 is further configured to send fourth indication information to the first IAB node, where the fourth indication information is used to indicate information that is about the DU of the communication apparatus and that corresponds to the IP address allocated to the first IAB node.

Optionally, in some embodiments of this application, the communication apparatus includes a centralized unit CU and a distributed unit DU. The transceiver unit 810 is further configured to: send the first information to the DU of the communication apparatus; and receive, the DU of the communication apparatus, at least one of the IP address allocated to the first IAB node, the IP address prefix allocated to the first IAB node, or the first n bits of the IP address allocated to the first IAB node.

Optionally, in some embodiments of this application, the transceiver unit 810 is further configured to receive a secondary station addition request message from the primary donor node, where the secondary station addition request message is used to request to add the communication apparatus as a secondary station of the first IAB node, and the secondary station addition request message includes:

at least one of indication information used to indicate that the first IAB node is a mobile IAB node, an identifier of a first IAB node group, member information of the first IAB node group, or topology information of the first IAB node group, where the first IAB node group is a group including the first IAB node and a child node of the first IAB node.

Optionally, in some embodiments of this application, the transceiver unit 810 is further configured to send a secondary station addition response message to the primary donor node, where the secondary station addition response message includes:

at least one of an IP address, of the first IAB node, anchored at the communication apparatus or an IP address of the communication apparatus.

Optionally, in some embodiments of this application, the member information of the first IAB node group includes:

at least one of an identifier of the child node of the first IAB node, quality of service QoS information of a service of the child node of the first IAB node, or QoS information corresponding to a backhaul radio link control channel of the first IAB node under a topology of the primary donor node.

In some other possible implementations, when the apparatus 800 corresponds to the primary donor node or primary donor CU in related embodiments in the method 200, the method 400, the method 500, FIG. 7 to FIG. 13, FIG. 20, and FIG. 21, the transceiver unit 810 is configured to send a secondary station addition request message to a first donor node, where the secondary station addition request message is used to request to add the first donor node as a secondary donor node of a first IAB node, and the communication apparatus is a primary donor node of the first IAB node. The secondary station addition request message includes at least one of indication information indicating that the first IAB node is a mobile IAB node, an identifier of a first IAB node group, member information of the first IAB node group, or topology information of the first IAB node group, where the first IAB node group is a group including the first IAB node and a child node of the first IAB node.

The transceiver unit 810 is further configured to receive a secondary station addition response message from the first donor node.

The transceiver unit 810 is further configured to send seventh indication information to the first IAB node, where the seventh indication information is used to indicate the first IAB node to add the first donor node as a secondary donor node.

According to the communication apparatus provided in this application, a dual connectivity procedure is introduced before IAB node handover. In a process in which an IAB node adds a secondary station, the communication apparatus sends information about an IAB node group to a first IAB donor, and sets up a user plane backhaul link between the IAB node and the first IAB donor. When donor node handover is performed subsequently, only an identifier of the IAB node group needs to be notified to the first donor node in a handover request, to reduce a handover processing latency in a subsequent handover process.

Optionally, in some embodiments of this application, the member information of the first IAB node group includes:

at least one of an identifier of the child node of the first IAB node, quality of service QoS information of a service of the child node of the first IAB node, or QoS information corresponding to a backhaul radio link control channel of the first IAB node under a topology of the primary donor node.

The secondary station addition response message of the first donor node includes at least one of an IP address, of the first IAB node, anchored at the first donor node or an IP address of the first donor node.

Optionally, in some embodiments of this application, the transceiver unit 810 is further configured to: send a handover request message to the first donor node, where the handover request message includes the identifier of the first IAB node group; and receive a handover response message from the first donor node, where the handover response message is used to indicate the first IAB node to be handed over to the first donor node.

Optionally, in some embodiments of this application, the transceiver unit 810 is further configured to send, to the first IAB node, an IP address, of the first IAB node, anchored at the first donor node and/or configuration information of a serving cell, of the first IAB node, belonging to the first donor node.

Further, the apparatus 800 may further include a storage unit, and the transceiver unit 810 may be a transceiver, an input/output interface, or an interface circuit. The storage unit is configured to store instructions executed by the transceiver unit 810 and the processing unit 820. The transceiver unit 810, the processing unit 820, and the storage unit are coupled to each other. The storage unit stores instructions. The processing unit 820 is configured to execute the instructions stored in the storage unit. The transceiver unit 810 is configured to perform specific signal receiving and sending under driving of the processing unit 820.

It should be understood that, for a specific process of performing the foregoing corresponding steps by the units in the apparatus 800, refer to the foregoing related descriptions of the secondary donor node, the secondary donor CU, the primary donor node, or the primary donor CU in related embodiments in the method 200, the method 400, the method 500, FIG. 7 to FIG. 13, FIG. 20, and FIG. 21. For brevity, details are not described herein again.

Optionally, the transceiver unit 810 may include a receiving unit (module) and a sending unit (module), and may be configured to perform the steps of receiving information and sending information by the secondary donor node, the secondary donor CU, the primary donor node, or the primary donor CU in related embodiments in the method 200, the method 400, the method 500, FIG. 7 to FIG. 13, FIG. 20, and FIG. 21.

Figure 25:
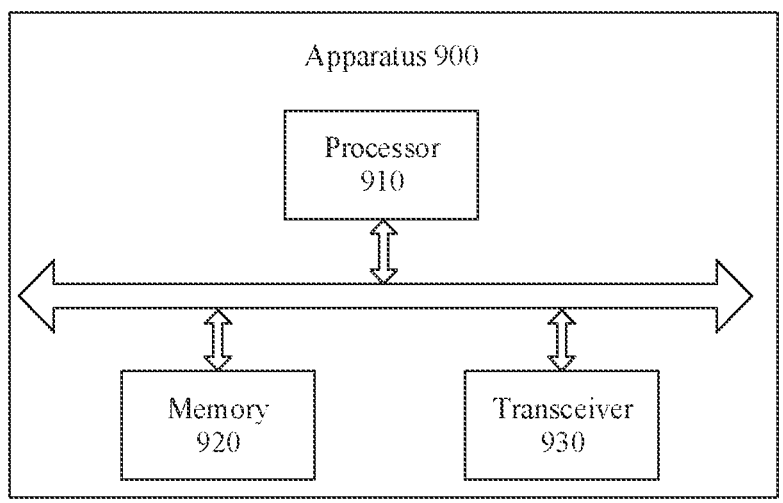
FIG. 25 is a schematic block diagram of another communication apparatus according to an embodiment of this application.

It should be understood that, the transceiver unit 810 may be a transceiver, an input/output interface, or an interface circuit. The storage unit may be a memory. The processing unit 820 may be implemented by a processor. As shown in FIG. 25, the communication apparatus 900 may include a processor 910, a memory 920, and a transceiver 930.

The communication apparatus 800 shown in FIG. 24 or the communication apparatus 900 shown in FIG. 25 can implement the steps performed by the secondary donor node, the secondary donor CU, the primary donor node, or the primary donor CU in related embodiments in the method 200, the method 400, the method 500, FIG. 7 to FIG. 13, FIG. 20, and FIG. 21. For similar descriptions, refer to the descriptions in the foregoing corresponding methods. To avoid repetition, details are not described herein again.

It should be further understood that the communication apparatus 800 shown in FIG. 24 or the communication apparatus 900 shown in FIG. 25 may be an IAB donor node.

Figure 26:
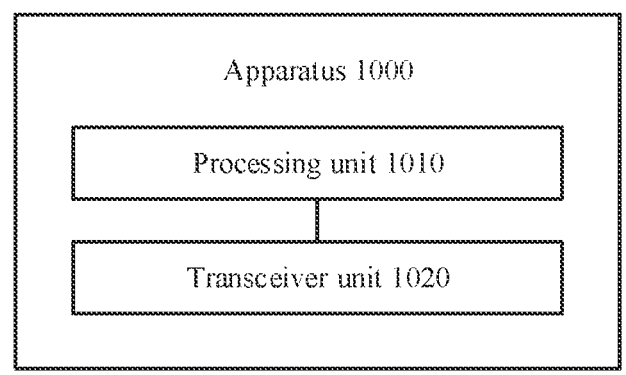
FIG. 26 is a schematic block diagram of another communication apparatus according to an embodiment of this application.

FIG. 26 is a schematic diagram of a structure of a communication apparatus 1000 according to an embodiment of this application. The apparatus 100 may correspond to the CU-UP entity (node) of the donor node in related embodiments in the method 300, FIG. 15, and FIG. 17 to FIG. 19. The modules or units in the apparatus 1000 are separately configured to perform actions or processing processes performed by the CU-UP entity of the donor node in embodiments of the method 300.

As shown in FIG. 26, the apparatus 1000 may include a processing unit 1010 and a transceiver unit 1020. The transceiver unit 1020 is configured to perform specific signal receiving and sending under driving of the processing unit 1010.

The processing unit 1010 is configured to generate fifth indication information, where the fifth indication information is used to indicate that the communication apparatus supports an IAB function or supports access of an IAB node.

The transceiver unit 1020 is configured to send the fifth indication information to a CU-CP entity of the donor node. The IAB donor node includes a centralized unit CU and at least one distributed unit DU, the CU includes a centralized unit-control plane CU-CP entity and a centralized unit-user plane CU-UP entity, and the communication apparatus is a CU-UP entity.

According to the communication apparatus provided in this application, in an IAB scenario, when selecting CU-UP entities of the donor node to perform data transmission, the CU-CP entity of the donor node can accurately select CU-UP entities that are of the donor node and that support IAB, and use the CP-UP entities of the donor node to perform routing and bearer mapping before sending data, so as to ensure normal user-plane transmission and ensure quality and efficiency of data transmission of a terminal device.

Optionally, in some embodiments of this application, the fifth indication information performs indication based on each public land mobile network PLMN.

Optionally, in some embodiments of this application, the transceiver unit 1020 is further configured to send an E1 interface setup request to the CU-CP entity of the donor node, where the E1 interface setup request includes the fifth indication information, and the E1 interface is an interface between the communication apparatus and the CU-CP entity of the donor node.

Optionally, in some embodiments of this application, the transceiver unit 1020 is further configured to: receive the E1 interface setup request from the CU-CP entity of the donor node, where the E1 interface is an interface between the communication apparatus and the CU-CP entity of the donor node; and send an E1 interface setup response to the CU-CP entity of the donor node, where the E1 interface setup response includes the fifth indication information.

Optionally, in some embodiments of this application, the transceiver unit 1020 is further configured to receive sixth indication information from the CU-CP entity of the donor node, where the sixth indication information is used to indicate the communication apparatus to report a capability that the communication apparatus supports an IAB function or supporting access of an IAB node.

Further, the apparatus 1000 may further include a storage unit, and the transceiver unit 1020 may be a transceiver, an input/output interface, or an interface circuit. The storage unit is configured to store instructions executed by the transceiver unit 1020 and the processing unit 1010. The transceiver unit 1020, the processing unit 1010, and the storage unit are coupled to each other. The storage unit stores instructions. The processing unit 1010 is configured to execute the instructions stored in the storage unit. The transceiver unit 1020 is configured to perform specific signal receiving and sending under driving of the processing unit 1010.

It should be understood that, for a specific process of performing the foregoing corresponding steps by the units in the apparatus 1000, refer to the foregoing related descriptions of the CU-UP entity (node) of the donor node in related embodiments in the method 300, FIG. 15, and FIG. 17 to FIG. 19. For brevity, details are not described herein again.

Optionally, the transceiver unit 1020 may include a receiving unit (module) and a sending unit (module), and may be configured to perform the steps of receiving information and sending information by the CU-UP entity (node)

of the donor node in related embodiments in the method 300, FIG. 15, and FIG. 17 to FIG. 19.

Figure 27:
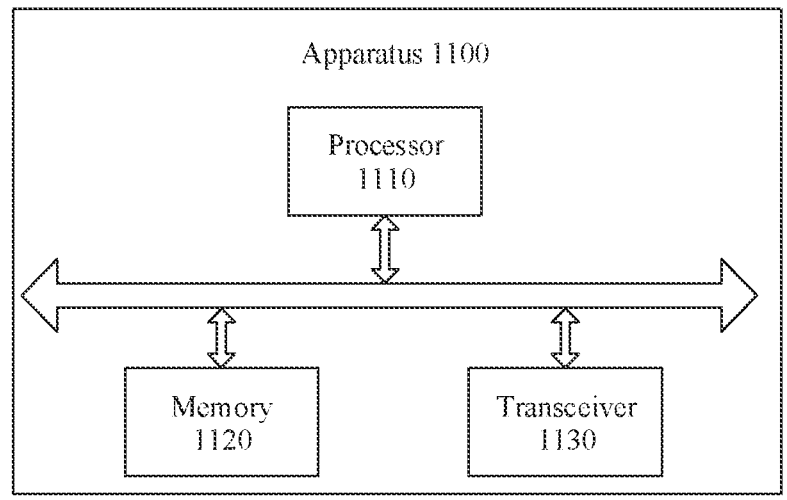
FIG. 27 is a schematic block diagram of still another communication apparatus according to an embodiment of this application.

It should be understood that, the transceiver unit 1020 may be a transceiver, an input/output interface, or an interface circuit. The storage unit may be a memory. The processing unit 1010 may be implemented by a processor. As shown in FIG. 27, the communication apparatus 1100 may include a processor 1110, a memory 1120, and a transceiver 1130.

The communication apparatus 1000 shown in FIG. 26 or the communication apparatus 1100 shown in FIG. 27 can implement the steps performed by the CU-UP entity (node) of the donor node in related embodiments in the method 300, FIG. 15, and FIG. 17 to FIG. 19. For similar descriptions, refer to the descriptions in the foregoing corresponding methods. To avoid repetition, details are not described herein again.

It should be further understood that the communication apparatus 1000 shown in FIG. 26 or the communication apparatus 1100 shown in FIG. 27 may be the CU-UP entity (node) of the donor node.

It should be further understood that division of units in the apparatus is merely logical function division. During actual implementation, all or some of the units may be integrated into one physical entity or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware. For example, units may be separately disposed processing elements, or may be integrated into a chip of the apparatus for implementation. In addition, the units may be stored in a memory in a program form, and is invoked by a processing element of the apparatus to perform functions of the units. The processing element herein may also be referred to as a processor, and may be an integrated circuit having a signal processing capability. In an implementation process, steps in the foregoing methods or the foregoing units may be implemented by using a hardware integrated logic circuit in the processor element, or may be implemented in a form in which the processing element invokes software.

In an example, a unit in any one of the foregoing apparatuses may be one or more integrated circuits configured to implement the foregoing method, for example, one or more application-specific integrated circuits (ASICs), one or more digital signal processors (DSPs), one or more field programmable gate arrays (FPGAs), or a combination of at least two of these integrated circuit forms. For another example, when the units in the apparatus may be implemented in a form in which a processing element schedules a program, the processing element may be a general purpose processor, for example, a central processing unit (CPU) or another processor that can invoke the program. For another example, the units may be integrated together and implemented in a form of a system-on-a-chip (SOC).

It should be understood that in embodiments of this application, the processor may be a central processing unit (CPU), or the processor may be another general-purpose processor, a DSP, an ASIC, an FPGA, or another programmable logic device, discrete gate or transistor logic device, discrete hardware component, or the like. The general-purpose processor may be a microprocessor, or the processor may be any conventional processor or the like.

All or some of the foregoing embodiments may be implemented by software, hardware, firmware, or any combination thereof. When the software is used to implement the embodiments, all or some of the foregoing embodiments may be implemented in a form of a computer program product. The computer program product includes one or more computer instructions or computer programs. When the program instructions or the computer programs are loaded and executed on a computer, the procedures or functions according to the embodiments of this application are all or partially generated. The computer may be a general-purpose computer, a dedicated computer, a computer network, or another programmable apparatus.

The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

Figure 28:
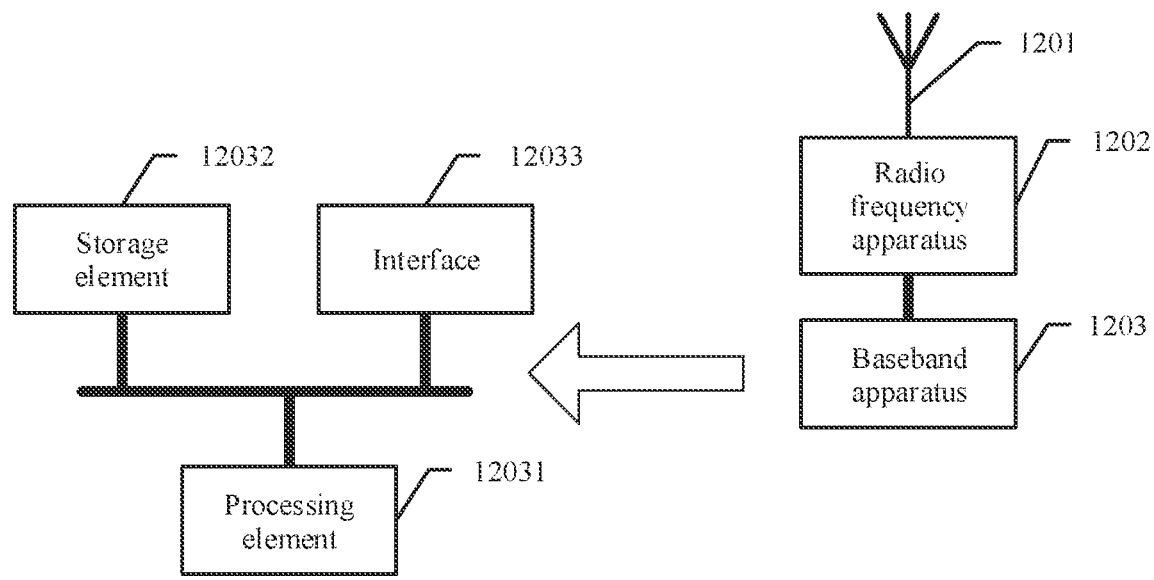
FIG. 28 is a schematic diagram of a structure of an IAB node or an IAB donor node according to an embodiment of this application.

FIG. 28 is a schematic diagram of a structure of an IAB node or an IAB donor node according to an embodiment of this application. The structure is configured to implement operations of the IAB node or the IAB donor node in the foregoing embodiments. As shown in FIG. 28, the IAB node or the IAB donor node includes an antenna 1201, a radio frequency apparatus 1202, and a baseband apparatus 1203. The antenna 1201 is connected to the radio frequency apparatus 1202. In an uplink direction, the radio frequency apparatus 1202 receives, by using the antenna 1201, information sent by a terminal device, and sends, to the baseband apparatus 1203, the information sent by the terminal for processing. In a downlink direction, the baseband apparatus 1203 processes information about the terminal, and sends the information about the terminal device to the radio frequency apparatus 1202. The radio frequency apparatus 1202 processes the information about the terminal, and then sends the processed information about the terminal to the terminal by using the antenna 1201.

The baseband apparatus 1203 may include one or more processing elements 12031, for example, include a main control CPU and another integrated circuit. In addition, the baseband apparatus 1203 may further include a storage element 12032 and an interface 12033. The storage element 12032 is configured to store a program and data. The interface 12033 is configured to exchange information with the radio frequency apparatus 1202, and the interface is, for example, a common public radio interface (CPRI). The foregoing apparatus used for the network device may be located in the baseband apparatus 1203. For example, the foregoing apparatus used for the network device may be a chip in the baseband apparatus 1203. The chip includes at least one processing element and an interface circuit. The processing element is configured to perform the steps of any method performed by the IAB node or the IAB donor node. The interface circuit is configured to communicate with another apparatus. In an implementation, units of the IAB node or the IAB donor node that implement the steps in the foregoing methods may be implemented by a processing element scheduling a program. For example, the apparatus used for the IAB node or the IAB donor node includes a processing element and a storage element. The processing element invokes a program stored in the storage element, to perform the methods performed by the IAB node or the IAB donor node in the foregoing method embodiments. The storage element may be a storage element that is located on a same chip as the processing element, that is, an on-chip storage element, or may be a storage element that is located on a different chip from the processing element, that is, an off-chip storage element.

In another implementation, units of the IAB node or the IAB donor node that implement the steps in the foregoing methods may be configured as one or more processing elements. The processing elements are disposed in the baseband apparatus. The processing element herein may be an integrated circuit, for example, one or more ASICs, one or more DSPs, one or more FPGAs, or a combination of the types of integrated circuits. The integrated circuits may be integrated together to form a chip.

Units of the IAB node or the IAB donor node that implement the steps in the foregoing methods may be integrated together, and implemented in a form of a system-on-a-chip. For example, the baseband apparatus includes the SOC chip, configured to implement the foregoing methods.

The IAB node or the IAB donor node in the foregoing apparatus embodiments may completely correspond to the IAB node or the IAB donor node in the method embodiments, and a corresponding module or unit performs a corresponding step. For example, when the apparatus is implemented in a chip manner, the receiving unit may be an interface circuit configured by the chip to receive a signal from another chip or apparatus. The foregoing unit configured for sending is an interface circuit of the apparatus, and is configured to send a signal to another apparatus. For example, when the apparatus is implemented in the manner of the chip, the sending unit is an interface circuit that is of the chip and that is configured to send a signal from another chip or apparatus.

An embodiment of this application further provides a communication system. The communication system includes the foregoing first IAB node, the foregoing secondary donor, and the foregoing primary donor node.

An embodiment of this application further provides a computer-readable medium, configured to store computer program code. The computer program includes instructions used to perform the method provided in embodiments of this application in the method 200 to the method 500. The readable medium may be a read-only memory (ROM) or a random access memory (RAM). This is not limited in this embodiment of this application.

This application further provides a computer program product. The computer program product includes instructions. When the instructions are executed, an IAB node, a secondary donor, and a primary donor node are enabled to separately perform operations of the IAB node, the secondary donor, and the primary donor node that correspond to the foregoing method.

An embodiment of this application further provides a system chip. The system chip includes a processing unit and a communication unit. The processing unit may be, for example, a processor, and the communication unit may be, for example, an input/output interface, a pin, a circuit, or the like. The processing unit may execute computer instructions, so that a chip in the communication apparatus performs any method provided in the foregoing embodiments of this application.

Optionally, any communication apparatus provided in the foregoing embodiments of this application may include the system chip.

Optionally, the computer instructions are stored in a storage unit.

Optionally, the storage unit is a storage unit in the chip, for example, a register or a cache. The storage unit may further be a storage unit, such as a ROM, another type of static storage device that can store static information and instructions, or a RAM, that is outside the chip and that is in the terminal. The processor mentioned anywhere above may be a CPU, a microprocessor, an ASIC, or one or more integrated circuits for controlling program execution of the foregoing of communication method. The processing unit and the storage unit may be decoupled, are separately disposed on different physical devices, and are connected in a wired or wireless manner to implement respective functions of the processing unit and the storage unit, so as to support the system chip in implementing various functions in the foregoing embodiments. Alternatively, the processing unit and the memory may be coupled to a same device.

It may be understood that, in embodiments of this application, the memory may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of random access memories (RAMs) may be used, for example, a static random access memory (static RAM, SRAM), a dynamic random access memory (dynamic RAM, DRAM), a synchronous dynamic random access memory (synchronous DRAM, SDRAM), a double data rate-synchronous dynamic random access memory (double Data Rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The terms "system" and "network" in this specification may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

Terms "uplink" and "downlink" in this application are used to describe a data/information transmission direction in a specific scenario. For example, the "uplink" direction usually refers to a direction in which data/information is transmitted from a terminal to a network side, or a direction in which a distributed unit transmits data/information to a centralized unit, and the "downlink" direction usually refers to a direction in which data/information is transmitted from a network side to a terminal. Alternatively, in a transmission direction from the centralized unit to the distributed unit, it may be understood that "uplink" and "downlink" are merely used to describe a data/information transmission direction, and a specific start/end device of the data/information transmission is not limited.

In this application, names may be assigned to various objects such as various messages/information/devices/network elements/systems/apparatuses/actions/operations/procedures/concepts. It may be understood that these specific names do not constitute a limitation on related objects, the assigned names may change with factors such as a scenario, a context, or a use habit. Technical meanings of technical terms in this application should be mainly understood based on functions and technical effects reflected/executed by the technical terms in the technical solutions.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in embodiments of this application. The storage medium includes a USB flash drive, a removable hard disk, a read-only memory (ROM), and a random access memory.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication apparatus, comprising:
   at least one processor; and
   one or more memories coupled to the at least one processor and storing programming instructions for execution by the at least one processor to perform operations comprising:
      receiving first information from an integrated access and backhaul (IAB) node, wherein the first information is used to request to allocate internet protocol (IP) address to the IAB node, wherein the communication apparatus is a centralized unit (CU) of an IAB donor or an apparatus included in the CU of the IAB donor, and wherein the first information comprises a quantity of IP addresses requested to be allocated to the IAB node or a quantity of IP addresses requested to be allocated to an F1 control plane (F1-C) interface or an F1 user plane (F1-U) interface, wherein the F1-C interface is a communication interface between the IAB node and a CU-control plane (CU-CP) of the IAB donor, and the F1-U interface is a communication interface between the IAB node and a CU-user plane (CU-UP) of the IAB donor;
      in response to receiving the first information, sending, to a distributed unit (DU) of the IAB donor, a request for allocating IP address to the IAB node;
      receiving, from the DU of the IAB donor, one or more IP addresses that are allocated to the IAB node; and
      sending, to the IAB node, a backhaul adaptation protocol (BAP) address that is of the DU of the IAB donor and that corresponds to the one or more IP addresses.

2. The apparatus according to claim 1, wherein the operations comprise:
   sending indication information to the IAB node, wherein the indication information indicates an IP address used for an F1 user plane (F1-U) interface or an F1 control plane (F1-C) interface in the one or more IP addresses.

3. The apparatus according to claim 1, wherein the operations comprise:
   sending indication information to the IAB node, wherein the indication information indicates an IP address prefix used for an F1 user plane (F1-U) interface or an F1 control plane (F1-C) interface in the one or more IP address prefixes.

4. A communication apparatus, comprising:
   at least one processor; and
   one or more memories coupled to the at least one processor and storing programming instructions for execution by the at least one processor to perform operations comprising:
      sending first information to a centralized unit (CU) of an integrated access and backhaul (IAB) donor, wherein the first information is used to request to allocate internet protocol (IP) address to an IAB node, and wherein the communication apparatus is the IAB node or an apparatus included in the IAB node, and wherein the first information comprises a quantity of IP addresses requested to be allocated to the IAB node or a quantity of IP addresses requested to be allocated to an F1 control plane (F1-C) interface or an F1 user plane (F1-U) interface, wherein the F1-C interface is a communication interface between the IAB node and a CU-control plane (CU-CP) of the IAB donor, and the F1-U interface is a communication interface between the IAB node and a CU-user plane (CU-UP) of the IAB donor; and receiving a backhaul adaptation protocol (BAP) address from the CU of the IAB donor, wherein the BAP address is of a distributed unit (DU) of the IAB donor and the BAP address corresponds to one or more IP addresses that are allocated to the IAB node.

5. The apparatus according to claim 4, wherein the operations comprise:

receiving indication information from the CU of the IAB donor, wherein the indication information indicates an IP address used for an F1 user plane (F1-U) interface or an F1 control plane (F1-C) interface in the one or more IP addresses.

6. The apparatus according to claim 4, wherein the operations comprise:

receiving indication information from the CU of the IAB donor, wherein the indication information indicates an IP address prefix used for an F1 user plane (F1-U) interface or an F1 control plane (F1-C) interface in the one or more IP address prefixes.

7. The apparatus according to claim 4, wherein the one or more IP addresses are allocated by the DU of the IAB donor.

8. The apparatus according to claim 1, wherein the operations further comprise: sending the one or more IP addresses to the IAB node.

9. The apparatus according to claim 4, wherein the operations further comprise: receiving the one or more IP address from the CU of the IAB donor.

10. A communication system, comprising:

a centralized unit (CU) of an integrated access and backhaul (IAB) donor, wherein the CU of the IAB donor comprises:

at least one first processor; and one or more first memories coupled to the at least one first processor and storing first programming instructions for execution by the at least one first processor to perform first operations comprising:

receiving first information from an IAB node, wherein the first information is used to request to allocate internet protocol (IP) address to the IAB node, and wherein the first information comprises a quantity of IP addresses requested to be allocated to the IAB node or a quantity of IP addresses requested to be allocated to an F1 control plane (F1-C) interface or an F1 user plane (F1-U) interface, wherein the F1-C interface is a communication interface between the IAB node and a CU-control plane (CU-CP) of the IAB donor, and the F1-U interface is a communication interface between the IAB node and a CU-user plane (CU-UP) of the IAB donor;

in response to receiving the first information, sending, to a distributed unit (DU) of the IAB donor, a request for allocating IP address to the IAB node;

receiving, from the DU of the IAB donor, one or more IP addresses that are allocated to the IAB node; and sending, to the IAB node, a backhaul adaptation protocol (BAP) address that is of the DU of the IAB donor and that corresponds to the one or more IP addresses; and the IAB node, wherein the IAB node comprises:

at least one second processor; and one or more second memories coupled to the at least one second processor and storing second programming instructions for execution by the at least one second processor to perform second operations comprising:

sending the first information to the CU of the IAB donor; and receiving the BAP address from the CU of the IAB donor.

11. The communication system according to claim 10, wherein the first operations comprise:

sending indication information to the IAB node, wherein the indication information indicates an IP address used for an F1 user plane (F1-U) interface or an F1 control plane (F1-C) interface in the one or more IP addresses.

12. The communication system according to claim 10, wherein the first operations further comprise: sending the one or more IP addresses to the IAB node.

* * * * *